United States Patent [19]
Steiner

[11] 4,130,354
[45] Dec. 19, 1978

[54] REPRODUCTION MACHINE HAVING DUPLEX JOB RECOVERY CAPABILITIES

[75] Inventor: Edward L. Steiner, Macedon, N.Y.

[73] Assignee: Xerox Corporation, Stamford, Conn.

[21] Appl. No.: 829,016

[22] Filed: Aug. 30, 1977

[51] Int. Cl.² ........................ G03B 27/52; G03G 15/00

[52] U.S. Cl. .......................................... 355/26; 355/14; 355/77; 235/92 SB

[58] Field of Search ...................... 355/3 R, 14, 23, 24, 355/26, 77; 235/92 SB, 92 PE, 92 CT

[56] References Cited

U.S. PATENT DOCUMENTS

| | | | |
|---|---|---|---|
| 3,819,266 | 6/1974 | Price | 355/14 |
| 3,830,590 | 8/1974 | Harris et al. | 355/14 |
| 3,944,794 | 3/1976 | Reehil et al. | 355/14 |
| 4,044,232 | 8/1977 | Hubbard | 355/14 |

OTHER PUBLICATIONS

*Research Disclosure*, Jun. 1976, "Automatic Control of Recirculating Feeder for Copier Operation."

*Eastman Kodak Research Disclosure* 12367, Oct. 1974, "Automatic Paper Count for Both Single and Two-Sided Copying."

*Primary Examiner*—L. T. Hix
*Assistant Examiner*—W. J. Brady

[57] ABSTRACT

A method of controlling a reproduction machine to produce duplex copies from a set of original documents and for automatically adjusting the reproduction process in the event of a fault condition so that the selected number of copies are ultimately produced even though some copies may have been lost due to the fault.

8 Claims, 53 Drawing Figures

507
A0 — A9
ADDR.
MEMORY
16 k BYTES
(ROM)
545
560
A10 — A12
DECODE
CS-1
DATA(OUT)
CS-2 (1st. 8k)
A13
CS-2 (2nd 8k)
A14
A15
(N ROM)
TO: 548
(HOLD A)
(MEM R)
(DB IN)
(MEM READ)
FROM 605
(N OUT)
(WR)
563
(MEM WRITE)
FROM 605 FIG. 23
(MEM HERE)
(MEMEN)
(HOLD A)
507
A0 — A9
READ/WRITE
ADDR
A10
561
DATA(OUT)
1st k SELECT
546'
562
DATA BUS
508
MEMORY
(RAM)
2k BYTES
2nd k SELECT
546
DATA (IN)
A11
A12
A13
A14
A15
(N RAM)
TO: 548

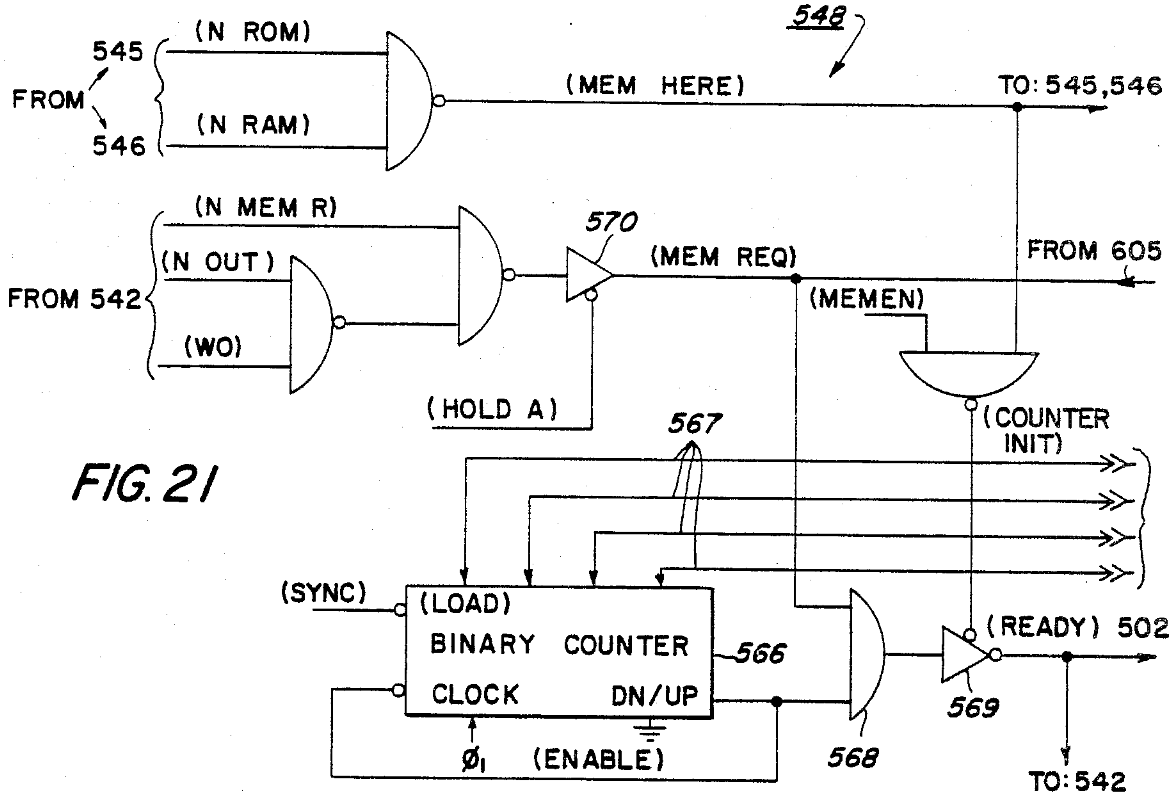
FIG. 21
MEMORY READY
FIG. 24
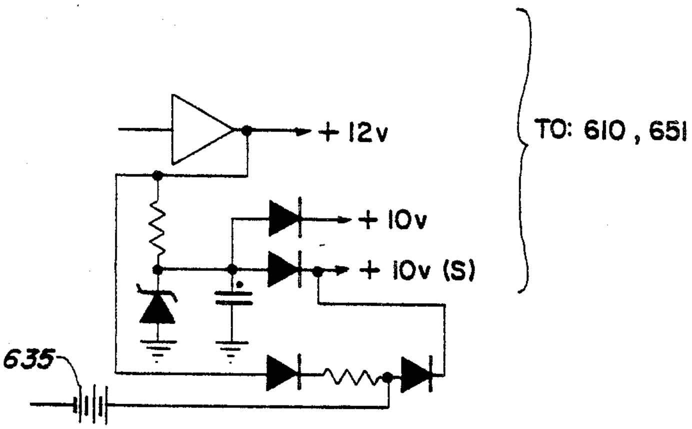

PITCH RESET CLOCK
640
OPT ISO
645
DIGITAL FILTER
646
EDGE TRIGGER FLIP-FLOP & STORAGE
612
647
651
654
656
PRIORITY CHIP
659
(INT) TO: PROCESSOR 542
508
D0-D7
RESTART
LATCH
660
(INTA) FROM: PROCESSOR 542
FROM HOST MACHINE IO
524
(INT)
D2
D3
D4
D5
D6
D7
MACH. CLOCK
641
FROM: 202
(EN)
648
PHASE LOOP LOCK
649
(LOCK)
642
SPARE
652
653
658
(LOAD)
FROM: 601
REGISTER
621
REAL TIME CLOCK
643
FROM: 570
RESET
FROM: FUNCTION DECODE SECTION 601

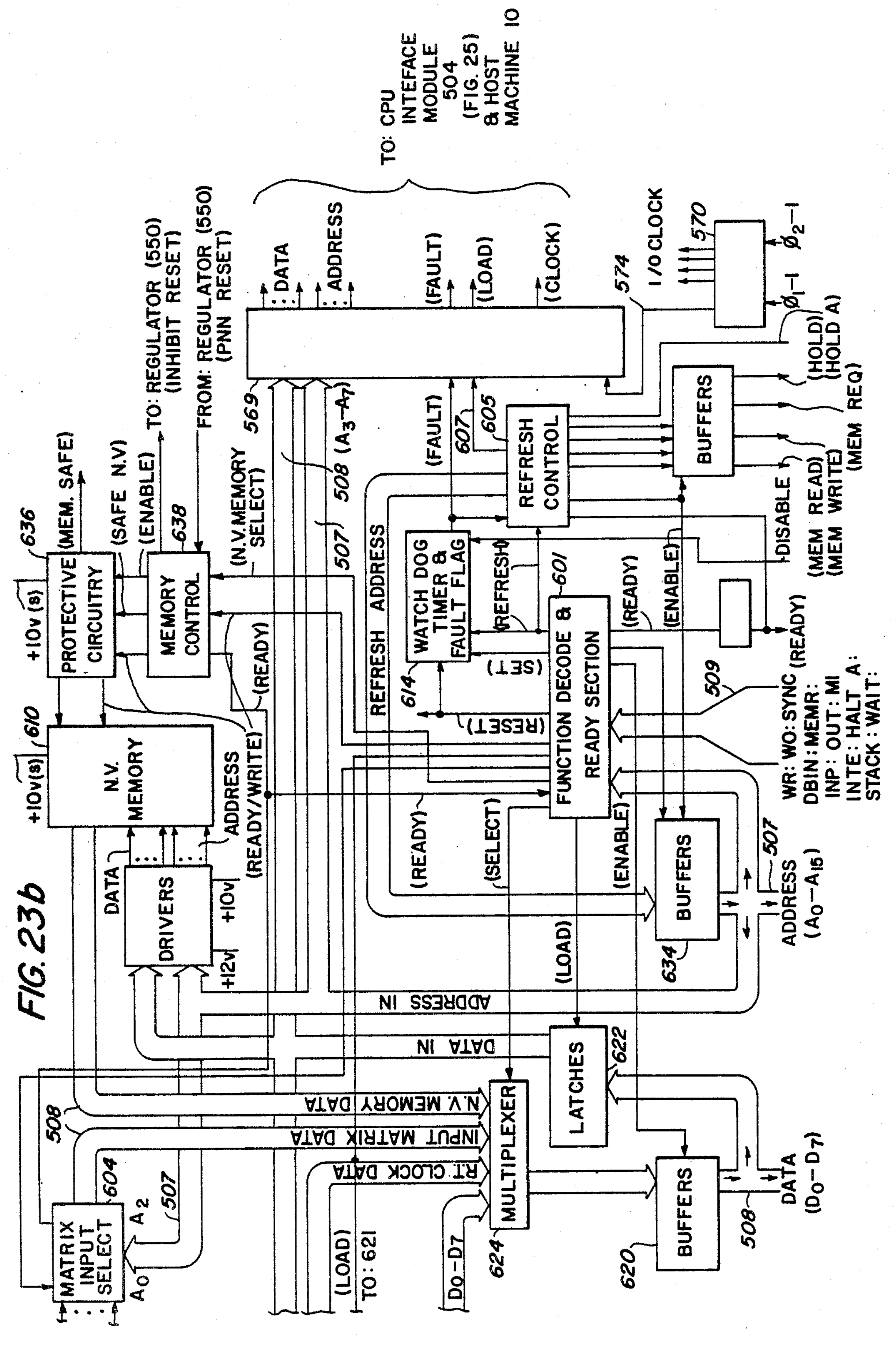
FIG. 23b
TO: CPU INTEFACE MODULE 504 (FIG. 25) & HOST MACHINE 10
DATA
ADDRESS
(FAULT)
(LOAD)
(CLOCK)
574
I/O CLOCK
570
$\phi_1$-1
$\phi_2$-1
(HOLD)
(HOLD A)
(MEM REQ)
BUFFERS
DISABLE
(MEM READ)
(MEM WRITE)
REFRESH CONTROL
605
607
(FAULT)
569
508 ($A_3$–$A_7$)
507
TO: REGULATOR (550) (INHIBIT RESET)
FROM: REGULATOR (550) (PNN RESET)
636
(MEM. SAFE)
(SAFE N.V)
(ENABLE)
638
(N.V. MEMORY SELECT)
PROTECTIVE CIRCUITRY
MEMORY CONTROL
+10v (s)
REFRESH ADDRESS
WATCH DOG TIMER & FAULT FLAG
(REFRESH)
601
FUNCTION DECODE & READY SECTION
(READY)
(ENABLE)
(READY)
(SET)
(RESET)
614
509
WR: WO: SYNC
DBIN: MEMR:
INP: OUT: MI
INTE: HALT A:
STACK: WAIT:
610
N.V. MEMORY
+10v(s)
ADDRESS
(READY/WRITE)
(READY)
(SELECT)
(ENABLE)
BUFFERS
507
ADDRESS ($A_0$–$A_{15}$)
634
DATA
DRIVERS
+10v
+12v
(LOAD)
ADDRESS IN
DATA IN
LATCHES
622
N.V. MEMORY DATA
INPUT MATRIX DATA
R.T. CLOCK DATA
MULTIPLEXER
624
BUFFERS
620
508
DATA ($D_0$–$D_7$)
508
604
507
MATRIX INPUT SELECT
$A_2$
$A_0$
(LOAD)
TO: 621
$D_0$–$D_7$

LEGEND:
CF - CONTROLLER FAULT
BF - BUS FAULT
RF - REMOTE FAULT

MACHINE INTERRUPT ROUTINE

LEGEND:
PNTR-POINTER
INCRM-INCREMENT
REL-RELATIVE
ADDR-ADDRESS
SR-SHIFT REGISTER
REG-REGISTER
SUBR-SUBROUTINE

REPRODUCTION MACHINE HAVING DUPLEX JOB RECOVERY CAPABILITIES

BACKGROUND OF THE INVENTION

This invention relates to a reproduction machine capable of making duplex copies from a set of original documents. More particularly, it involves a control system for automatically adjusting the reproduction process of such a machine in the event of a fault condition so that the selected number of copies are ultimately produced even though some copies may have been lost due to the fault occurring during the middle of a copy run.

As processing speeds of modern day reproduction machines become increasingly faster, and machine accessories such as sorters, collators, binders, document handlers, etc. become more prevalent, the problem of recouping or saving a specific job in the event of a machine malfunction or fault condition, such as, for example, a paper jam, becomes almost impossible. It will be understood that protection against fault conditions like paper jams is provided through safety controls designed to stop the machine, as well as any accessories used therewith. The jammed papers, which are usually damaged or mutilated, are then removed and the machine restarted. However, loss of these partially processed copies upsets the copy run, since, if the system is merely restarted, the number of copies made will not equal the number of copies selected. This, of course, is due to the loss of some copies in clearing the machine.

Thus, to ultimately produce the number of copies selected, some provision for making up the copies lost as a result of clearing the jam must be made. Unfortunately, this is an extremely task in modern high speed reproduction machines, particularly those employing accessories such as a document handler, since it is difficult to determine exactly how many copies are actually lost and to identify those copies lost with the correct original. Rather than go through a complicated evaluation, many users may tend to simply start the entire copy run anew, discarding even those copies which have been successfully completed. This, of course, can be quite wasteful and expensive, particularly where the job is large and almost completed at the time of the jam.

As described in U.S. Pat. No. 3,944,794 to Reehil et al, the Xerox 9200 copier/duplicator system incorporates a jam recovery technique that has proven to be extremely satisfactory. However, this machine does not include provision for automatically making two sided or duplexed copies. Instead, it merely provides the capability of producing one sided or simplex copies automatically. It is realized that some of the more recent commercially available machines provide the capability of automatically producing duplex copies. However, due to the extreme complexity of such machines, they have not included provision for automatically remaking lost copies in the event of fault conditions.

OBJECTS AND SUMMARY OF THE INVENTION

Therefore, it is the primary object of this invention to provide a method of controlling a reproduction machine to produce duplex copies from a set of original documents and for automatically adjusting the reproduction process in the event of a fault condition so that the selected number of copies are ultimately produced even though some copies have been lost due to the fault.

Another object of this invention is to provide a control system for a reproduction machine with automatically divides the copy run into a plurality of sets of lesser quantity if the selected quantity exceeds the capacity of the machine for the various accessory features selected.

These and other objects of this invention are accomplished by storing the quantity of exposures and delivered copies for each original necessary for successfully completing the selected copy run. A running count of the exposures made from each original is made, as is the number of successfully delivered copies thereof. Means are provided for signalling whether side 1 or side 2 copies are being delivered. In the event of a side 2 delivery fault, the number of side 2 copies successfully delivered is utilized to reset the exposures made and copies delivered counters for the side 1 and side 2 recovery originals which are represented to the machine for remaking lost copies due to the fault.

In a preferred embodiment, the side 1 original is presented to the machine for forming finished copies thereof, with the side 1 copies being delivered to a temporary receptacle. The actual number of exposures made for each original is counted, as is the number of copies actually delivered. The side 2 original is presented to the machine only if there is both exposure and delivery coincidence for the side 1 copies. If so, duplex copies are formed by forming finished copies of the side 2 original on the opposite side of the side 1 copies which are fed from the temporary receptacle. In order to optimize the machine speed, the next side 1 original may be placed on the platen and exposed as soon as there is side 2 exposure coincidence. However, the number of duplex copies subsequently delivered to an output receptacle is also detected and compared with the stored quantity of copies to be delivered for necessary completion. The above procedure is repeated in the event of a fault condition until side 1 and side 2 exposure and delivery coincidences are both met thereby remaking any lost copies due to a fault condition.

The reproduction machine may contain a plurality of accessory features each with a given capacity for processing copies at one time. Their respective capacities are stored and later compared with the number of copies selected by the operator. The copy run is divided into a plurality of sets of lesser quantity if the quantity selected exceeds the capacity of the machine for the features selected.

BRIEF DESCRIPTION OF THE DRAWINGS

Other objects and advantages will be apparent from the ensuing description and drawings in which:

FIG. 21 is a logic schematic of the CPU memory ready;

FIGS. 23*a* and 23*b* comprise a block diagram of the controller I/O module;

FIG. 24 is a logic schematic of the nonvolatile memory power supply;

DETAILED DESCRIPTION OF THE PREFERRED EMBODIMENT OF THE INVENTION

Figure 1:
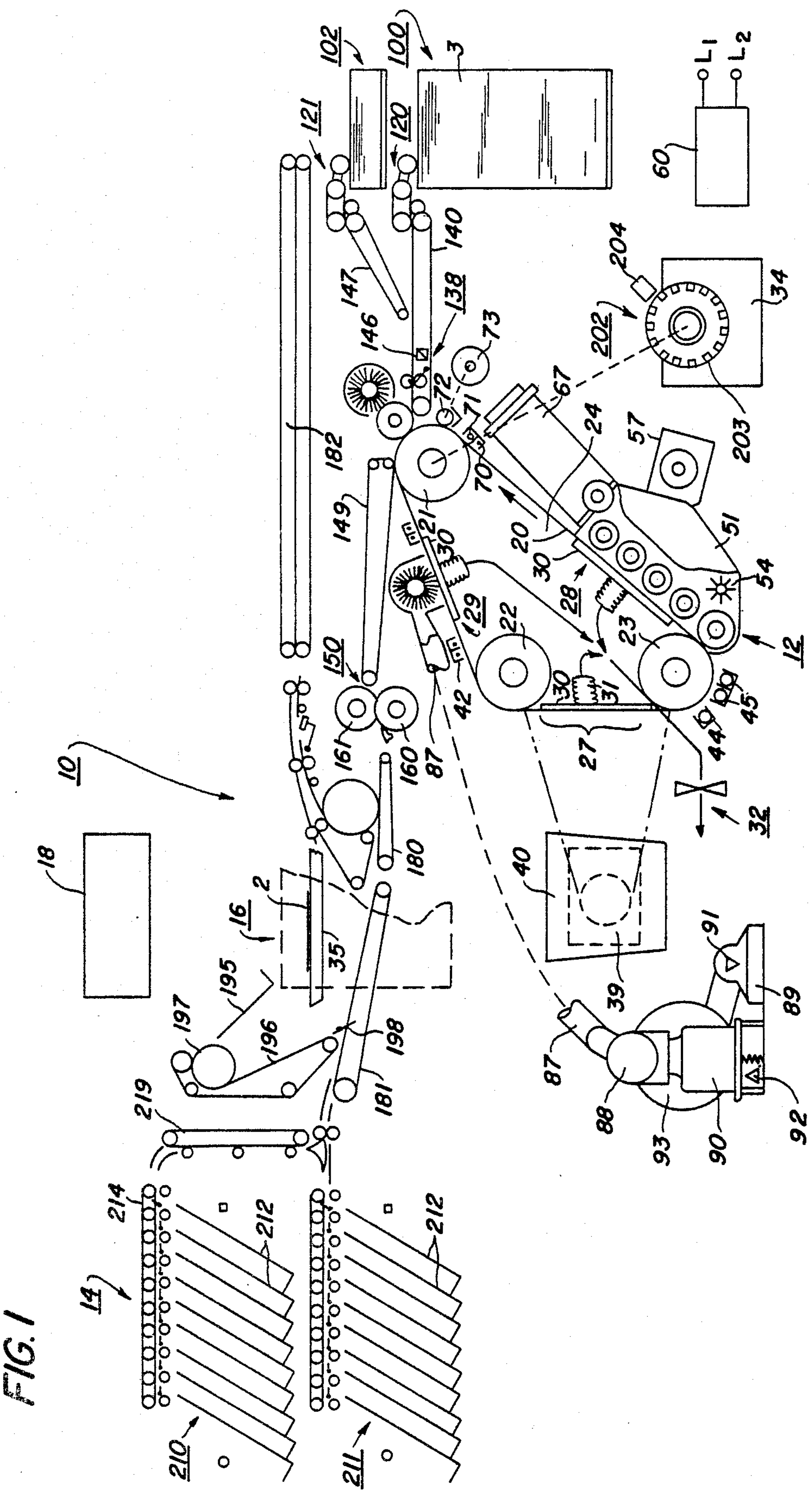
FIG. 1 is a schematic representation of an exemplary reproduction apparatus incorporating the control system of the present invention.
Figure 2:
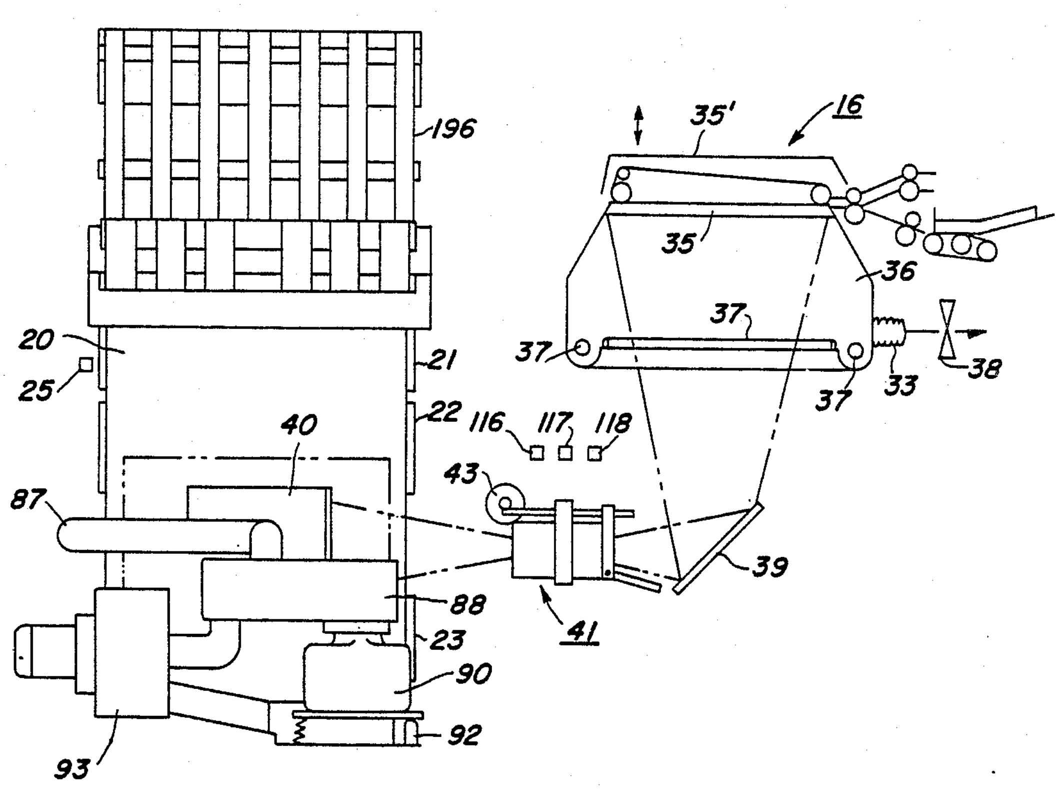
FIG. 2 is a vertical sectional view of the apparatus shown in FIG. 1 along the image plane.
Figure 3:
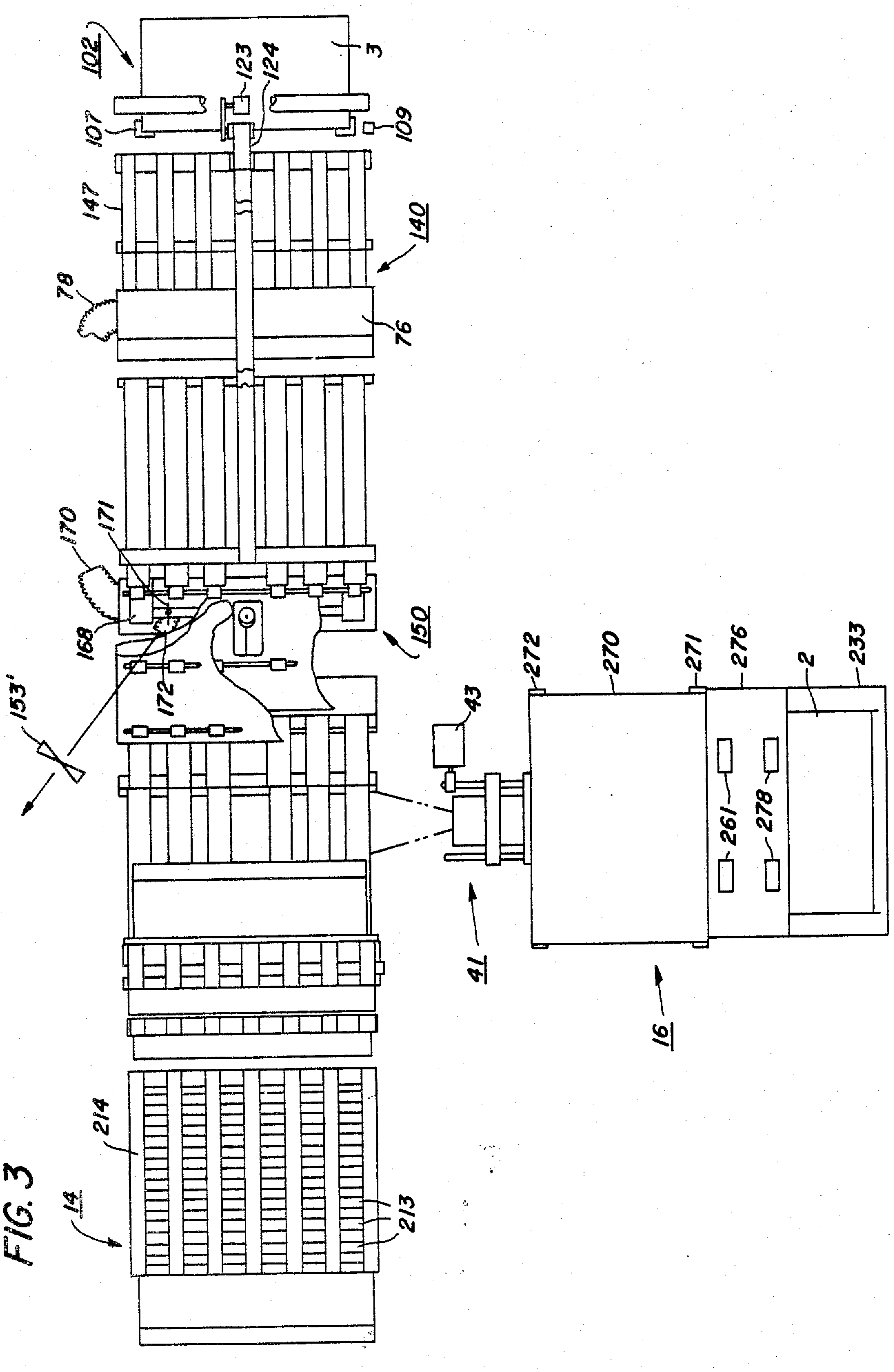
FIG. 3 is a top plane view of the apparatus shown in FIG. 1.

Referring particularly to FIGS. 1–3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerograhic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
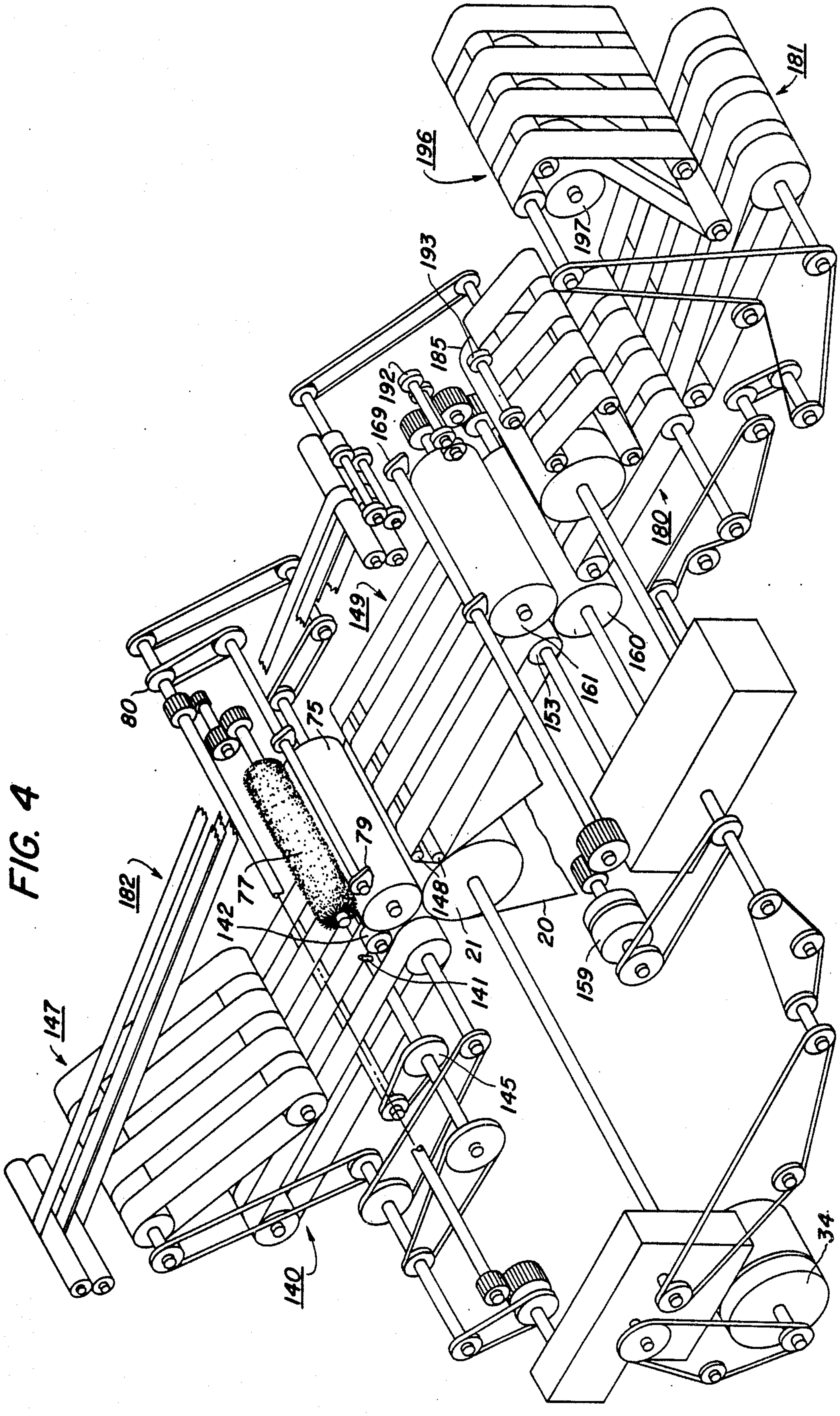
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
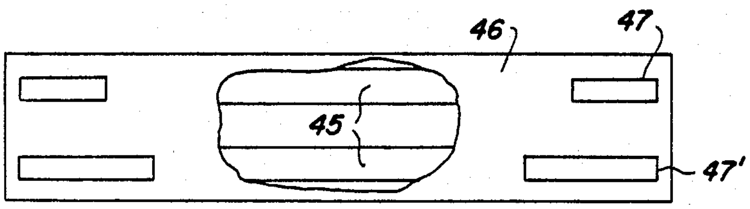
FIG. 5 is an enlarged view showing details of the photoreceptor edge fadeout mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
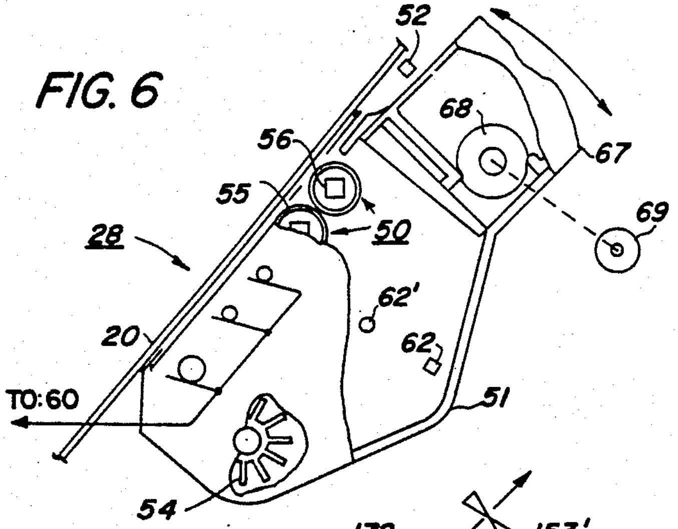
FIG. 6 is an enlarged view showing details of the developing mechanism for the apparatus shown in FIG. 1.
Figure 7:
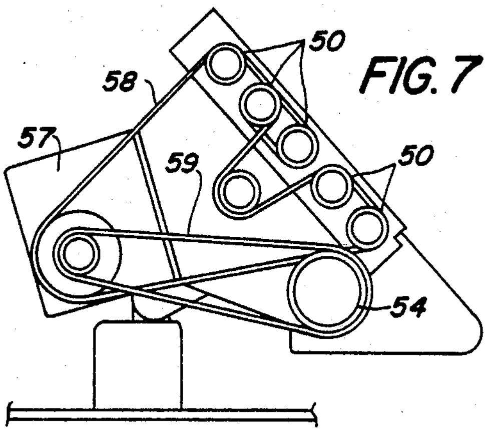
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
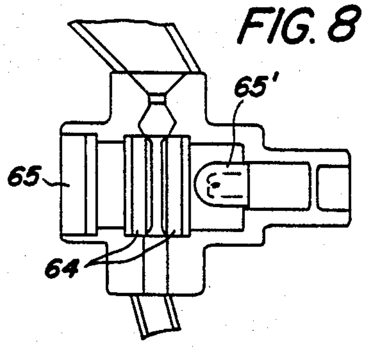
FIG. 8 is an enlarged view showing details of the developability control for the apparatus shown in FIG. 1.
Figure 11:
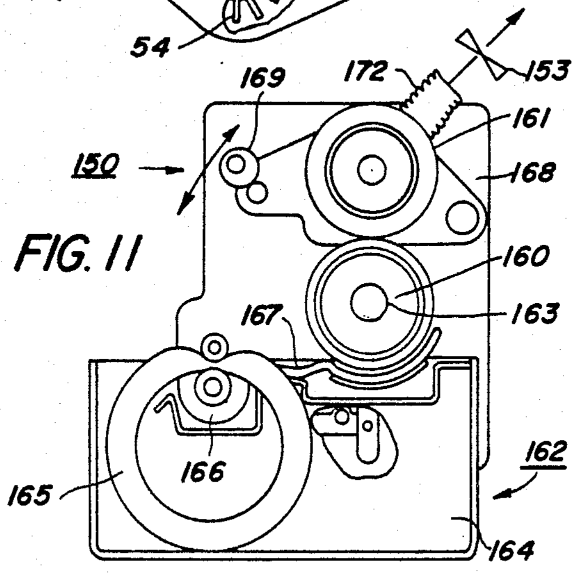
FIG. 11 is an enlarged view showing details of the fuser for the apparatus shown in FIG. 1.

Developing material is returned to the upper portion of developer housing 51 for reuse and is accomplished by utilizing a photocell 62 which monitors the level of developing material in housing 51 and a photocell lamp 62' spaced opposite to the photocell 62 in cooperative relationship therewith. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plate 64. The accumulation of toner, i.e. density determines the amount of light transmitted from lamp 65' to photocell 65. Photoell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
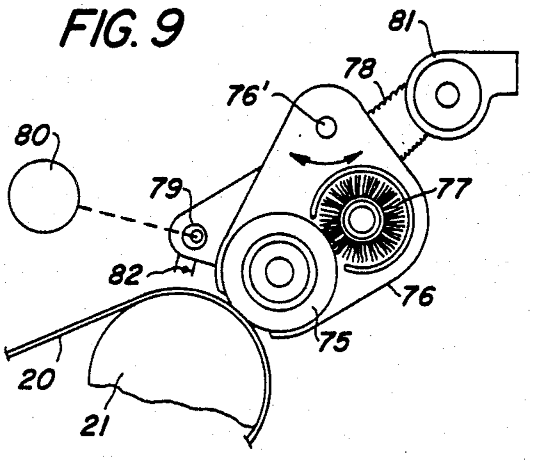
FIG. 9 is an enlarged view showing details of the transfer roll support mechanism for the apparatus shown in FIG. 1.
Figure 12:
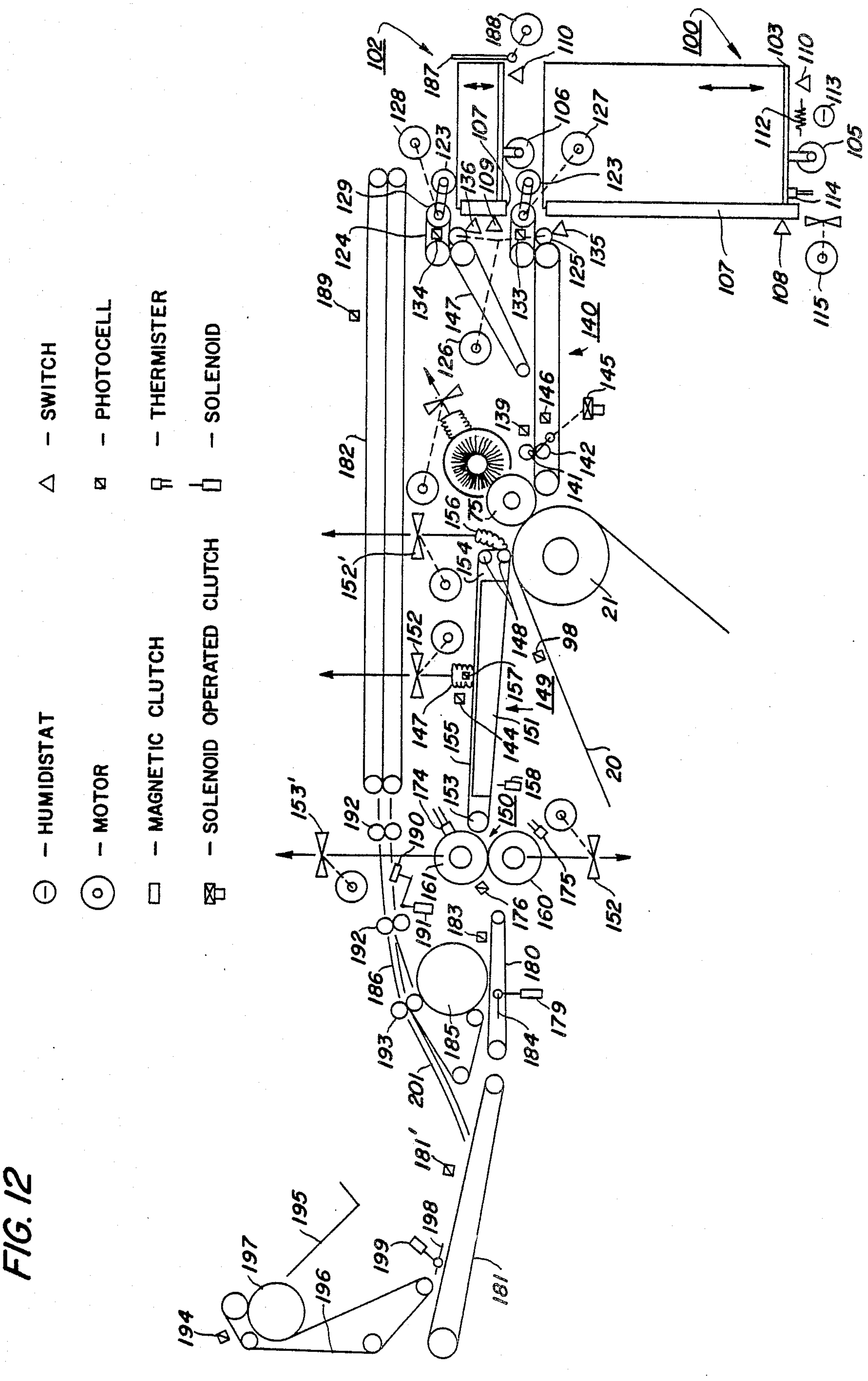
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted at 76' to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
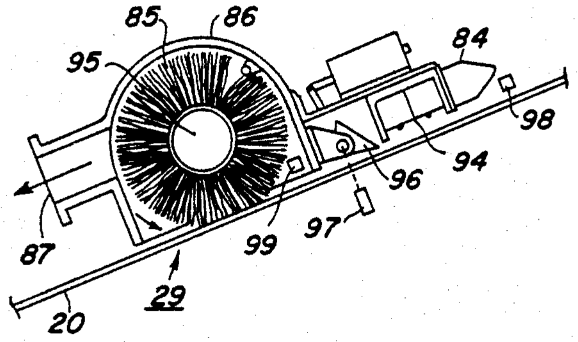
FIG. 10 is an enlarged view showing details of the photoreceptor cleaning mechanism for the apparatus shown in FIG. 1.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semi-circular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. The forward stop 187 of tray 102 is supported for oscillating movement. Motor 188 drives stop 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
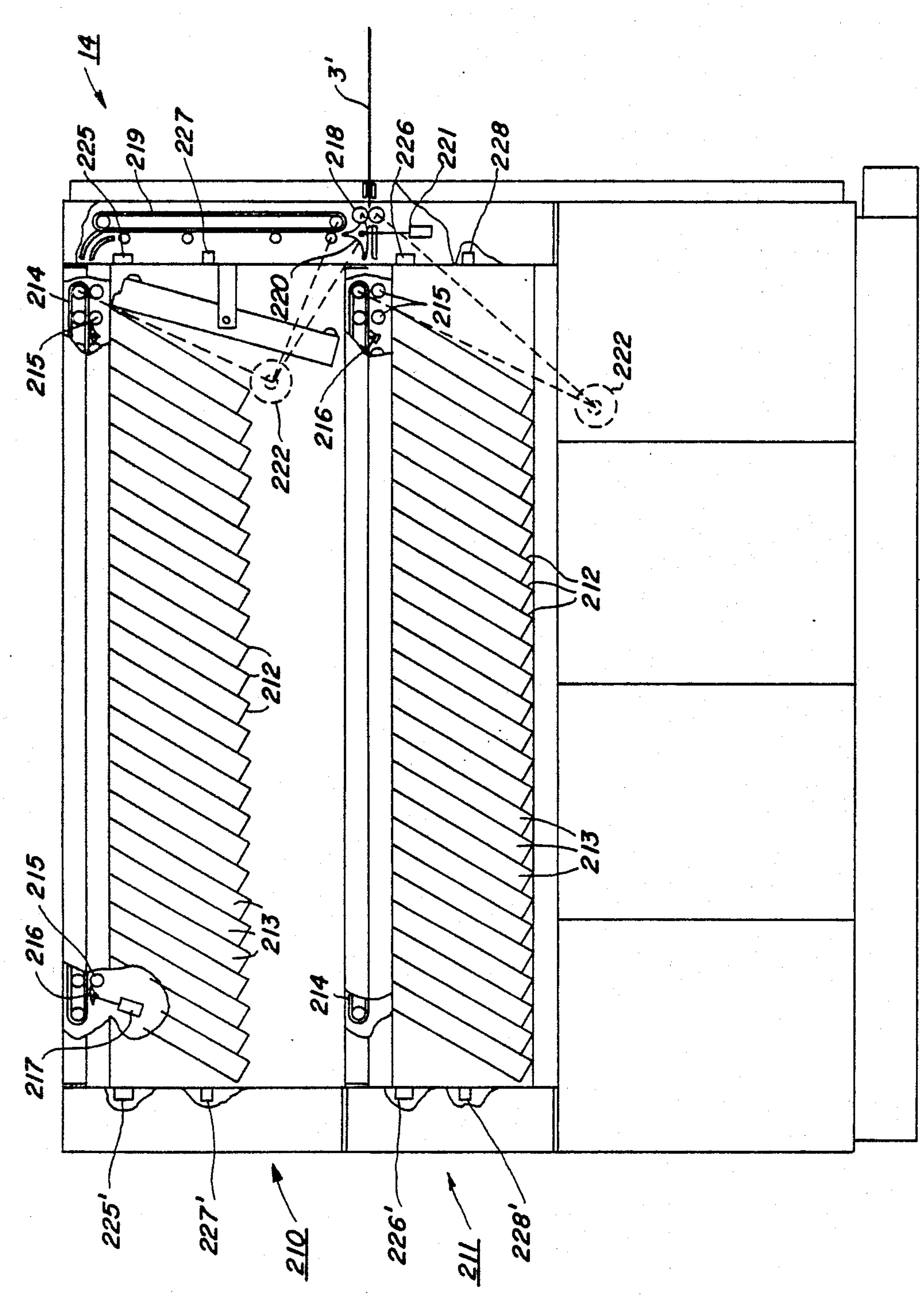
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays, forming a series of individual bins 213 for receipt of finished copies 3'. Conveyors 214 along the top of each bin array, cooperate with idler rolls 215 adjacent the inlet to each bin to transport the copies into juxtaposition with the bins. Individual defelctors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided for each bin array to drive the conveyors 214 and 219 of upper bin array 210 and conveyor 214 of lower bin array 211. Roll pair 218 is drivingly coupled to both motors.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Reference lamps 227', 228' are disposed opposite sensors 227, 228.

DOCUMENT HANDLER

Figure 14:
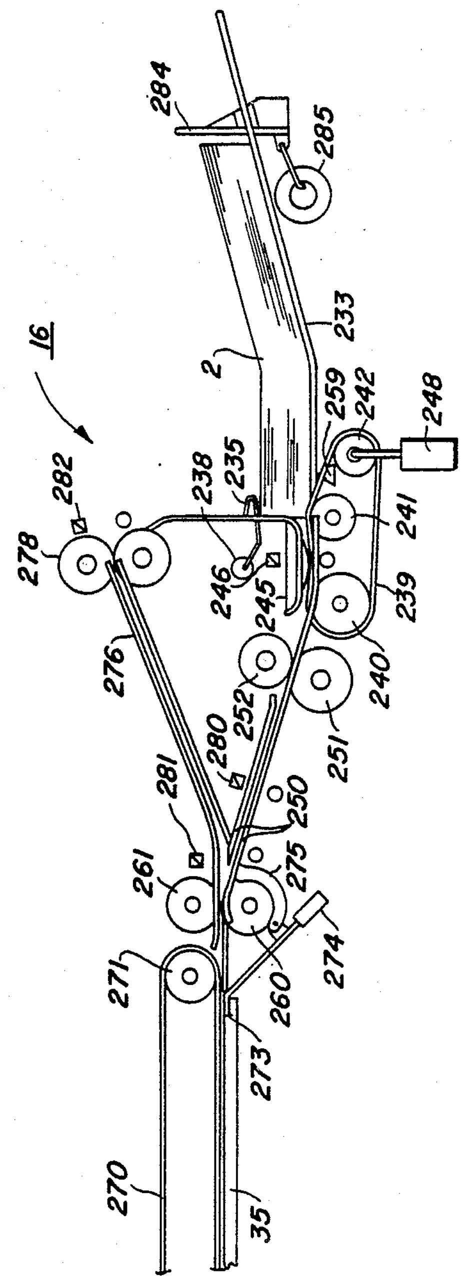
FIG. 14 is a schematic view showing details of the document handler for the apparatus shown in FIG. 1.
Figure 15:
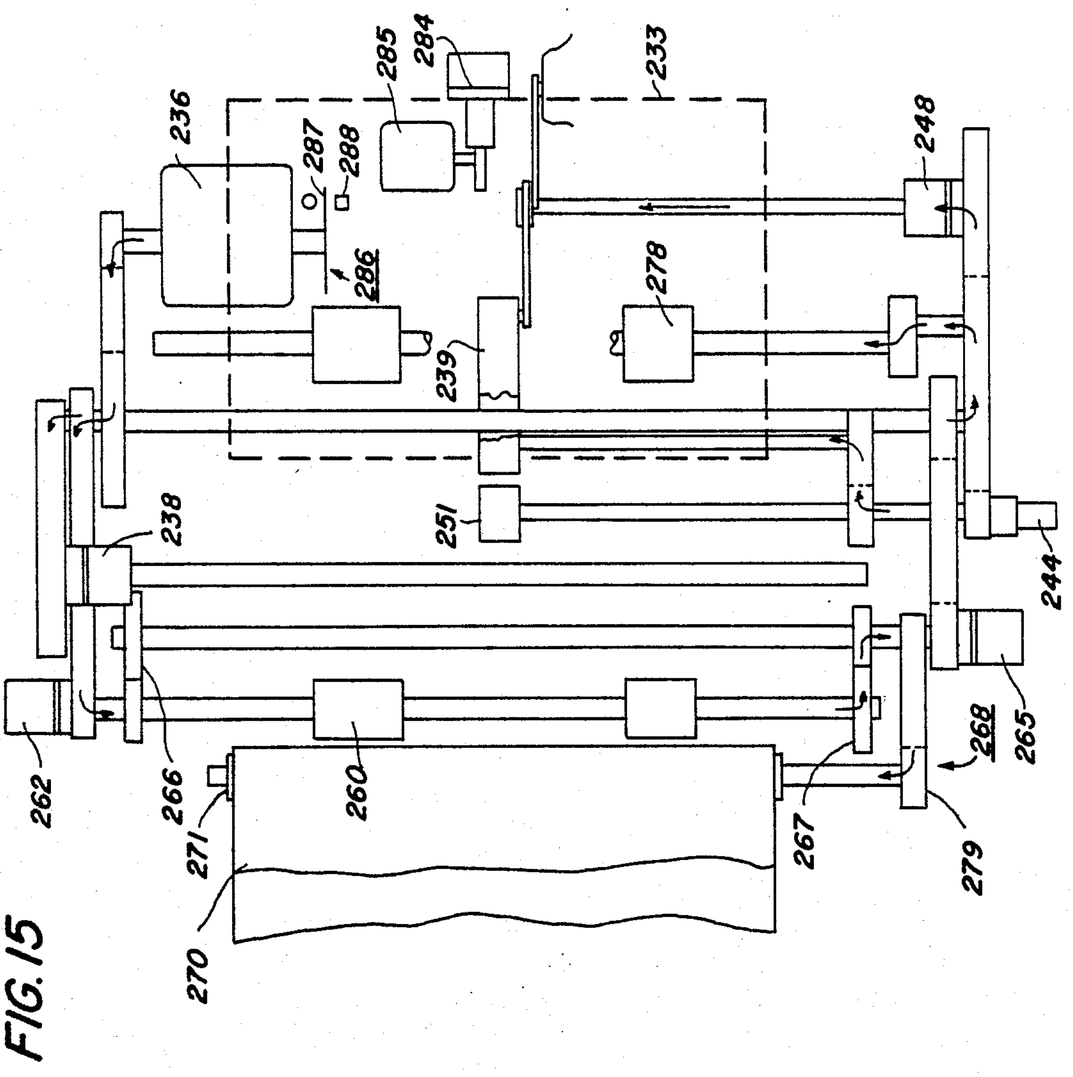
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail bar or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine driven clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
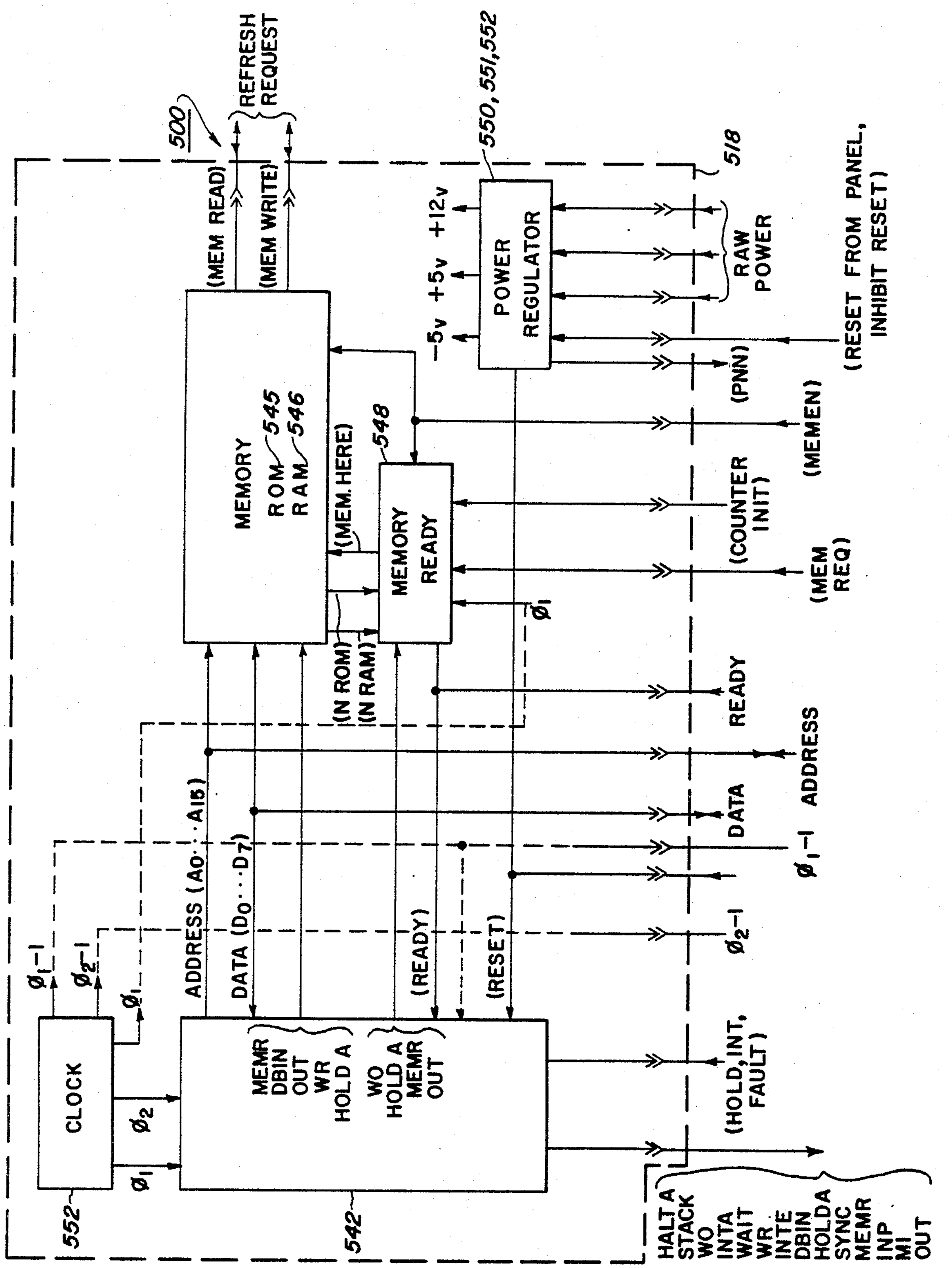
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock derived from clock 552 of FIG. 17, is utilized to control internal operations of the controller 18 as is known in the art, as well as the timing of some of the machine components.

CONTROLLER

Figure 16:
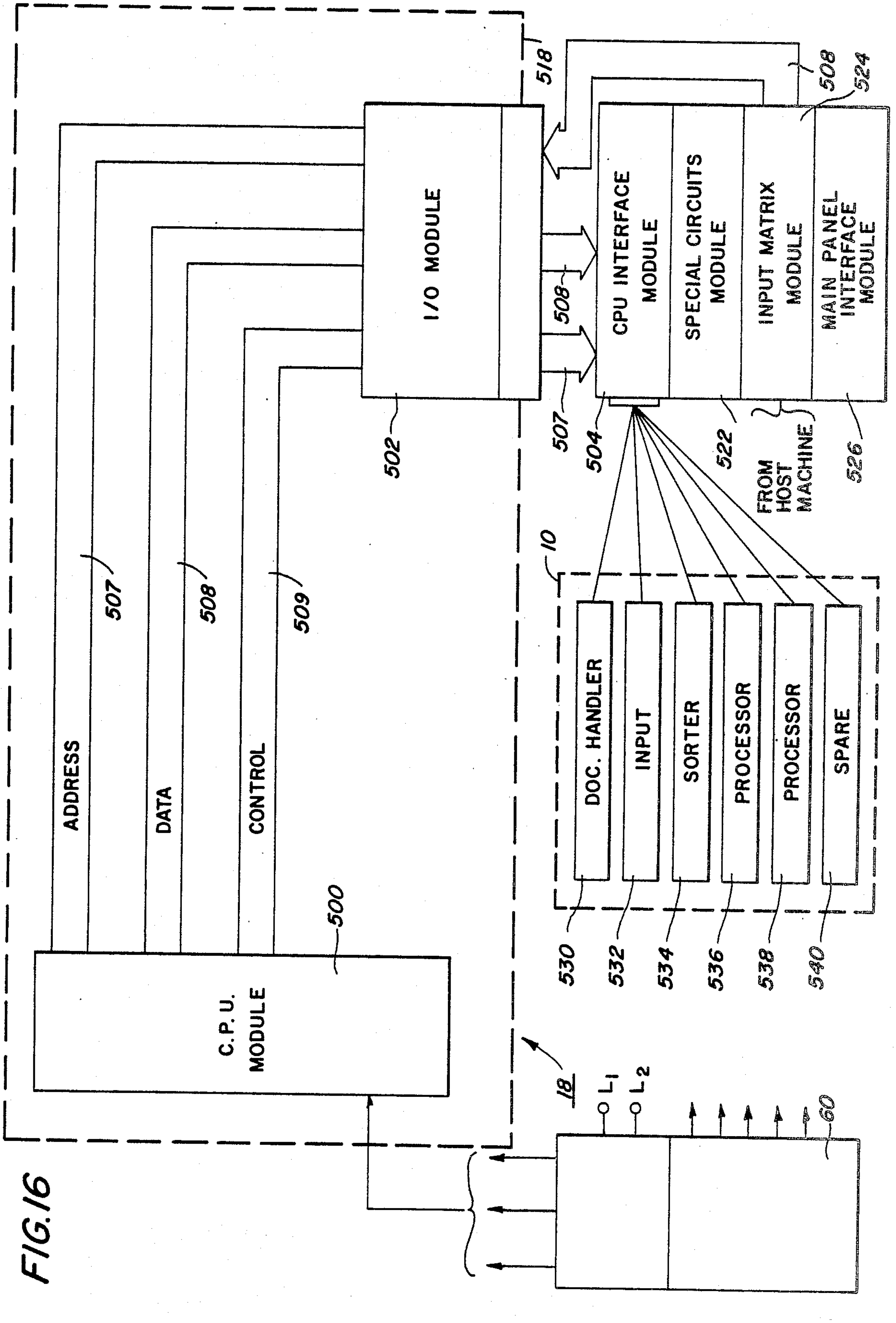
FIG. 16 is a block diagram of the controller for the apparatus shown in FIG. 1.

Referring to FIG. 16, controller 18 includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise inteference.

Interface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
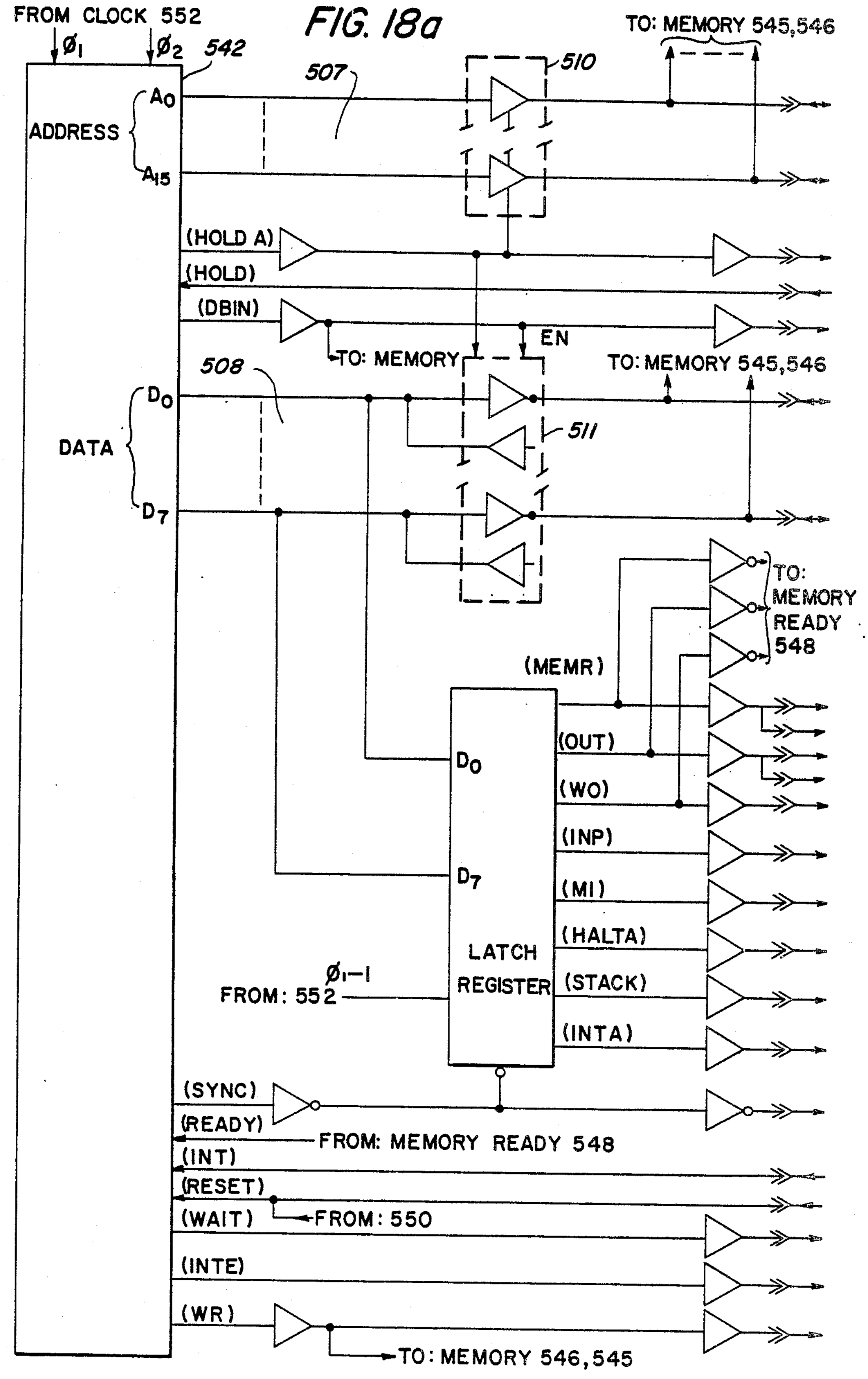
FIG. 18*a* is a block diagram showing the CPU microprocessor input/output connections.
Figure 18B:
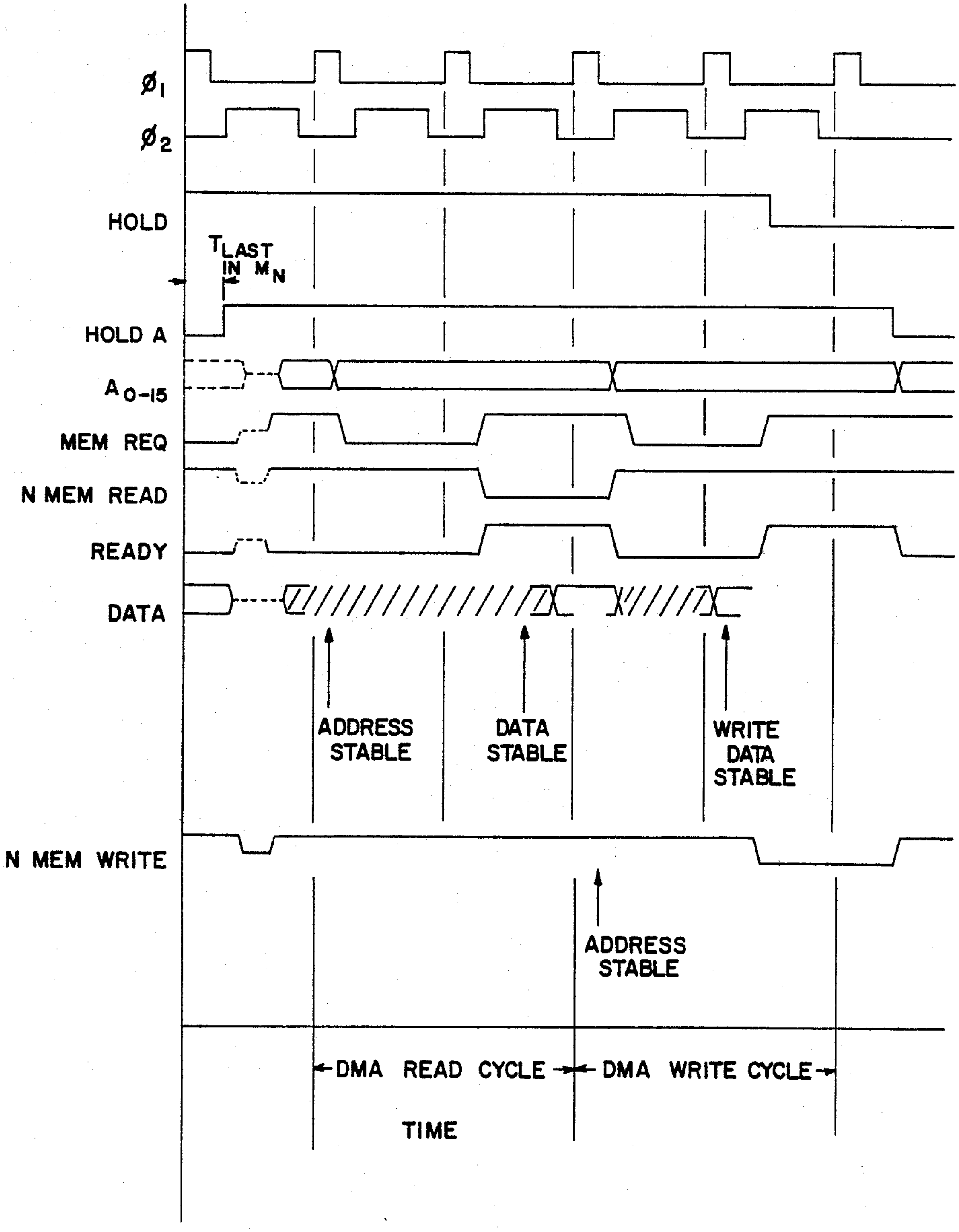
FIG. 18*b* is a timing chart of Direct Memory access (DMA) Read and Write cycles.

Referring to FIGS. 17, 18 CPU module 500 comprises a processor 542 such as an Intel 8080 microprocessor manufactured by Intel Corporation, Santa Clara, Calif., 16K Read Only Memory (herein ROM) and 2K Random Access Memory (herein RAM) sections 545, 546, Memory Ready section 548, power regulator section 550, and onboard clock 552. Bipolar tristate buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
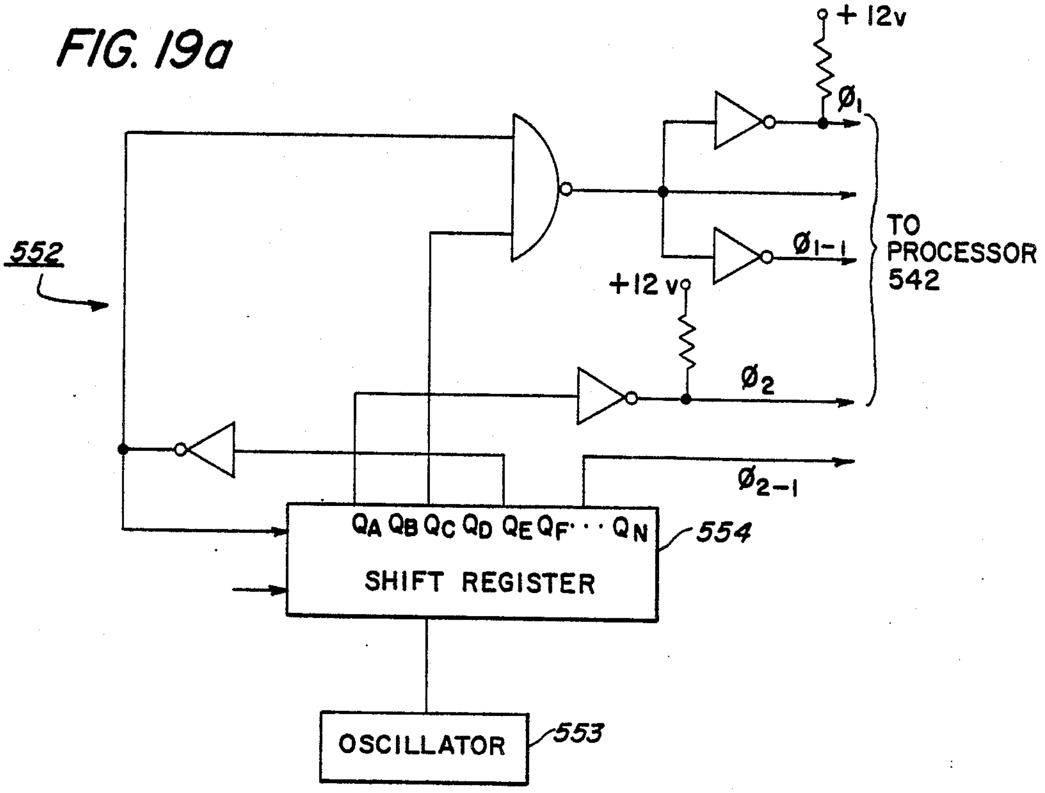
FIG. 19*a* is a logic schematic of the CPU clock.
Figure 19B:
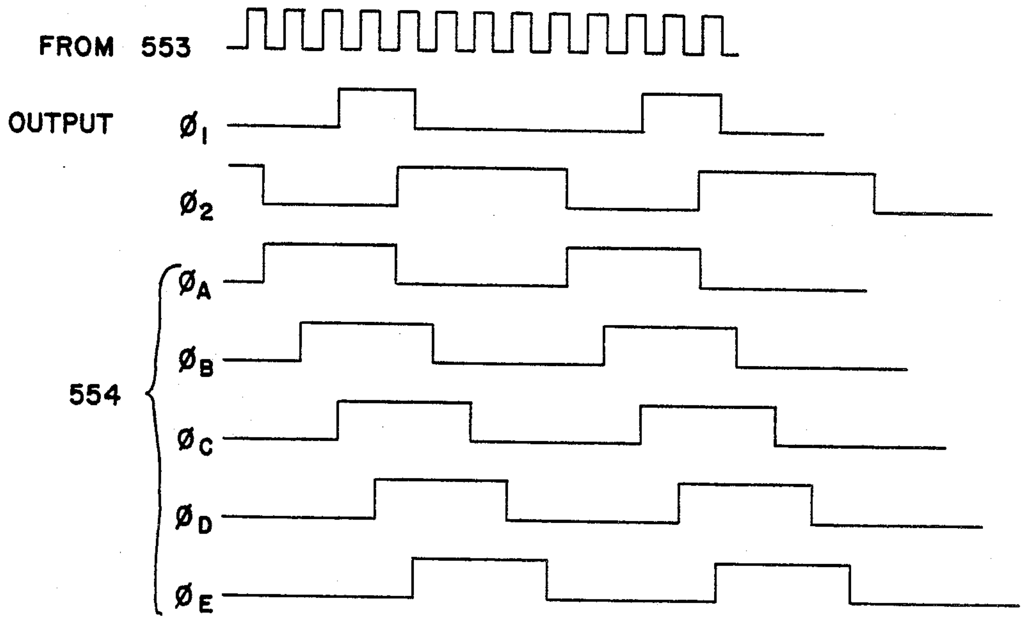
FIG. 19*b* is a chart illustrating the output wave form of the clock shown in FIG. 19*a*.

Referring particularly to FIG. 19, clock 552 comprises a suitable clock oscillator 553 feeding a multi-bite (Qa–Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Figure 20:
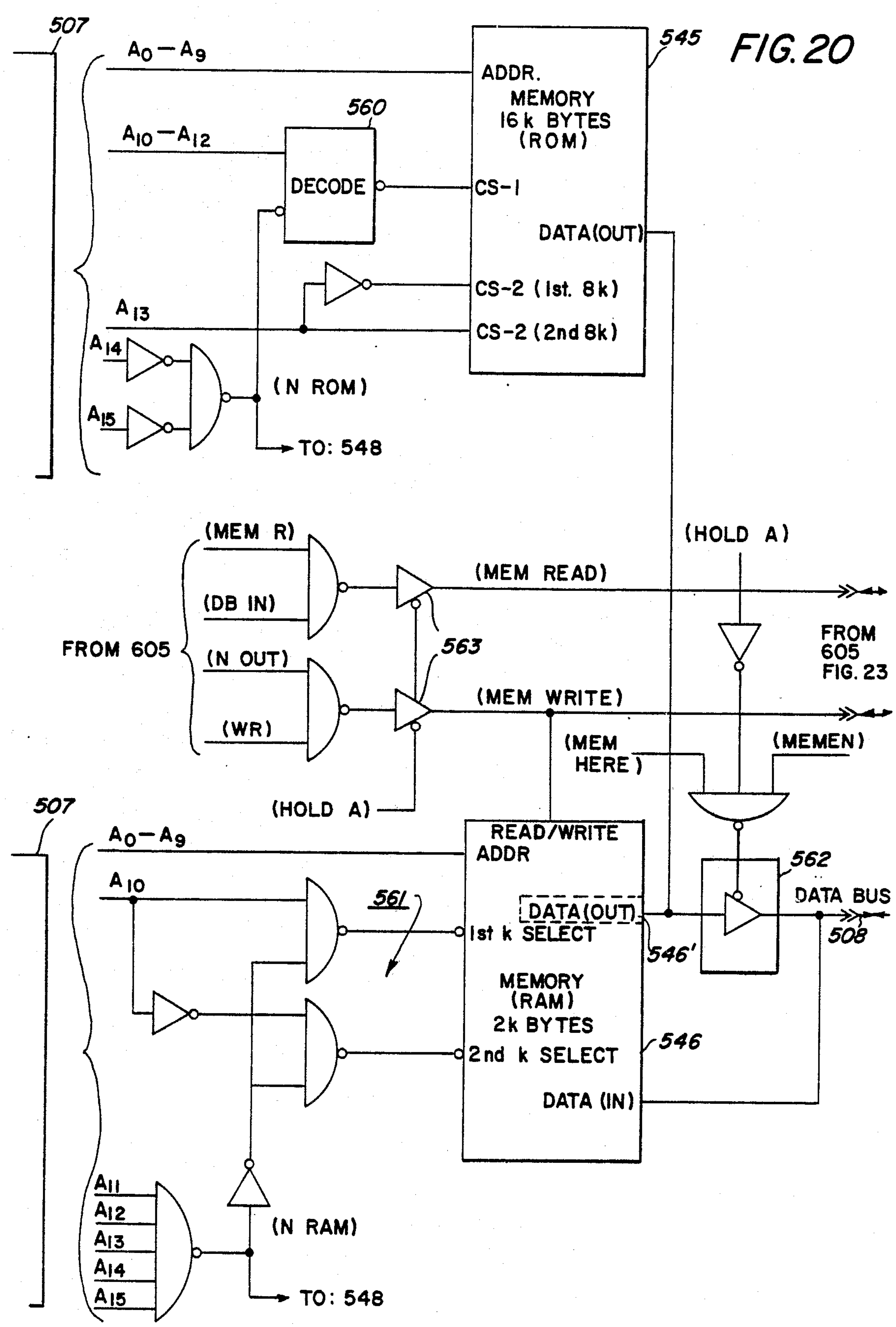
FIG. 20 is a logic schematic of the CPU memory.

Referring to FIG. 20, the memory bytes in ROM section 545 are implemented by address signals (A 0–A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total bytes of the addressing space. The memory bytes in RAM section 546 are implemented by Address signals (A 0–A 15) through selector circuit 561. Address bit A 10 serves to select the memory bank while the remaining five most significant bits (A 11–A 15) select the last 2K bytes out of the 64K bytes of addressing space. RAM memory section 546 includes a 40 bit output buffer the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
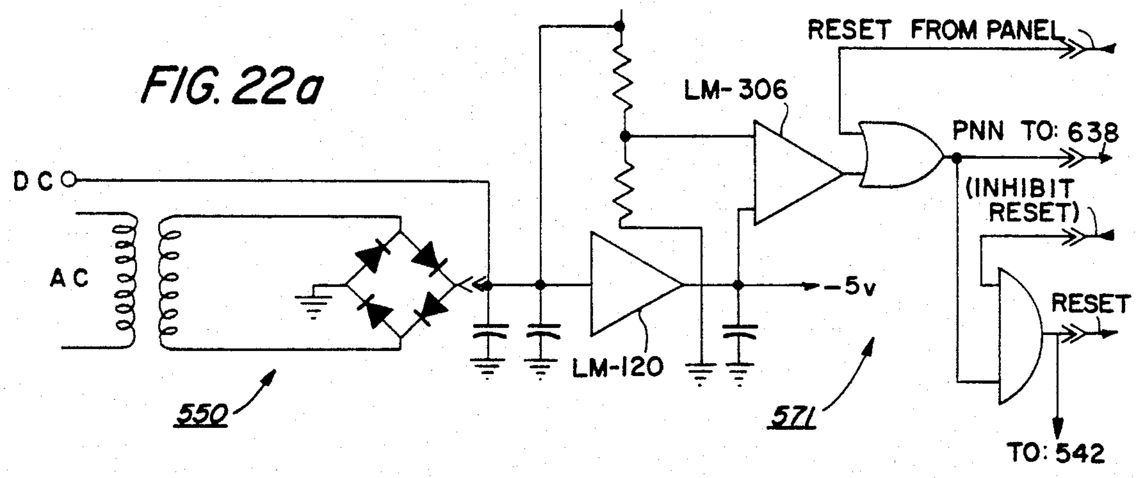
FIGS. 22*a*, 22*b*, 22*c* are logic schematics of the CPU power supply stages.
Figure 22B:
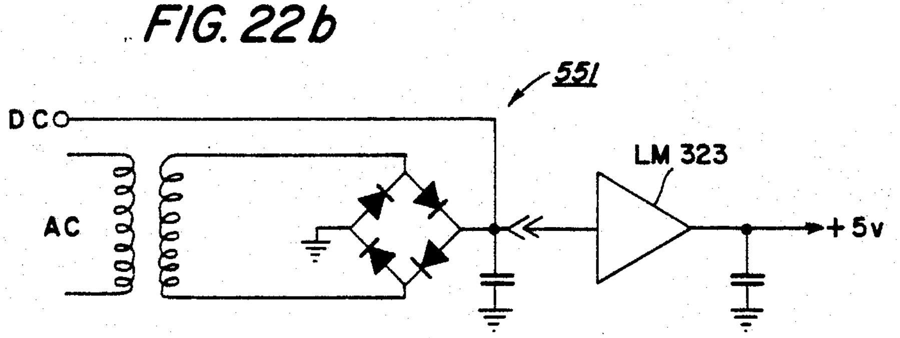
Figure 22C:
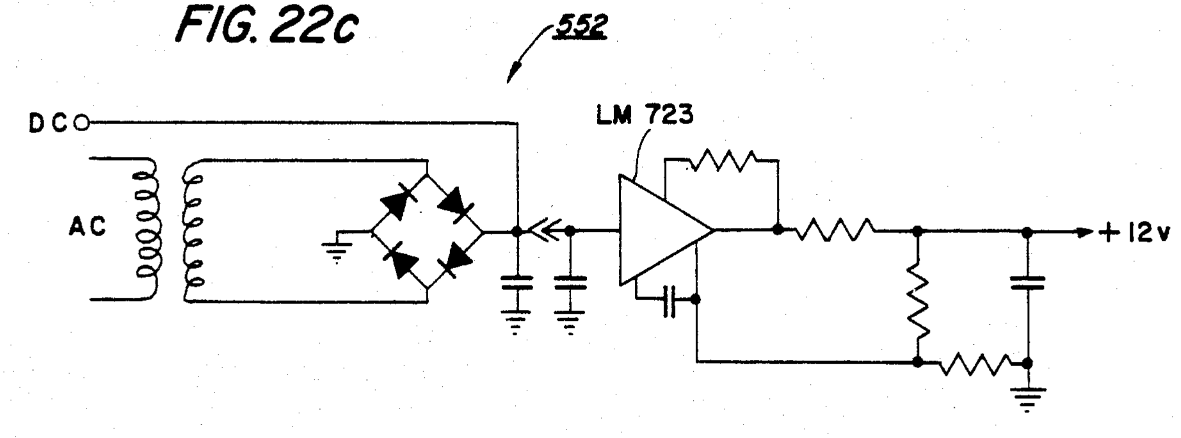

Referring to FIG. 22, power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN. An enabling signal (INHIBIT RESET) allows completion of a write cycle in Non Volatile (N.V.) Memory 610 of I/O Module 502.

Figure 23A:
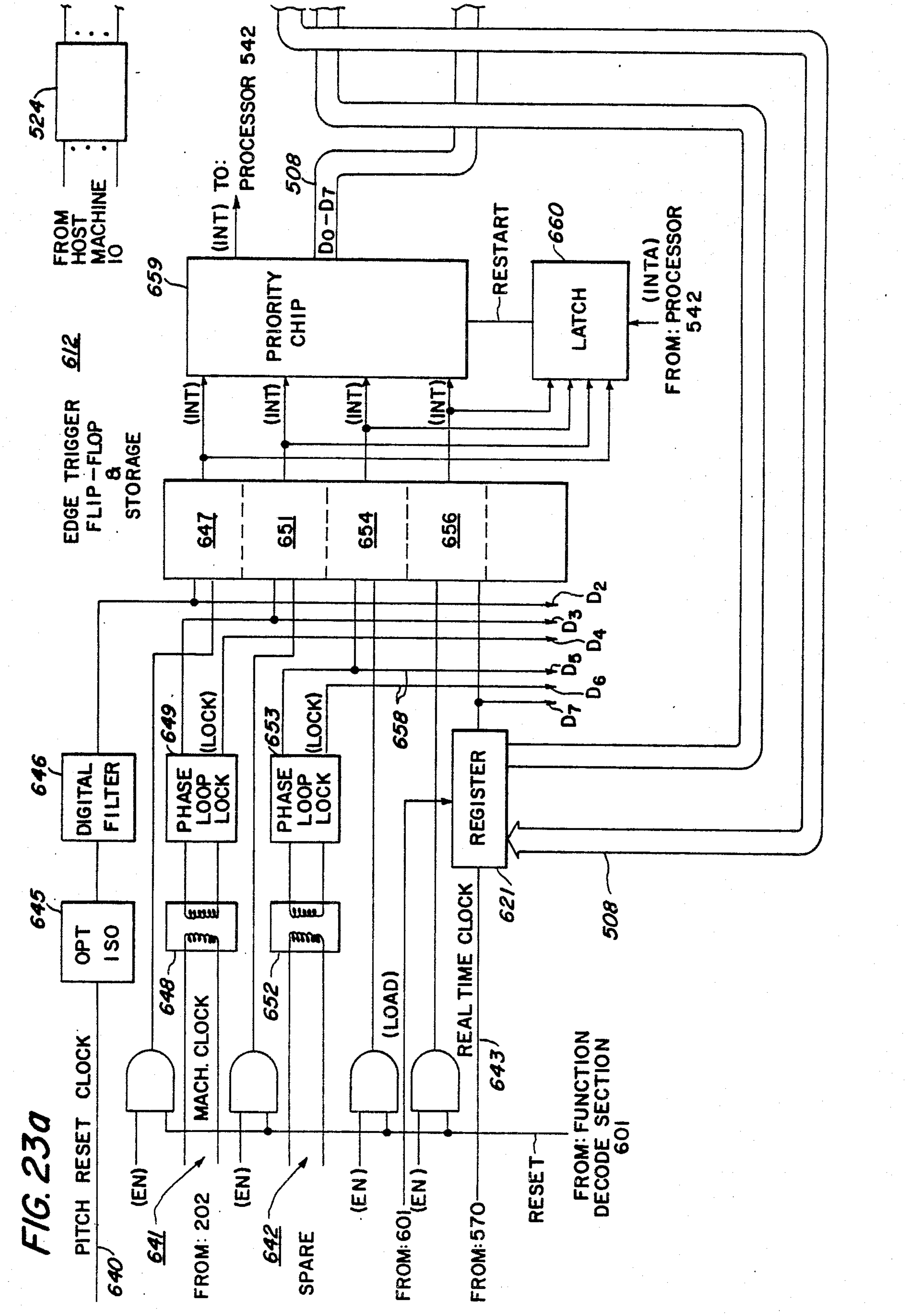

Referring to FIGS. 18, 20, 21, and the DMA timing chart (FIG. 18*a*) data transfer from RAM section 546 to host machine 10 is effected through Direct Memory Access (DMA), as will appear. To initiate DMA, a signal (HOLD) is generated by Refresh Control 605 (FIG. 23*a*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23, I/O Module 502 interfaces with CPU module 500 through bi-directional Address, Data and Control buses 507, 508, 509. I/O Module 502 appears to CPU module 500 as memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory access (DMA) by I/O module 502 to RAM section 546.

I/O module 502 includes Matrix Input select 604 (through which inputs from the host machine 10, are received), Refresh Control 605, Nonvolatile (NV) memory 610, Interrupt Control 612, Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits A 0–A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and softward malfunctions, comprises a free running counter which under normal circumstances is periodically reset by an output refresh command (REFRESH) from Function Decode Section 601. If an output refresh command is not received within a preset time interval, (i.e. 25m sec) a fault flip flop is set and a signal (FAULT) sent to the host machine 10. The signal (FAULT) also raises the HOLD line to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 has capacity to read up to 32 groups of eight discrete inputs from host machine 10. Lines $A_3$ through $A_7$ of Address bus 507 are routed to host machine 10 via CPU Interface Module 504 to select the desired group of eight inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from RAM memory output buffer 546' to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546' (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of non-volatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIGS. 23(*a*) and 34, the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until reenabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 522 (FIG. 19*a*). As described, clock 570 provides a reference clock pulse (in line 574) for synchronizing the output refresh data and is the source of clock pulses (in line 643) for driving Real Time register 621.

Figure 25:
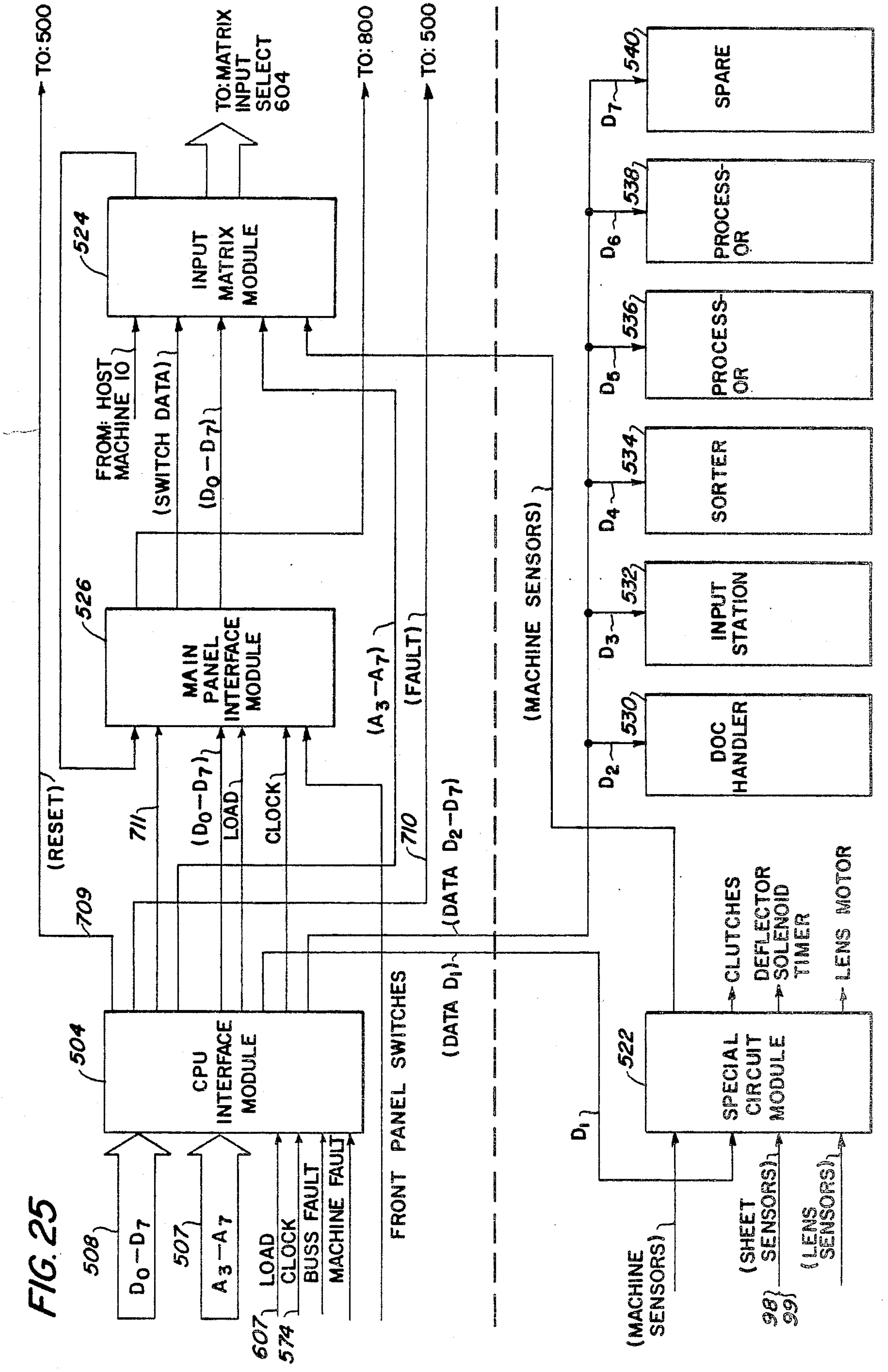
FIG. 25 is a block diagram of the apparatus interface and remote output connections.
Figure 26:
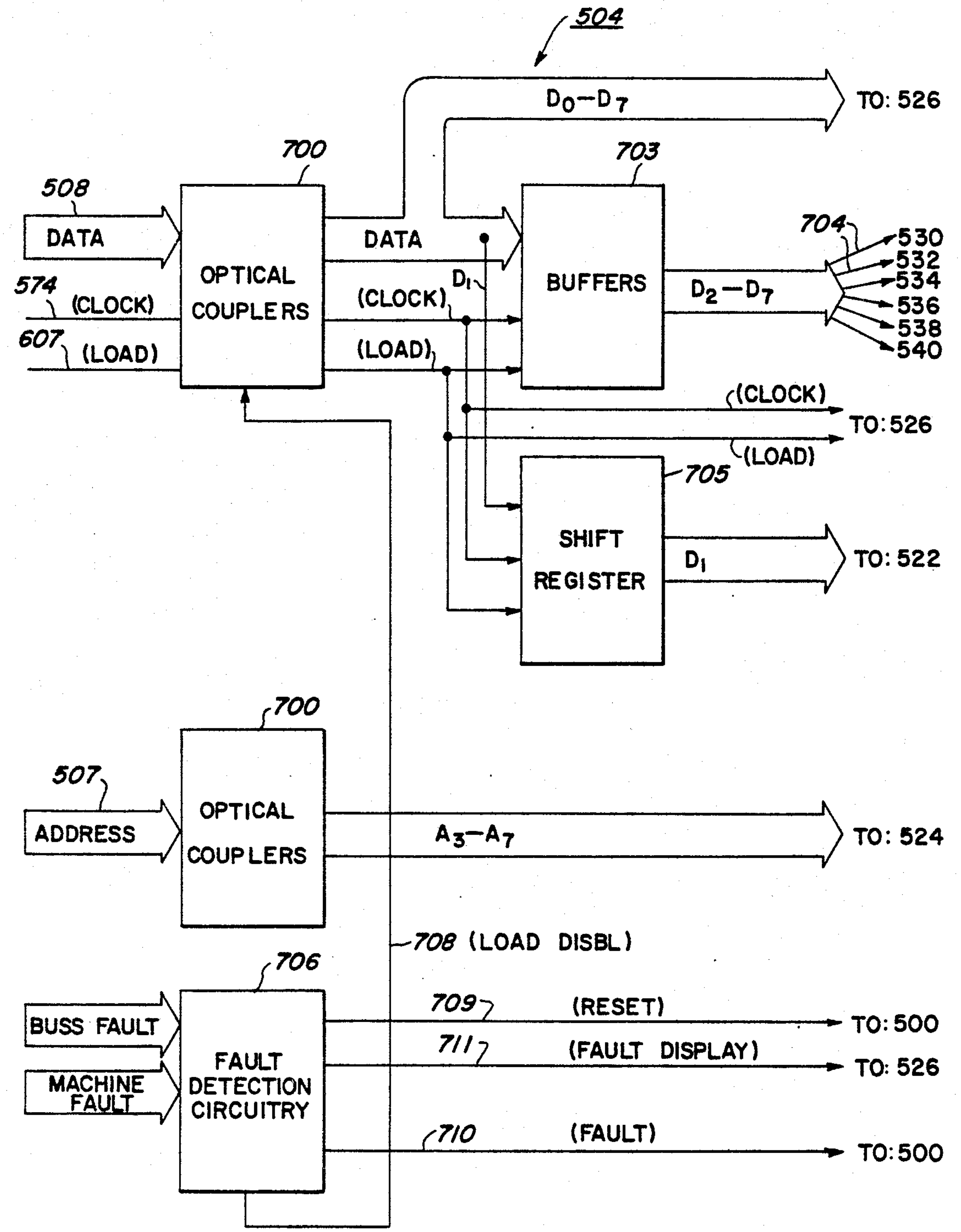
FIG. 26 is a block diagram of the CPU interface module.

CPU interface module 504 interfaces I/O module 502 with the host machine 10 and transmits operating data stored in RAM section 546 to the machine. Referring particularly to FIGS. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIG. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy," the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$, destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of bus fault, a reset signal (RESET) is generated automatically in line 709 to CPU module 500 (see FIGS. 17 and 18) until the fault is removed. In the event of a machine fault, a signal is generated by the CPU in line 710 to actuate a suitable relay (not shown) controlling power to all or a portion of host machine 10. A load disabling signal (LOAD DISBL) is inputted to optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Figure 27:
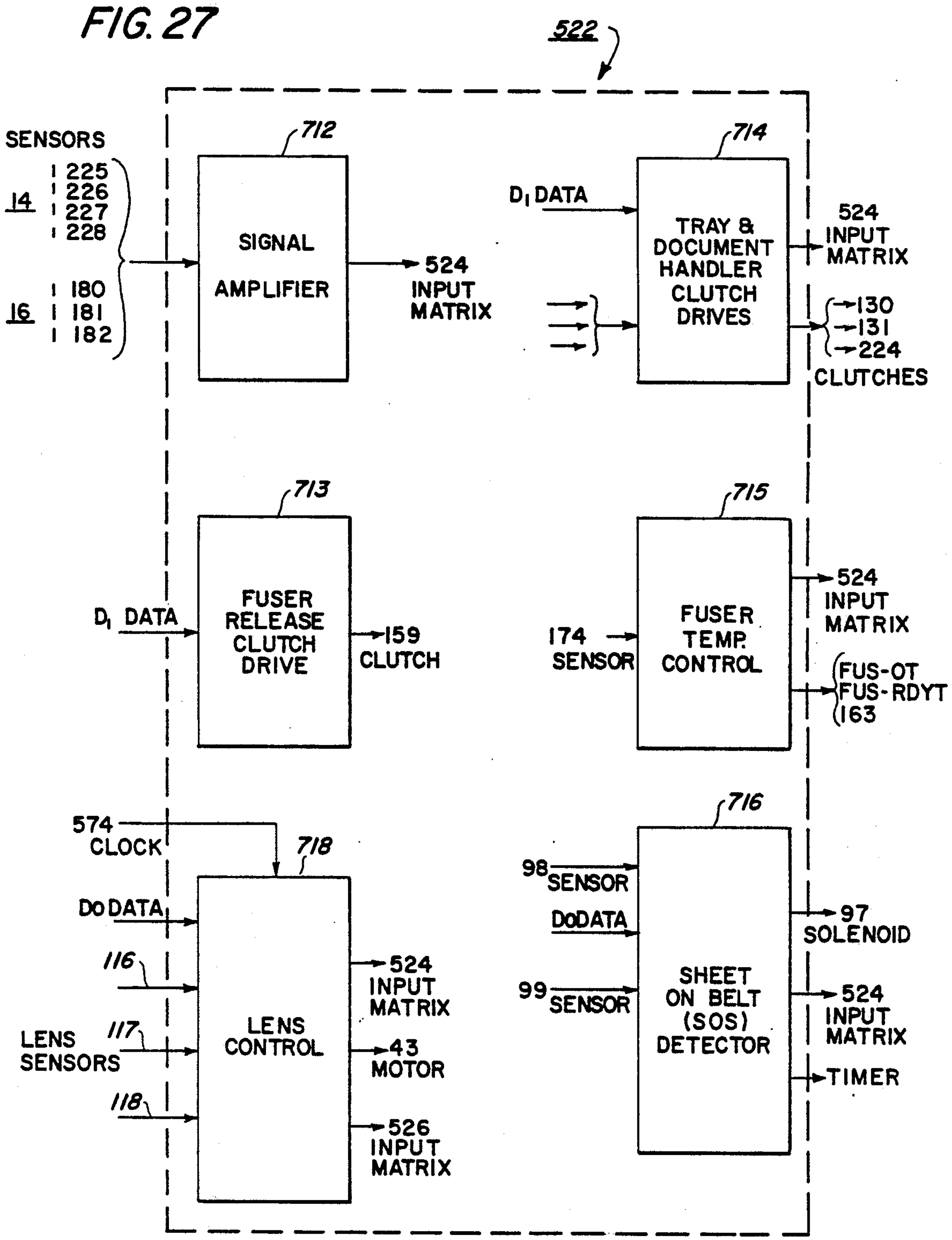
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
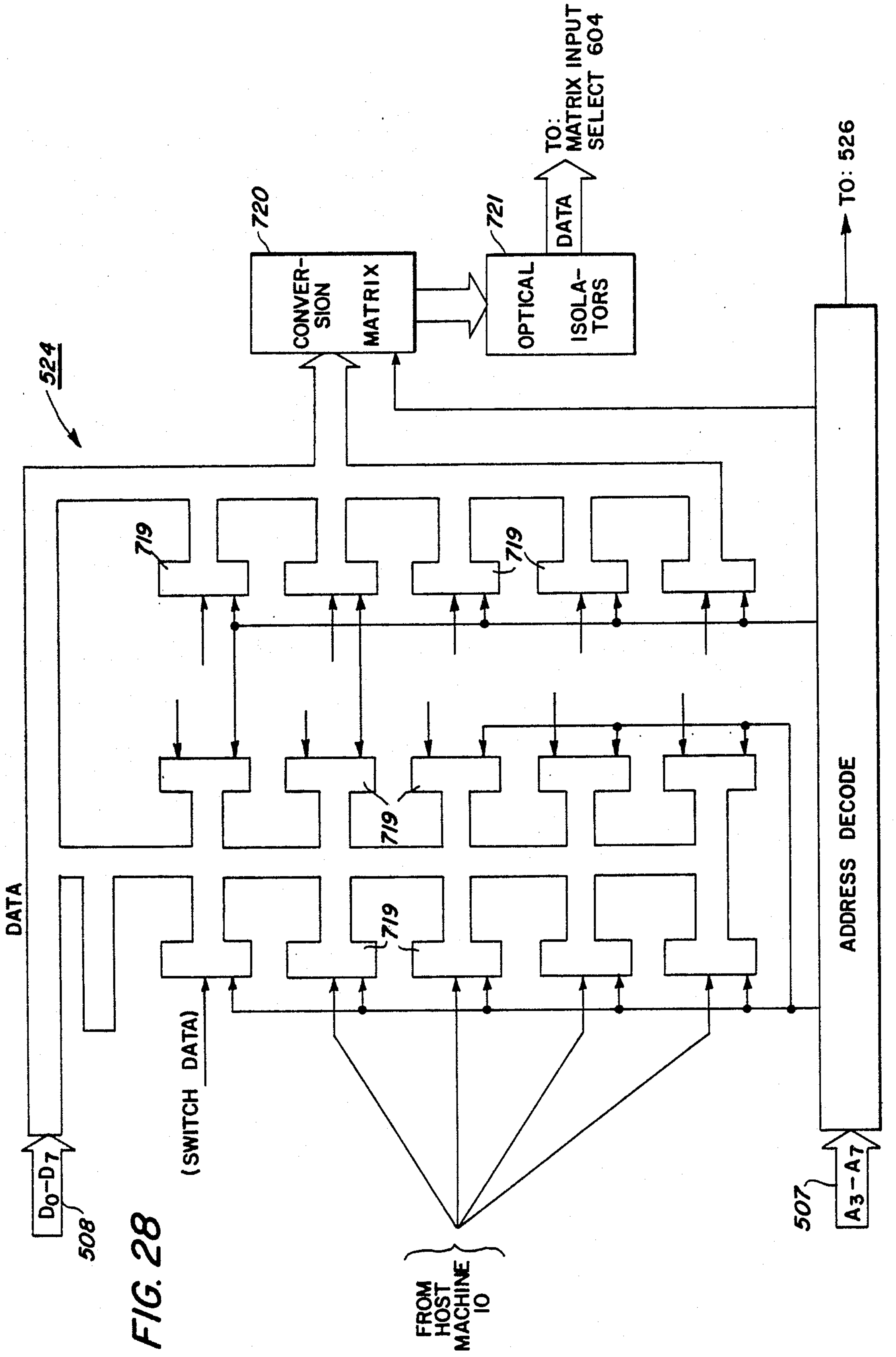
FIG. 28 is a block diagram of the main panel interface module.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmittal to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical insolators 721 and Input Matrix Select 604 of I/O module 502 to CPU Module 500.

Figure 29:
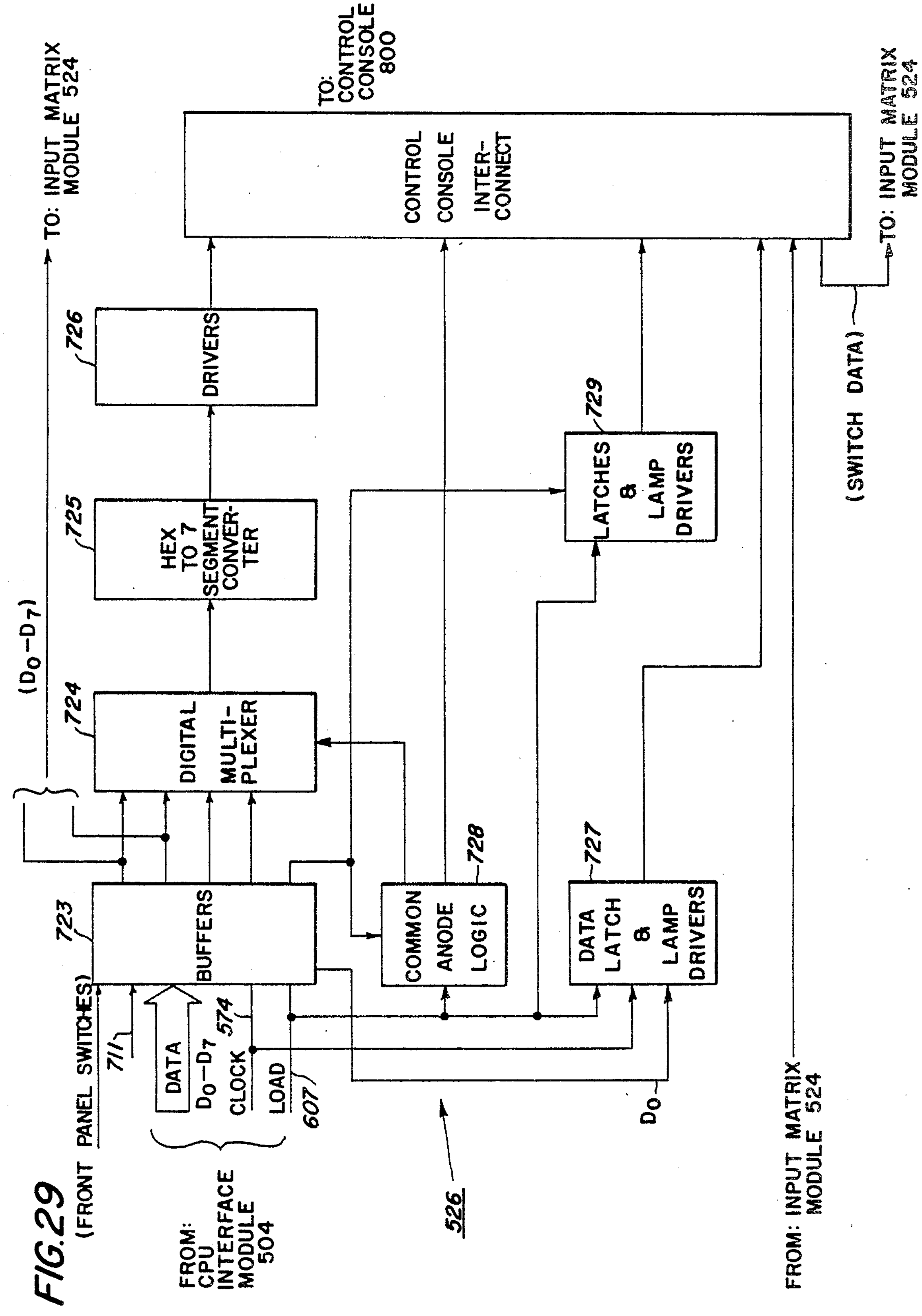
FIG. 29 is a block diagram of the input matrix module.

Referring particularly to FIG. 29, main panel interface module 526 serves as interface between CPU interface module 504 and operator control console 800 for display purposes and as interface between input matrix module 524 and the console switches. As described, data channels D0–D7 have data bits in each channel associated with the control console digital display or lamps. This data is clocked into buffer circuitry 723 and from there, for digital display, data in channels D1–D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Figure 30:
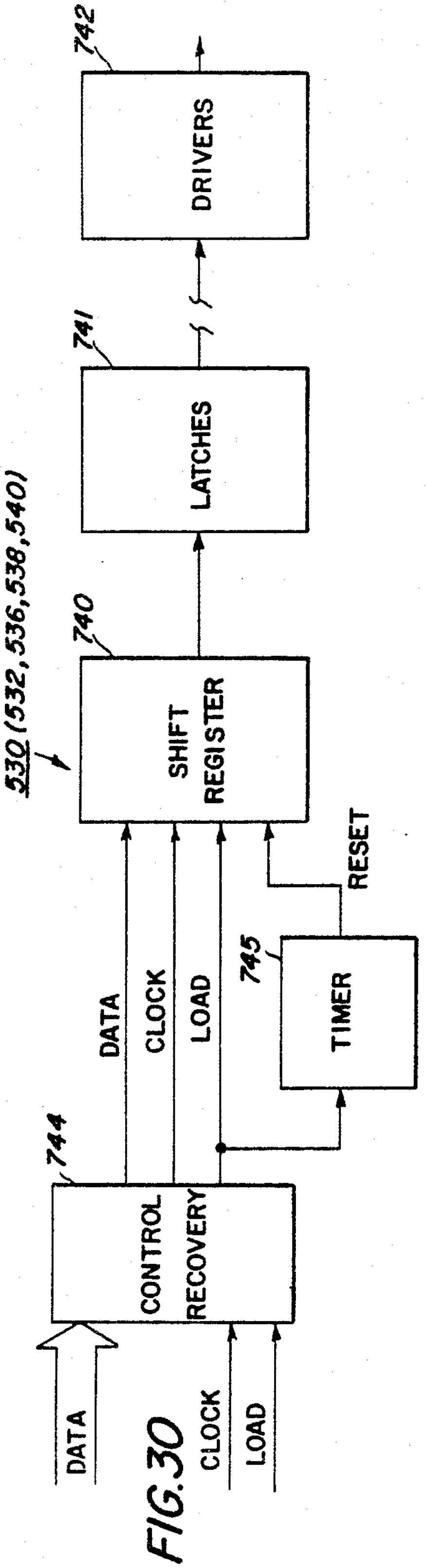
FIG. 30 is a block diagram of a typical remote.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and outpu latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Figure 31:
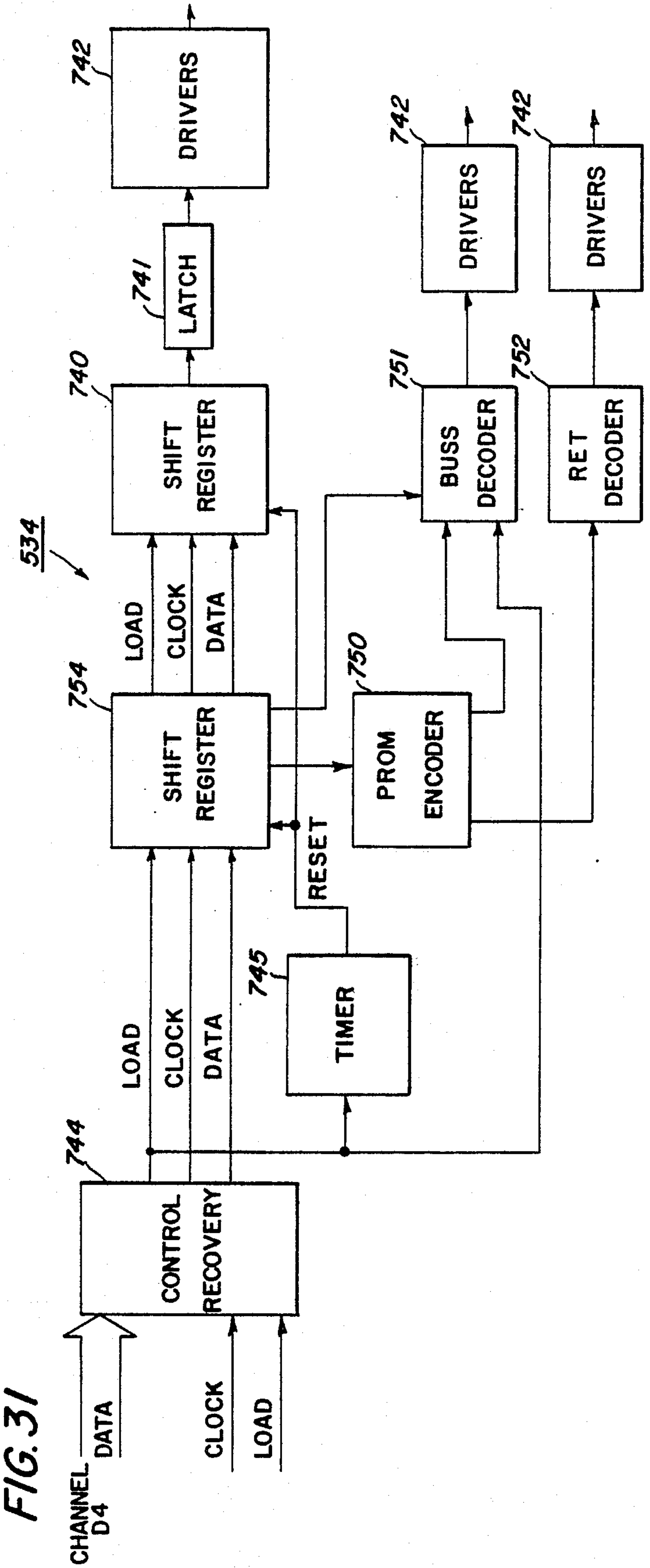
FIG. 31 is a block diagram of the sorter remote.

Referring to FIG. 31 wherein like numbers refer to like parts, to provide capacity for driving the sorter deflector solenoids 217, a decode matrix arrangement consisting of a Prom encoder 750 controlling a pair of decoders 751, 752 is provided. The output of decoders 751, 752 drive the sorter solenoids 217 of upper and lower bin arrays 210, 211 respectively. Data is inputted to encoder 750 by means of shift register 754.

Figure 32:
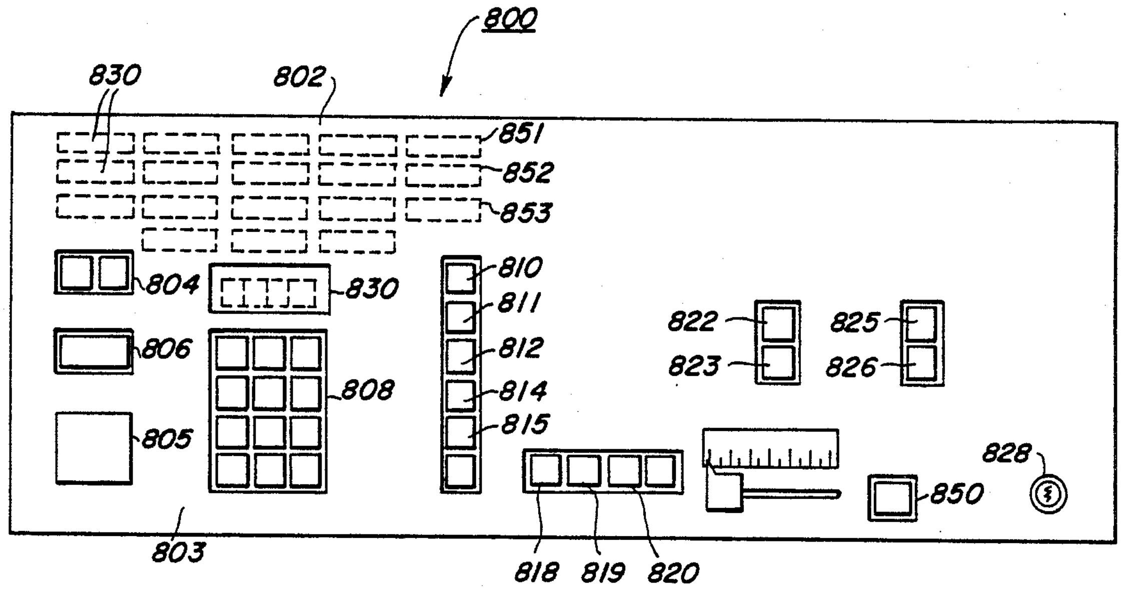
FIG. 32 is a view of the control console for inputting copy run instructions to the apparatus shown in FIG. 1.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper trap button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stacks buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer 546' of RAM memory section 546 is used to transfer/refresh control data to the various remote locations in host machine 10, control data from both Background and Foreground routines being inputted to buffer 546' for subsequent transmittal to host machine 10. Transmittal/refresh of control data presently in output buffer 546' is effected through Direct Memory access (DMA) under the aegis of a Machine Clock interrupt routine.

Foreground routine control data which includes a Run Event Table built in response to the particular copy run of runs programmed, is transferred to output buffer 546' by means of a multiple prioritized interrupt system wherein the Background routine in process is temporarily interrupted while fresh Foreground routine control data is inputted to buffer 546' following which the interrupted Background routine is resumed.

The operating program for host machine 10 is divided into a collection of foregoing tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
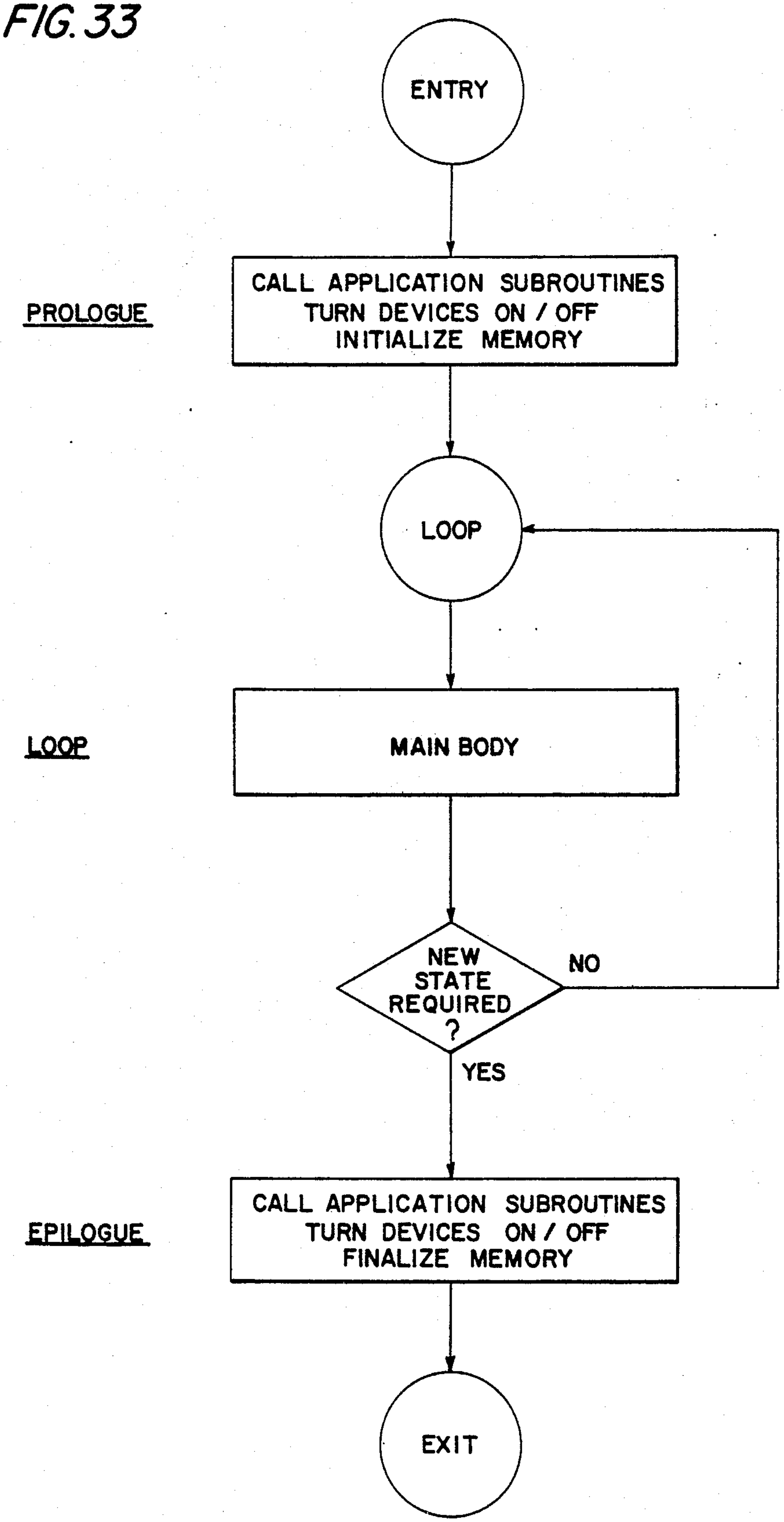
FIG. 33 is a flow chart illustrating a typical machine state.

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
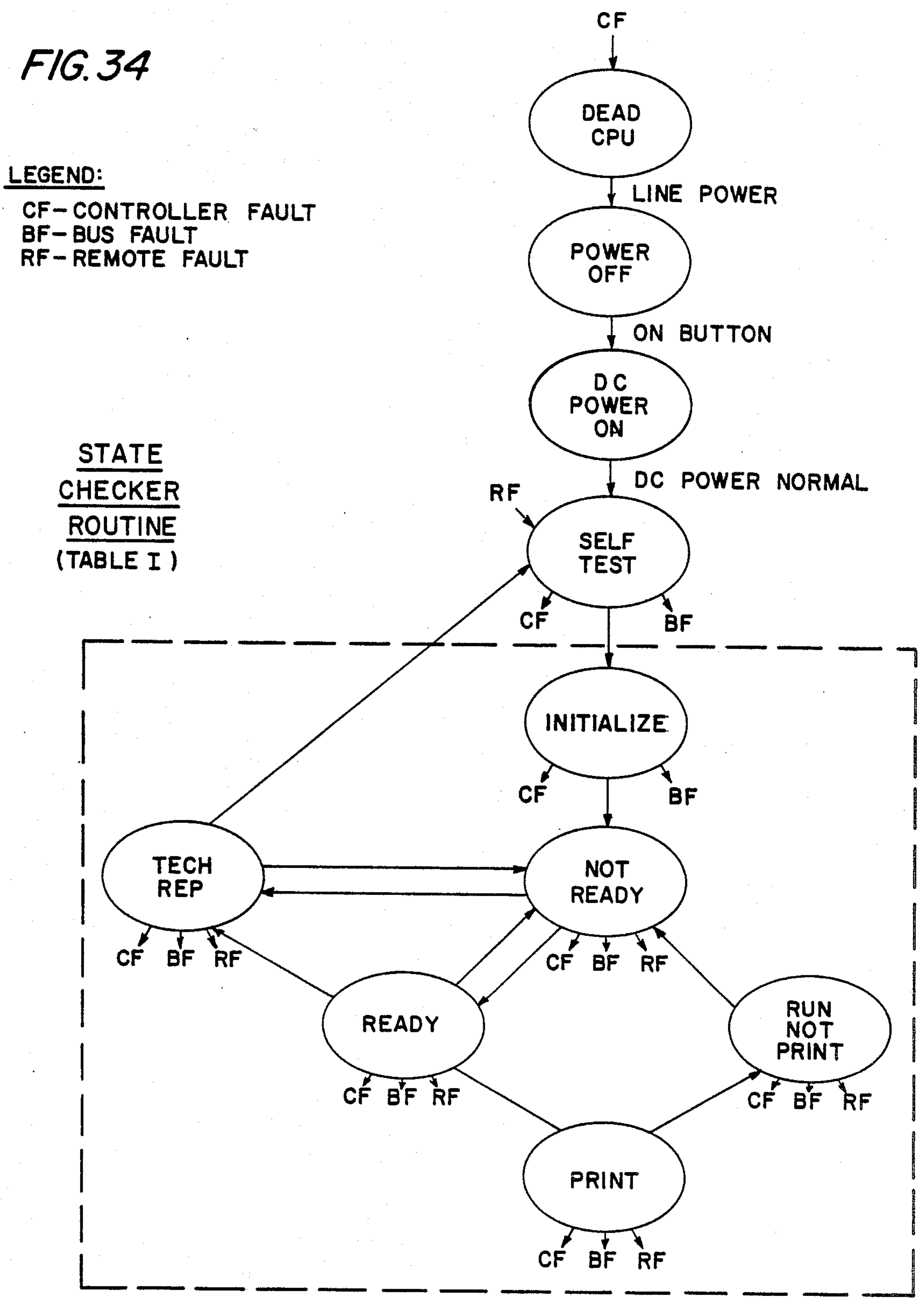
FIG. 34 is a flow chart of the machine state routine.

Referring to FIG. 34 and the exemplary program (STCK) in TABLE I. On actuation of the machine POWER-ON button 804, the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
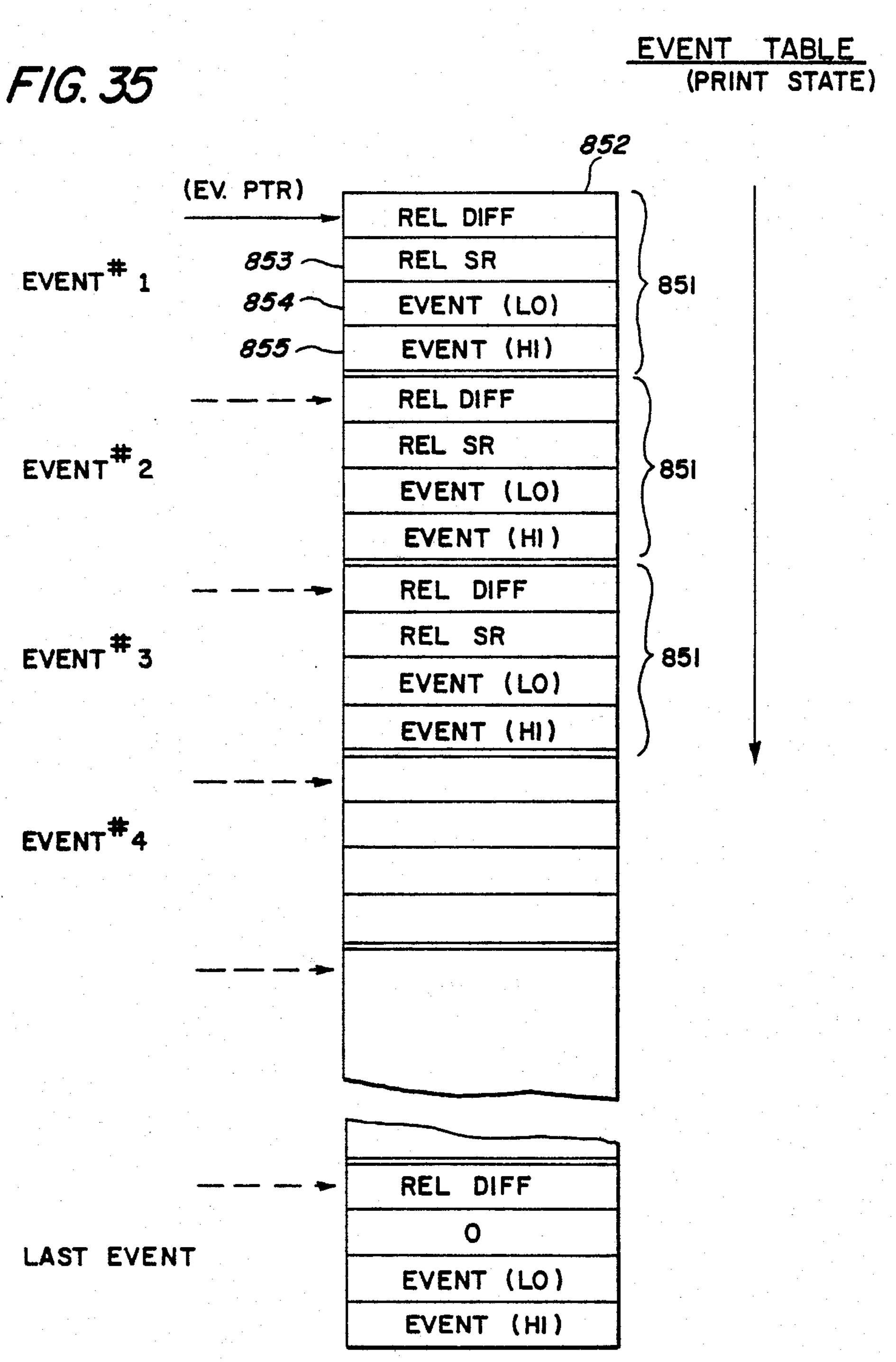
FIG. 35 is a view showing the event table layout.
Figure 36:
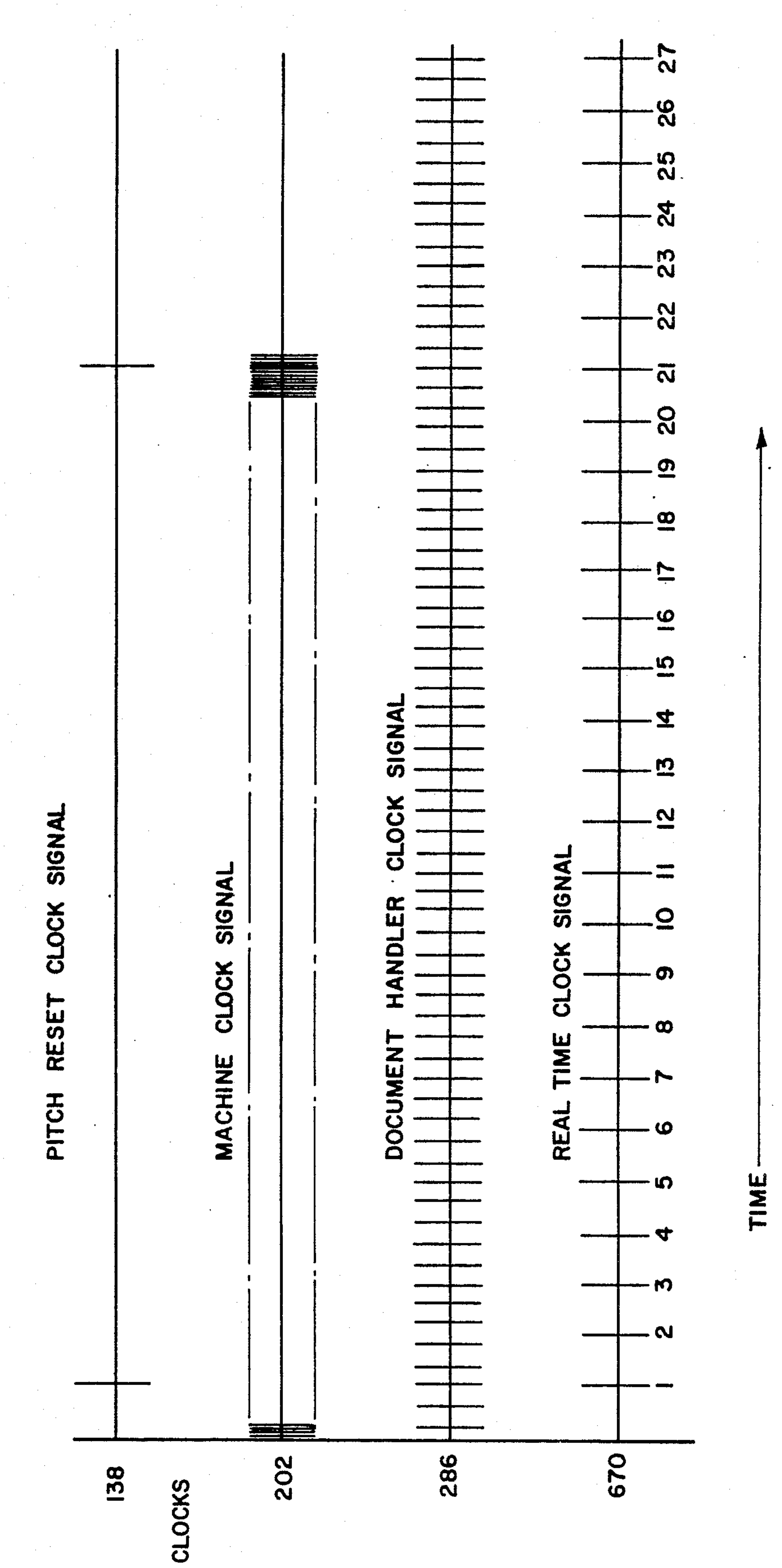
FIG. 36 is a chart illustrating the relative timing sequences of the clock interrupt pulses.
Figure 37:
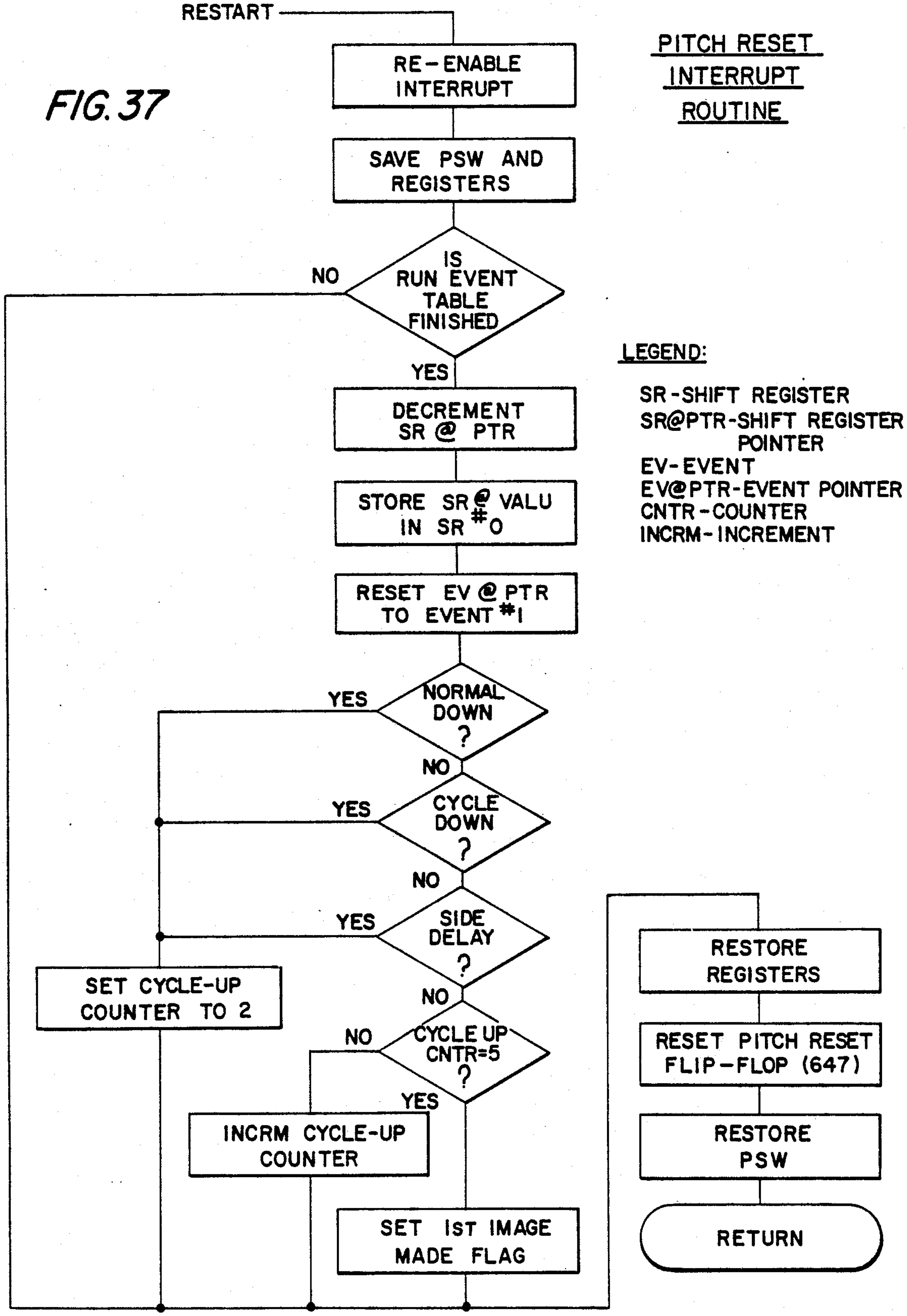
FIG. 37 is a flow charge of the pitch interrupt routine.

Referring particularly to FIG. 35, the Run Event Table consists of successive groups of individual events 851. Each event 851 is comprised of four data blocks, data block 852 containing the number of clock pulses (from machine 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIGS. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, as interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time of the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, and Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Figure 38:
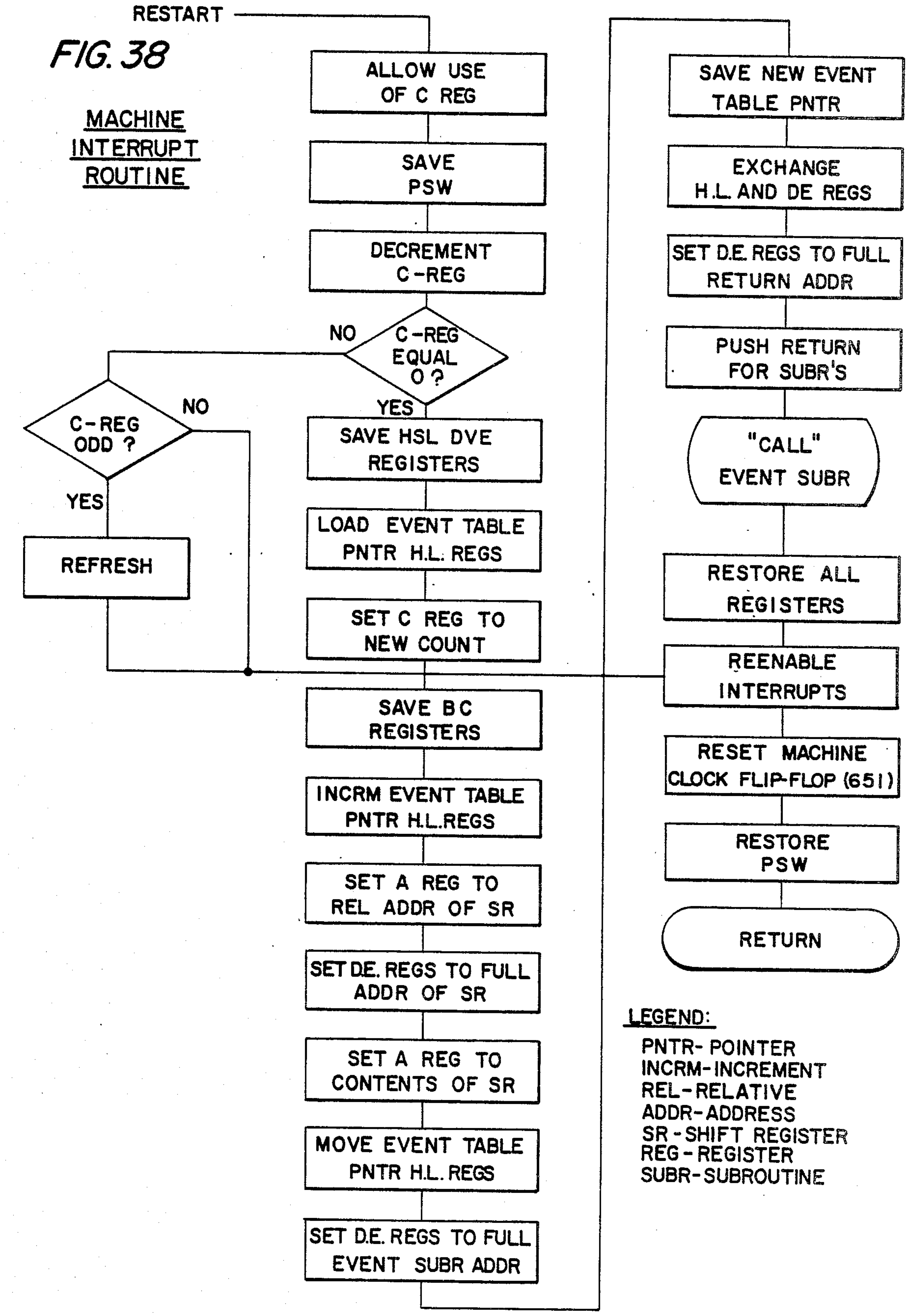
FIG. 38 is a flow chart of the machine clock interrupt routine.

Referring particularly to FIG. 38 and TABLE IX, entry to the Machine Clock interrupt there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
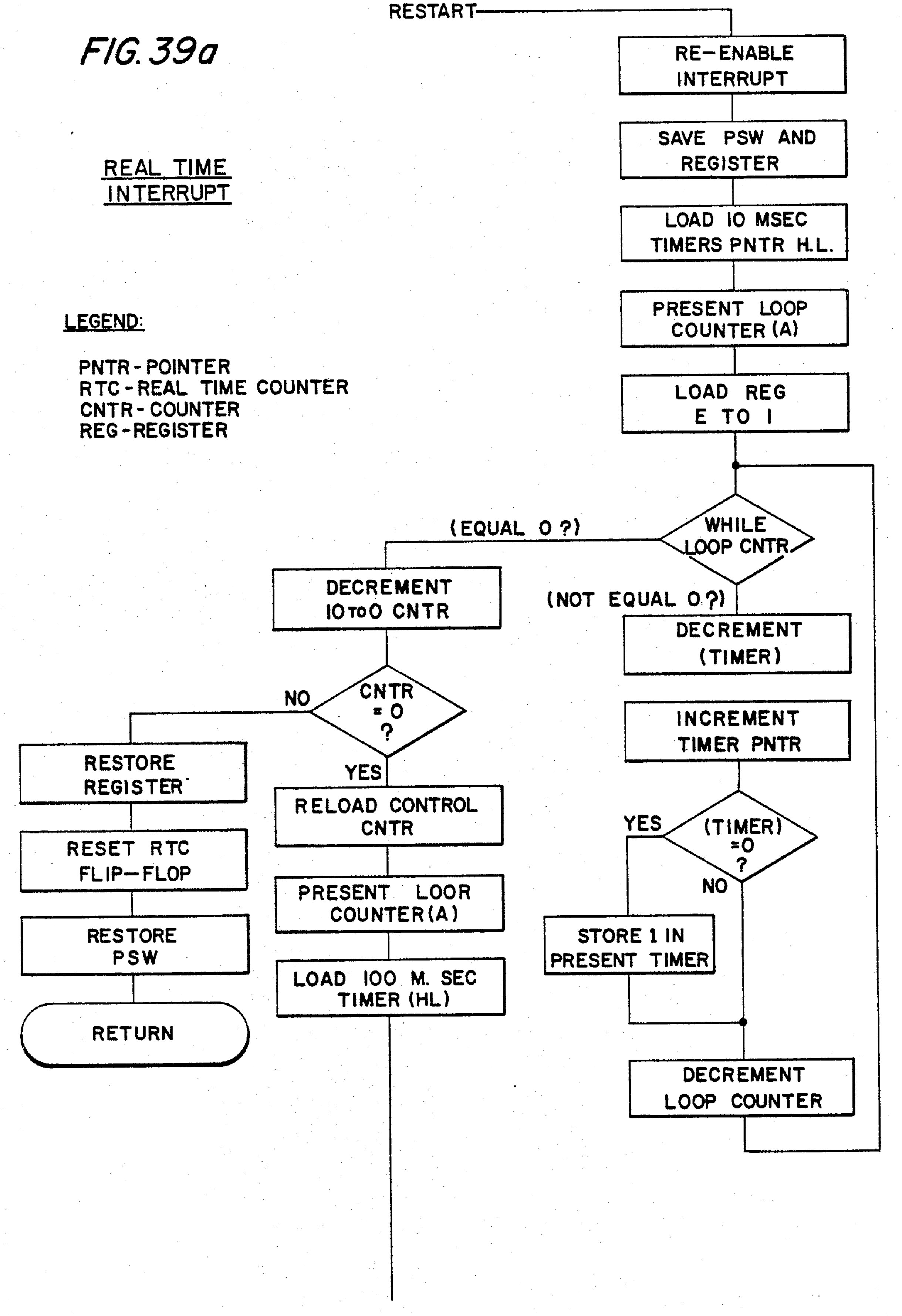
FIGS. 39*a* and 39*b* comprise a flow chart of the real time interrupt routines.
Figure 39B:
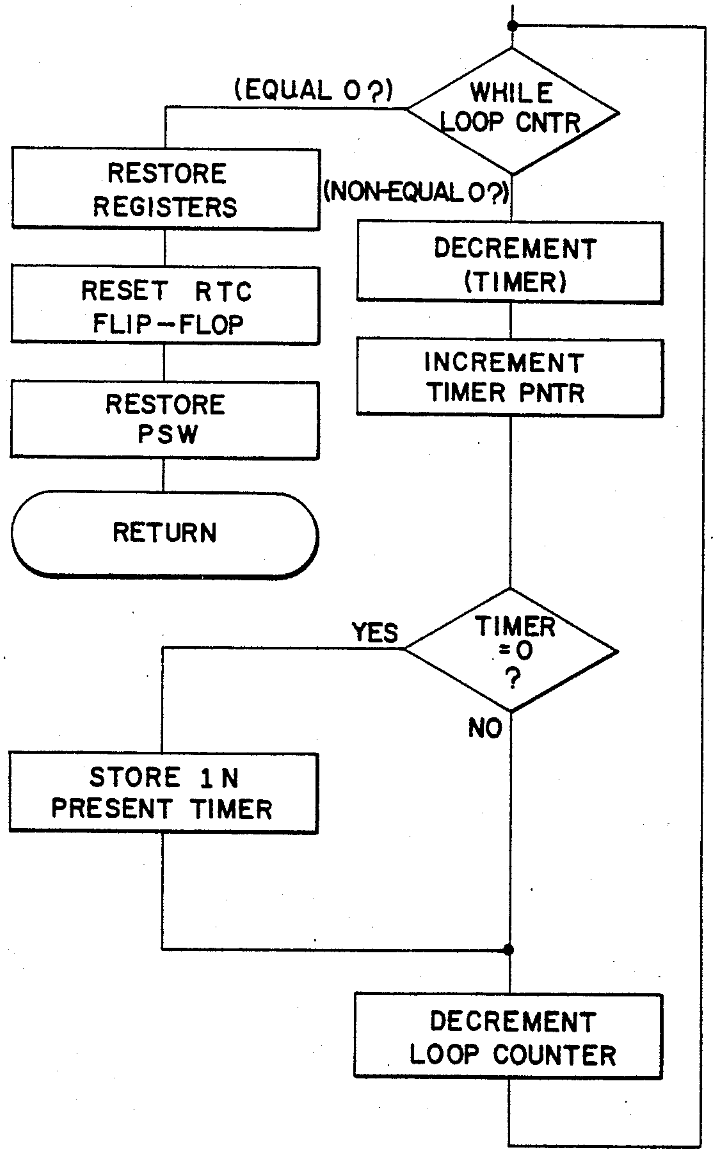

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"@" — is used to indicate flags, counters and subroutine names.
"#" — is used to indicate input signals.
"$" — is used to indicate output signals.
":" — is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                                 *NAR
                                 *
                                 *         I N I T I A L I Z E    S T A T E
                                 *
                                 *         INIT: SUBROUTINE
                                 *
                                 *         INITIALIZE STATE- EXECUTED AFTER EACH START OR RESTART.  SETS
                                 *         ALL POINTERS, FLAGS, AND DATA TO INITIAL VALUES REQUIRED TO
                                 *         START EXECUTION OF ANY CONTROL ALGORITHIMS.  ALWAYS EXITS TO
                                 *         'NOT READY' STATE.

                                 *         EPILOG

05 00000    3E0A      A    INIT:   MVI       A,10
05 00002    3252FD    N            STA       DIVD:10                   INITIALIZE TO 10
05 00005    32B5FC    N            STA       SLOWTOGL                  INITIALIZE TO 10
05 00008    211907    N            LXI       H,EV&STBY:                H&L= ADDR OF STBY EVENT TABLE
05 0000B    2264FD    N            SHLD      EV@PTR:                   SAVE FOR MACH CLK ROUTINE
05 0000E    21FFFF    A            LXI       H,X'FFFF'                 INIT INSTRUMENTATION REMOTE
05 00011    2272FB    N            SHLD      INS@PTRB                    ADDR PNTR TO END OF RAM
05 00014    21FFFF    N            LXI       H,ADH@ROMT-1              SET PNTR TO ROM CNTRL TABLE
05 00017    2278FB    N            SHLD      TAB@STRT                  SAVE PNTR
05 0001A    3E7F      A            MVI       A,X'7F'                   INIT TO UN-BYPASS
05 0001C    328DFC    N            STA       JAM@BYPS                                      ALL JAM SWS
                                 *
                                 *         TIMER INITIALIZATION
                                 *         MUST BE DONE BEFORE ANY TIMERS CAN BE USED
                                 *
05 0001F    211FF9    A            LXI       H,AVAIL:**8+X'1F'         SET H&L TO END OF AVAIL: TABLE
05 00022    36FF      A            MVI       M,X'FF'                   STORE X'FF' IN LAST TABLE ADDR
05 00024    3E1F      A            MVI       A,31                      SET A-REG TO VALUE TO BE STORED
                                   REPEAT
05 00026    2D        A                DCR       L                     STEP TO NEXT TABLE LOCATION
05 00027    77        A                MOV       M,A                   STORE INITIALIZATION VALUE
05 00028    3D        A                DCR       A                     STEP TO NEXT VALUE
05 00029    C22600    N            UNTIL:    CC,Z,S                    IS INITIALIZATION COMPLETE
05 0002C    2120FE    A            LXI       H,ADR(DATA,TIME:OUT)      TO INITIALIZE TIME:OUT TABLE
05 0002F    225FFD    N            SHLD      INPTR:                     SET IN/OUT POINTERS TO
05 00032    2261FD    N            SHLD      OUTPTR:                    BEGINNING OF TIME:OUT TABLE
                                 *
                                 *         INITIALIZE SPOOL
                                 *         POINTERS
                                 *
05 00035    2140FE    A            LXI       H,ADR(DATA,SPL:TBL)       SET PNTRS
05 00038    226AFD    N            SHLD      SPL:IN                                  TO START
05 0003B    226CFD    N            SHLD      SPL:OUT                                         OF TABLE
                                 *
                                 *         CHECK IF PAPER WAS PRESENT WHEN POWER WENT DOWN
                                 *
05 0003E    3AC9E2    A            RNVNIB    NV@JAM@N                  A = JAM INFO FROM POWER DOWN
05 00041    0F        A            RRC                                 SET CARRY TO FDR JAM INFO
05 00042    D25A00    N            IF:       CC,C,S                    WAS THERE PAPER IN FDR AREA
05 00045    47        A                MOV       B,A                   YES, SAVE JAM INFO
05 00046    213CFD    A                SFBIT,P   FDR@AJAM,FDR@MJAM     SET FEEDER JAMS
05 00049    3E0C      A
05 0004B    B6        A
05 0004C    77        A
05 0004D    2121F9    A                SFBIT,P   ON@X02,ON@X03         SIGNAL TRANSPT CL'RANCE REQ'D
05 00050    3E03      A
05 00052    B6        A
05 00053    77        A
05 00054    3E80      A                SFLG      CLR@REQD              TELL FLT HNDLR CLEARANCE REQD
05 00056    3267F4    A
05 00059    78        A                MOV       A,B                   RESTORE THE A-REG
                                   ENDIF
05 0005A    0F        A            RRC                                 SET CARRY TO IMED@DN:
05 0005B    D27100    N            IF:       CC,C,S                    WAS THERE AN IMED@DN:
                                 *
                                       MVI       L,MSK(FBIT,L@PR@FLT,JAM2@FLT,JAM3@FLT,JAM4@FLT,;
05 0005E    2EFF      A                          JAM5@FLT,JAM6@FLT,RET1@FLT,RET2@FLT)
                                 *                                     SETS ALL JAM FBITS IN REG-L
05 00060    2603      A                MVI       H,MSK(FBIT,SOS@JAM,MISSTRIP)
                                 *                                     SETS ADDITIONAL FBITS IN H
05 00062    223BFD    A                SHLD      ADR(FBYT,PAP:1)       MOVE FBITS INTO FBYTES
05 00065    3E80      A                SFLG      CLR@REQD              TELL FLT HNDLR CLEARANCE REQD
05 00067    3267F4    A
05 0006A    2120F9    A                SFBIT,P   TS@FUS,TS@X02         TURN ON UNDEDICATED MAP LAMPS
05 0006D    3E21      A
05 0006F    B6        A
05 00070    77        A
                                   ENDIF
                                   IF:       XBYT,A,AND,;              IS EITHER SRT JAM FLAG SET
05 00071    E60C      A                      MSK(NVBIT,NV@LOW@J,NV@UP@J),NZ 'IN NVNIB
05 00073    CA8A00    N
                                       IF:       XBYT,A,EQ,;           YES, ARE BOTH SET
05 00076    FE0C      A                          MSK(NVBIT,NV@LOW@J,NV@UP@J)
05 00078    C28300    N
05 0007B    3E80      A                    SFLG      TWO@ACT           TELL SRT THAT THERE WAS A JAM
05 0007D    3261F4    A
05 00080    C38700    N                ELSE:
05 00083    0F        A                    RRC                         GET NV@LOW@J TO SIGN BIT &
                                           ID:READ   NV@LOW@J
05 00084    3237F4    A                    MODFLG    LOW@MOD           TELL SRT IF UP OR LOW JAM
                                       ENDIF
05 00087    CD0000    N                CALL      JAM@SET               LET SRT SET JAM FLAGS & LAMPS
                                   ENDIF
05 0008A    3E80      A            SFLG      SRT@RDY                   SIGNAL SRT NOT IN USE (READY)
05 0008C    328CF7    A
05 0008F    3287F7    A            MODFLG    PROG@RDY                  SET PROG ROUTINE READY
05 00092    3268F4    A            MODFLG    2SD@ENAB                  ALLOW SELECTION OF DUPLEX MODE
05 00095    3EF2      A            MVI       A,X'F2'                   RE-ENABLE
```

```
05 00097   3200E6   A        STA      RSINTFFI                            INTERRUPT
05 0009A   FB       A        EI                                                     SYSTEM
05 0009B   CD0000   N        SOBIT,S  NPFO$ON,24V$SPL             PFO OFF (INVT'D) & 24V ON
05 0009E   02       A
05 0009F   E480     A
05 000A1   EE80     A
05 000A3   CD0000   N        STIMR    FLT@DLY,25000,FLT@CHK       START LENS FAULT TIMER
05 000A6   12       A
05 000A7   FA       A
05 000A8   0000     N
05 000AA   CD0000   N        CALL     DOC@CLR                     INITIALIZE DOC@NUM TO 1      (1)
05 000AD   327AFC   N        STA      CF@DIGIT                    ENABLE '0' IN QTY FLASHED    (2)
05 000B0   3E08     A        MVI      A,MSK(FBIT,P0P@RS)          TELL FLT ASSUME
05 000B2   32B6FC   N        STA      XP@PREV                                BRUSH HOUSE OPN
05 000B5   3E02     A        MVI      A,:NRDY                     INIT STCK
05 000B7   3254FD   N        STA      :STATE:                         SYNCRONIZED BACKGROUND
05 000BA   3253FD   N        STA      STATE:                                   CONTROL LOOP
05 000BD   CD3702   N        CALL     NRDY:PRL                    INIT CONTROL TO NOT-READY STATE
                     ********************************************************************
                     *                                                                  *
                     *    S Y C R O N I Z E D   B A C K G R O U N D   C O N T R O L   L O O P S    *
                     *                                                                  *
                     ********************************************************************

                     *       PRIORTIES:
                     *               FIRST     10MS TIME OUT REQUESTS
                     *               SECOND    10MS CALLS
                     *               THIRD     SPOOLED CALLS
                     *               FOURTH    20MS CALLS
                     *               FIFTH     100MS CALLS
                     *               SIXTH     100MS TIME OUT REQUESTS

05 000C0   2151FD   A        LXI      H,ADR(DATA,SB:RQST)             SET MEM PNTR TO SB BYTE
                             REPEAT                                   LOOP-3 FROM HLT ON ALL INTER'S
                                   REPEAT                             LOOP-2 BACK AFTER EACH 100MS
                                         REPEAT                       LOOP-1 BACK AFTER EACH 20MS
05 000C3   7E       A                          MOV      A,M           A= SYNC BKGND REQUESTS FROM RTC
                                               ID:READ  SB:RQST
05 000C4   07       A                          RLC                    TEST FOR 10MS
05 000C5   D2F700   N                          IF:      CC,C,S                   SB REQUEST
                     *
                     *                                                TIMER SERVICE REQUESTS
                     *                                                CALLS TIMED OUT TIMER SUBRS
                     *                                                 USING WRAP AROUND TABLE AND
                     *                                                 IN/OUT PNTRS - RTCI SETS
                     *                                                 INPTR: & ENTERS CALL ADDR
                     *
05 000C8   3A5FFD   N                  WHILE:    XBYT,INPTR:,NE,OUTPTR: ARE PNTRS AT SAME TABL
05 000CB   2161FD   N
05 000CE   BE       A
05 000CF   CAE500   N
05 000D2   6E       A                          MOV      L,M       SET L-REG TO ADDR(L) IN TABLE
05 000D3   26FE     A                          MVI      H,HADR(DATA,TIME:OUT) MEM PNTR NOW SET TO
05 000D5   5E       A                          MOV      E,M             MOVE CALL ADDR(L) TO E
05 000D6   23       A                          INX      H               STEP TO NEXT TABLE BYTE
05 000D7   56       A                          MOV      D,M             MOVE CALL ADDR(H) TO D
05 000D8   23       A                          INX      H               STEP TO NEXT TABLE BYTE
05 000D9   7D       A                          MOV      A,L       PREPARE TO UPDATE PNTR
                                               ID:READ  TIME:OUT  DYNAMIC TABLE CONTAINING ADDRS
                                               MODBYT   A,AND,:   ADJUST FOR END OF TABLE
05 000DA   E62F     A                                   TIME:MSK
05 000DC   3261FD   A                          STA      ADR(DATA,OUTPTR:) PNTR TO ADDR OF LAST SE
05 000DF   CD0000   N                          CALL     DE:IND    DO TIMEOUT CALL
05 000E2   C3C800   N                  ENDWHILE                   YES, ALL TIME OUTS SERVICED
                     *                                            END TIMER SECTION
05 000E5   2A55FD   N                  LHLD      10:CALLS         GET PROPER 10MS CALL TABLE
05 000E8   CDC000   N                  CALL      HL:IND           DO 10MS CALLS
05 000EB   2151FD   A                  LXI       H,ADR(DATA,SB:RQST) SET MEM PNTR TO SB BYTE
05 000EE   F3       A                  DI
05 000EF   7E       A                  MODBYT    M,AND, 10:RQST REMOVE 10MS REQUEST
05 000F0   E67F     A
05 000F2   77       A
                                       ID:ALTR   SB:RQST
05 000F3   FB       A                  EI                         (WATCH OUT FOR UNPRINTABLE NOT)
05 000F4   C31501   N            ELSE:                            DO ANY SPOOLED ROUTINES
05 000F7   3A6AFD   N                  IF:       XBYT,SPL:IN,NE,SPL:OUT
05 000FA   216CFD   N
05 000FD   BE       A
05 000FE   CA1101   N
05 00101   6E       A                          MOV      L,M
05 00102   26FE     A                          MVI      H,HADR(DATA,SPL:TBL)
05 00104   5E       A                          MOV      E,M
05 00105   23       A                          INX      H
05 00106   56       A                          MOV      D,M
05 00107   23       A                          INX      H
05 00108   7D       A                          MOV      A,L
05 00109   E64F     A                          MODBYT   A,AND,SPL:MSK
05 0010B   326CFD   A                          STA      ADR(DATA,SPL:OUT)
05 0010E   CD0000   N                          CALL     DE:IND
                                       ENDIF
05 00111   2151FD   A                  LXI       H,ADR(DATA,SB:RQST)
05 00114   7E       A                  MOV       A,M
                                 ENDIF
                                 ID:READ   SB:RQST
05 00115   07       A            RLC
05 00116   07       A            RLC                              TEST FOR 20MS
05 00117   D24201   N            IF:       CC,C,S                         SB REQUEST
05 0011A   2A59FD   N                  LHLD      20PNTR           SET MEM PTR TO CALL IN 20MS TAB
05 0011D   5E       A                  MOV       E,M              MOVE CALL ADDR(L) TO E
05 0011E   23       A                  INX       H                STEP MEM PTR TO ADDR(H)
05 0011F   7E       A                  IF:       XBYT,M,EQ,X'FF' IS POINTER AT END OF TABLE
05 00120   FEFF     A
05 00122   C23701   N
```

```
05 00125   2A57FD   N              LHLD    20!PNTR   YES, SET MOVING POINTER
05 00128   2259FD   N              SHLD    20PNTR          BACK TO BEGINNING OF TABLE
05 0012B   2151FD   A              LXI     H,ADR(DATA,SB!RQST)       SET MEM PNTR TO
05 0012E   F3       A              DI
05 0012F   7E       A              MODBYT  H,AND, 20!RQST REMOVE 20MS REQUEST
05 00130   E6BF     A
05 00132   77       A
                                   ID!ALTR   SB!RQST
05 00133   FB       A              EI
05 00134   C34201   N          ELSE:
05 00137   56       A              MOV     D,M        NO, MOVE CALL ADDR(H) TO D
05 00138   23       A              INX     H                STEP TO NEXT CALL IN TABLE
05 00139   2259FD   N              SHLD    20PNTR           SAVE FOR NEXT LOOP-1
05 0013C   CD0000   N              CALL    DE:IND
05 0013F   2151FD   A              LXI     H,ADR(DATA,SB!RQST) SET MEM PNTR TO SB BY
                               ENDIF
                           ENDIF
05 00142   7E       A      UNTIL:    XBYT,H,AND,20!RQST,Z  MORE 20MS CALLS TO DO  (LOOP-1)
05 00143   E640     A
05 00145   C2C300   N

                           ID!READ   SB!RQST
05 00148   7E       A      IF:       XBYT,M,AND,100!RQST,NZ TEST FOR 100MS SB REQUEST
05 00149   E620     A
05 0014B   CA9E01   N

                                ID!READ   SB!RQST
05 0014E   2A5DFD   N           LHLD      100PNTR               SET MEM PNTR TO CALL IN 100 TAB
05 00151   5E       A           MOV       E,M                   MOVE CALL ADDR(L) TO E
05 00152   23       A           INX       H                     STEP MEM PNTR TO ADDR(H)
05 00153   7E       A           IF:       XBYT,M,EQ,X'FF'       IS PNTR AT END OF TABLE
05 00154   FEFF     A
05 00156   C29301   N

05 00159   2A5BFD   N              LHLD      100!PNTR        YES, SET MOVING PNTR BACK
05 0015C   225DFD   N              SHLD      100PNTR              TO BEGINNING OF TABLE
                        *
                        *                               100MS TIMER SERVICE
                        *                                DECREMENTS TIMERS AND CALLS
                        *                                SUBROUTINE REQUESTED WHEN
                        *                                TIMER TIMES OUT
                        *                                USES 3 TABLES ON 3 CONSECUTIVE
                        *                                RAM PAGES -100!CNT W/TIMER
                        *                                          -100!LS W/ADDR(L)
                        *                                          -100!LS W/ADDR(H)
                        *                                ADDR IS FOR REQSTED SUBR
                        *
05 0015F   2130FA   N              LXI     H,100!CNT       STARTING ADDR OF 100MS TIMERS
05 00162   1614     A              MVI     D,100!TMAX      D=REG SET TO QTY OF 100MS TMRS

                        *                                  CONDITIONAL HOLD OF 100MS TMRS

05 00164   3A45FD   A              IF:     FBIT,STDBOPNO,T IS STAND-BY RELAY OPEN
05 00167   E640     A
05 00169   CA6E01   N
                                       MVI     D,100!TMAX; YES, HOLD SPECIFIED NUMBER
05 0016C   1611     A                          -HOLDTMRS           OF TIMERS
                                   ENDIF

                        *
                                   REPEAT                          LOOP TO DECR & SERVICE TIMEOUTS
05 0016E   7E       A                  IF:     VBYT,M,NZ IS TIMER ACTIVE
05 0016F   A7       A
05 00170   CA8201   N
05 00173   35       A                      DCR     M       DECR TIMER
05 00174   C28201   N                      IF:     CC,Z,S HAS TIMER TIMED OUT
05 00177   D5       A                          PUSH    D       SAVE # TIMERS TO SERVICE
05 00178   E5       A                          PUSH    H       SAVE ADDR OF CURRENT TIMER
05 00179   24       A                          INR     H       STEP TO NEXT RAM PAGE
05 0017A   5E       A                          MOV     E,M     MOVE CALL ADDR(L) TO E
05 0017B   24       A                          INR     H       STEP TO NEXT RAM PAGE
05 0017C   56       A                          MOV     D,M     MOVE CALL ADDR(H) TO D
05 0017D   CD0000   N                          CALL    DE:IND
05 00180   E1       A                          POP     H       RECALL ADDR OF CURRENT THR
05 00181   D1       A                          POP     D       RECALL NUMBER OF TIMERS
                         *                                         YET TO BE SERVICED
                                           ENDIF
                                       ENDIF
05 00182   23       A                  INX     H           STEP TO NEXT TIMER ADDR
05 00183   15       A                  DCR     D           DECR NUMBER OF 100MS TIMERS
05 00184   C26E01   N              UNTIL:  CC,Z,S          HAVE ALL TIMERS BEEN SERVICED
                         *                                 END 100MS TIMER SECTION
05 00187   2151FD   A              LXI     H,ADR(DATA,SB!RQST) SET MEM PNTR TO SB BYTE
05 0018A   F3       A              DI
05 0018B   7E       A              MODBYT  H,AND, 100!RQST REMOVE 100MS REQUEST
05 0018C   E6DF     A
05 0018E   77       A

                                   ID!ALTR   SB!RQST
05 0018F   FB       A              EI
05 00190   C39E01   N          ELSE:
05 00193   56       A              MOV     D,M            NO, MOVE CALL ADDR(H) TO D
05 00194   23       A              INX     H                    STEP PNTR TO NEXT CALL
05 00195   225DFD   N              SHLD    100PNTR              SAVE FOR NEXT LOOP-2
05 00198   CD0000   N              CALL    DE!IND
05 0019B   2151FD   A              LXI     H,ADR(DATA,SB!RQST) SET MEM PNTR TO SB BYTE
                               ENDIF
                           ENDIF
05 0019E   7E       A      UNTIL:    VBYT,H,Z                 MORE SB CALLS TO DO  (LOOP-2)
05 0019F   A7       A
05 001A0   C2C300   N

                         ID!READ   SB!RQST
05 001A3   76       A    HLT                                COOL IT UNTIL INTERRUPT RESTART
05 001A4   CAC300   N  UNTIL:    CC,Z,C                     WAS INTERRUPT RTC  (LOOP-3)
05 001A7   F3       A  DI                                   ONLY KIDDING BEFORE, BUT THIS
05 001A8   76       A  HLT                                   TIME REALLY STOP (ABORT)
```

```
                               *
                               *        SUBR TO SET CALL TABLE POINTERS
                               *        CALLED BY EACH STATE PROLOG
                               *
                               *        POSITION SB!TABLE POINTER
                               *
05 001A9    3A53FD    N        SB!PNTRS LDA      STATE!                        WHAT STATE IS WANTED
05 001AC    110600    A                 LXI      D,X'06'                       LOAD D&E WITH SKIP NUMBER
05 001AF    210501    N                 LXI      H,SB!TABLE-X'06'              H&L=6'<' TABLE ADDR
                                        REPEAT
05 001B2    19        A                    DAD      D                          SKIP THREE WORDS
05 001B3    3D        A                    DCR      A                          DECR STATE LOOP COUNTER
05 001B4    F2B201    N                 UNTIL!   CC,S,S                        IS POINTER AT CORRECT STATE
                               *
                               *        TRANSFER ADDRS TO VARIABLE SB POINTERS
                               *
05 001B7    1155FD    N                 LXI      D,10!CALLS                    SET D&E TO FIRST OF SB PNTRS
05 001BA    0602      A                 MVI      B,2                           LOAD 10!CALLS
05 001BC    CDCE01    N                 CALL     MV!WORDS                                  & 20!PNTR
05 001BF    2B        A                 DCX      H                             ADJUST 'FROM' PNTR
05 001C0    2B        A                 DCX      H                                             BACK 1 WORD
05 001C1    0602      A                 MVI      B,2                           LOAD 20PNTR
05 001C3    CDCE01    N                 CALL     MV!WORDS                                  & 100!PNTR
05 001C6    2B        A                 DCX      H                             ADJUST 'FROM' PNTR
05 001C7    2B        A                 DCX      H                                             BACK 1 WORD
05 001C8    CDCC01    N                 CALL     MV!WORD                       LOAD 100PNTR
                                        ID!ALTR  10!CALLS,20!PNTR,20PNTR,!     DATA WORDS MODIFIED
                                                 100!PNTR,100PNTR                BY THIS SUBR
05 001CB    C9        A                 RET
                               *NAR
                               *
                               *        MV!WORD/MV!WORDS SUBROUTINES
                               *
                               *        SUBR TO TRANSFER WORDS (2BYTES) FROM MEMORY POINTED TO BY <H&L>
                               *         TO MEMORY POINTED TO BY <D&E>. CALL MV!WORD FOR 1 TRANSFER,
                               *         AND CALL MV!WORDS (WITH B-REG # WORDS TO TRANSFER) FOR
                               *         MULTIPLE TRANSFERS. USES ALL BUT C-REG.
                               *
05 001CC    0601      A        MV!WORD  MVI      B,1                           B= # WORDS TO BE MOVED
                               MV!WORDS REPEAT
05 001CE    7E        A                    MOV      A,M                        A= 1ST 'FROM' BYTE
05 001CF    12        A                    STAX     D                          STORE IN 1ST 'TO' LOCATION
05 001D0    23        A                    INX      H                          ADVANCE 'FROM'
05 001D1    13        A                    INX      D                                         AND 'TO' PNTRS
05 001D2    7E        A                    MOV      A,M                        A= 2ND 'FROM' BYTE
05 001D3    12        A                    STAX     D                          STORE IN 2ND 'TO' LOCATION
05 001D4    23        A                    INX      H                          ADVANCE 'FROM'
05 001D5    13        A                    INX      D                                         AND 'TO' PNTRS
05 001D6    05        A                    DCR      B                          DECRM # OF WORDS CNTR
05 001D7    C2CE01    N                 UNTIL!   CC,Z,S                        LOOP UNTIL ALL WORDS TRANSFERRD
05 001DA    C9        A                 RET
                               *
                               *        TABLE OF SB CALL POINTERS
                               *        FOR EACH STATE
                               *
05 001DB    0906      N        SB!TABLE DW       COMP10
05 001DD    0A06      N                 DW       COMP20
05 001DF    1206      N                 DW       COMP100
05 001E1    B105      N                 DW       TREP10
05 001E3    B505      N                 DW       TREP20
05 001E5    C305      N                 DW       TREP100
05 001E7    4202      N                 DW       NRDY10
05 001E9    4602      N                 DW       NRDY20
05 001EB    5202      N                 DW       NRDY100
05 001ED    AF02      N                 DW       RDY10
05 001EF    B302      N                 DW       RDY20
05 001F1    BF02      N                 DW       RDY100
05 001F3    AB03      N                 DW       PRNT10
05 001F5    B203      N                 DW       PRNT20
05 001F7    C803      N                 DW       PRNT100
05 001F9    1905      N                 DW       RUNN10
05 001FB    1D05      N                 DW       RUNN20
05 001FD    2F05      N                 DW       RUNN100

                               *
                               *        SUBR TO DO EPILOGS & PROLOGS LAST CALL IN EVERY 100MS TABLE
                               *
05 001FF    2153FD    A        STAT!CHG LXI      H,ADR(DATA,STATE!)            A= PRESENT STATE # IF UNCHANGED
05 00202    7E        A                 MOV      A,M                            OR NEXT STATE IF CHANGED
05 00203    23        A                 INX      H                             H&L= ADDR 'FORMER STATE' GLOBAL
05 00204    BE        A                 IF!      XBYT,A,NE,M                   HAS THERE BEEN A STATE CHANGE
05 00205    CA3602    N
                                           ID!READ  STATE!,!STATE!
05 00208    46        A                    MOV      B,M                        YES, B= FORMER STATE
05 00209    77        A                    MOV      M,A                        UPDATE 'FORMER' TO 'PRESENT'
                                           ID!ALTR  !STATE!
05 0020A    78        A                    CASE!    VBYT,B                     DO EPILOG FOR FORMER STATE
05 0020B    111F02    N
05 0020E    FE06      A
05 00210    CD0000    N
05 00213    1806      N                          C,0      COMP!EPL             COMPONENT CONTROL STATE
05 00215    DB05      N                          C,1      TREP!EPL             TECH REP STATE
05 00217    7A02      N                          C,2      NRDY!EPL             NOT-READY STATE
05 00219    E302      N                          C,3      RDY!EPL              READY STATE
05 0021B    E603      N                          C,4      PRNT!EPL             PRINT STATE
05 0021D    4105      N                          C,5      RUNN!EPL             SYSTEM RUNNING, NOT PRINT STATE
                                           ENDCASE
05 0021F    3A53FD    N                    CASE!    VBYT,STATE!                DO PROLOG FOR PRESENT STATE
05 00222    113602    N
05 00225    FE06      A
05 00227    CD0000    N
05 0022A    FF05      N                          C,0      COMP!PRL             COMPONENT CONTROL STATE
05 0022C    A505      N                          C,1      TREP!PRL             TECH REP STATE
```

```
05 0022E   3702     N                   C,2       NRDY!PRL              NOT-READY STATE
05 00230   A602     N                   C,3       RDY!PRL               READY STATE
05 00232   1603     N                   C,4       PRNT!PRL              PRINT STATE
05 00234   0805     N                   C,5       RUNN!PRL              SYSTEM RUNNING, NOT PRINT STATE
                                    ENDCASE
                                ENDIF
05 00236   C9       A           RET                                     RETURN TO 100 MSEC SYNC BKGND
                       *NAR
                       *
                       *        N O T    R E A D Y    S T A T E
                       *
                       *        NOT READY STATE- EXECUTES AFTER INITIALIZE UNTIL ALL READY CONDITIONS
                       *        ARE MET.  THIS STATE CAN ALSO BE ENTERED FROM 'RUN NOT PRINT','READY'
                       *        AND 'TECH REP'.  CONTROL EXITS TO EITHER 'READY' OR 'TECH REP' STATES.

                       *        PROLOG

05 00237   CDA901   N  NRDY!PRL CALL      SB!PNTRS              SYNC BKG PNTRS TO NEW STATE
05 0023A   CD0000   N           STIMR     INST@TMR,1000,NEXT@FLT UPDATES INST FLT CODE IN STBY
05 0023D   49       A
05 0023E   64       A
05 0023F   0000     N
05 00241   C9       A           RET

                       *        CALLS FOR NOT READY 10 MS SYN BACKGROUND

05 00242   CD0000   N  NRDY10   CALL      ADH@CTRL
05 00245   C9       A           RET

                       *        CALLS FOR NOT READY 20 MS SYN BACKGROUND

05 00246   0000     N  NRDY20   DW        NRDY@SWS
05 00248   0000     N           DW        MN@ELVPS
05 0024A   0000     N           DW        DSPL@CTL
05 0024C   0000     N           DW        LMP@CTRL
05 0024E   0000     N           DW        INSTRU
05 00250   FFFF     A           DW        X'FFFF'               END OF TABLE

                       *        CALLS FOR NOT READY 100 MS SYN BACKGROUND

05 00252   0000     N  NRDY100  DW        NRILK@CK
05 00254   0000     N           DW        RED@BGND
05 00256   0000     N           DW        DVL@DUMP
05 00258   0000     N           DW        RECAPER
05 0025A   0000     N           DW        BIN@CHK               1
05 0025C   0000     N           DW        MINIPHS1              2
05 0025E   0000     N           DW        BIL@JMPB
05 00260   0000     N           DW        FUS@ROUT
05 00262   0000     N           DW        FLT@100               1
05 00264   0000     N           DW        FLT@CTRL              2
05 00266   0000     N           DW        FLT@CLRN              3
05 00268   0000     N           DW        PROG2SJM
05 0026A   0000     N           DW        2SD@STBY
05 0026C   0000     N           DW        XMM@STBY
05 0026E   0000     N           DW        JAM@RST
05 00270   0000     N           DW        KEY@CNTR
05 00272   0000     N           DW        TST@LP4
05 00274   8402     N           DW        NRDY:CHG              TEST IF OK TO
05 00276   FF01     N           DW        STAT:CHG                            LEAVE NOT READY
05 00278   FFFF     A           DW        X'FFFF'               END OF TABLE

                       *        EPILOG

05 0027A   CD0000   N  NRDY!EPL COBIT,S   WAIT*                 INSURE WAIT OFF AT NRDY EXIT
05 0027D   E9FE     A
05 0027F   AF       A           CFLG      STRT!PRT              DIS-ABLE TRANSFER TO 'PRINT'
05 00280   325BF4   A
05 00283   C9       A           RET

                       *
                       *        SUBR FOR 'NOT-READY' 100MS SYNC BKGND
                       *         TESTS FOR CHANGE TO 'READY' OR 'TREP REP'
                       *
05 00284   CDDF05   N  NRDY:CHG CALL      TREP:CHG              TEST FOR STATE CHANGE TO !TREP
05 00287   7E       A           IF!       XBYT,M,NE,:TREP       DID IT CHANGE TO !TREP STATE
05 00288   FE01     A
05 0028A   CA9302   N
                                    ID!READ   STATE!
05 0028D   CD9402   N               CALL      RDYTEST!          TEST ALL 'READY' FLAGS
05 00290   CD0B03   N               CALL      NRDY!RDY          MOVE TO EITHER !NRDY OR !RDY
                                ENDIF
05 00293   C9       A           RET

                       *
                       *        SUBR TO TEST ALL 'READY' FLAGS IN A LOOP
                       *
05 00294   2184F7   A  RDYTEST! LXI       H,RDYFLGS!            H&L= START ADDR OF READY FLAGS
05 00297   0609     A           MVI       B,RDYFNUM!            B= # OF READY FLAGS TO CHK
                                REPEAT
05 00299   7E       A               MOV       A,M               A= <PRESENT READY FLAG>
05 0029A   07       A               RLC                         SET C IF FLAG SET (READY)
05 0029B   DAA002   N               IF!       CC,C,C            IS PRESENT FLAG INDICATING RDY
05 0029E   0601     A                   MVI       B,1           NO, DON'T TEST ANY FURTHER
                                    ENDIF
05 002A0   23       A               INX       H                 MOVE TO NEXT FLAG LOCATION
05 002A1   05       A               DCR       B                 DECRM LOOP CNTR (# READY FLAGS)
05 002A2   C29902   N           UNTIL:    CC,Z,S                LOOP UNTIL ALL FLAGS CHKED
                                ID!READ   LENS@RDY,ELV@RDY,FUS@RDY,;  FLAGS READ
                                          PROG@RDY,ILCK@RDY,XMM@RDY,;
                                          FLT@RDY,ADH@NMOV,SRT@RDY
05 002A5   C9       A           RET                             RETURN
```

```
                              *NAR
                              *
                              *        R E A D Y   S T A T E
                              *
                              *        READY STATE- EXECUTES WHEN MACHINE IS READY TO GO INTO PRINT STATE.
                              *        CONTROL CAN GO BACK TO 'NOT READY' OR GO TO 'TECH REP' IF REQUIRED.

                              *        PROLOG

05 002A6   CD0000   N   RDY:PRL   SOBIT,S   READY$
05 002A9   E701     A
05 002AB   CDA901   N             CALL      SB:PNTRS                    SYNC BKG PNTRS TO NEW STATE
05 002AE   C9       A             RET

                              *        CALLS FOR READY 10MS SYN BACKGROUND

05 002AF   CD0000   N   RDY10     CALL      ADHOCTRL
05 002B2   C9       A             RET

                              *        CALLS FOR READY 20MS SYN BACKGROUND

05 002B3   0000     N   RDY20     DW        RDY@SWS
05 002B5   0000     N             DW        MN@ELVAS
05 002B7   0000     N             DW        DSPL@CTL
05 002B9   0000     N             DW        LMP@CTRL
05 002BB   0000     N             DW        INSTRU
05 002BD   FFFF     A             DW        X'FFFF'                     END OF TABLE

                              *        CALLS FOR READY 100MS SYN BACKGROUND

05 002BF   0000     N   RDY100    DW        BIN@CHK                     1
05 002C1   0000     N             DW        MINIPHS1                    2
05 002C3   0000     N             DW        BIL@JMPO
05 002C5   0000     N             DW        OVL@DUMP
05 002C7   0000     N             DW        RECAPER
05 002C9   0000     N             DW        FUS@RDUT
05 002CB   0000     N             DW        FLT@100                     1
05 002CD   0000     N             DW        FLT@CTRL                    2
05 002CF   0000     N             DW        NRILK@CK
05 002D1   0000     N             DW        RED@BGND
05 002D3   0000     N             DW        2SD@STPY
05 002D5   0000     N             DW        XMM@STPY
05 002D7   0000     N             DW        JAM@RST
05 002D9   0000     N             DW        KEY@CNTR
05 002DB   0000     N             DW        TST@LP4
05 002DD   E902     N             DW        RDY:CHG                     TEST IF OK TO
05 002DF   FFC1     N             DW        STAT:CHG                              LEAVE READY
05 002E1   FFFF     A             DW        X'FFFF'                     END OF TABLE

                              *        EPILOG

05 002E3   CD0000   N   RDY:EPL   COBIT,S   READY$
05 002E6   E7FE     A
05 002E8   C9       A             RET

                              *        CHANGE OF STATE ROUTINES

                              *
                              *        SUBR FOR 'READY' 100MS SYNC BKGND
                              *         TESTS FOR CHANGE TO 'NOT-READY' OR 'TECH REP'
                              *
05 002E9   CDDF05   N   RDY:CHG   CALL      TREP:CHG                    TEST FOR STATE CHANGE TO :TREP
05 002EC   7E       A             IF:       XBYT,M,NE,:TREP             DID IT CHANGE TO :TREP STATE
05 002ED   FE01     A
05 002EF   CA0A03   N
                                      ID:READ   STATE:
05 002F2   CD9402   N                 CALL      RDYTEST:                TEST ALL 'READY' FLAGS
05 002F5   CD0B03   N                 CALL      NRDY:RDY                MOVE TO EITHER :NRDY OR :RDY
05 002F8   3A58F4   A                 IF:       FLG,STRT:PRT,T          IS START PRINT REQUESTED
05 002FB   07       A
05 002FC   D20A03   N
05 002FF   2153FD   A                     LXI       H,ADR(DATA,STATE:)  SET MEM PNTR
05 00302   7E       A                     IF:       XBYT,M,EQ,:RDY      OK TO GO TO PRINT
05 00303   FE03     A
05 00305   C20A03   N
                                              ID:READ   STATE:
05 00308   3604     A                         MVI       M,:PRNT         CHG TO PRT STATE
                                              ID:ALTR   STATE:
                                          ENDIF
                                      ENDIF
                                  ENDIF
05 0030A   C9       A             RET

                              *
                              *        SUBR TO USE INFO FROM 'RDYTEST' AND EXECUTE THE PROPER CHANGE OF STATE
                              *
05 0030B   2153FD   A   NRDY:RDY  LXI       H,ADR(DATA,STATE:)          SET MEM PNTR
05 0030E   3603     A             MVI       M,:RDY                      ASSUME GOING TO 'READY' STATE
                                  ID:ALTR   STATE:
05 00310   DA1503   N             IF:       CC,C,C                      ARE ALL 'READY' FLAGS SET
05 00313   3602     A                 MVI       M,:NRDY                 NO, MOVE TO 'NOT-READY' STATE
                                      ID:ALTR   STATE:
                                  ENDIF
05 00315   C9       A             RET
                              *NAR
                              *
                              *        P R I N T   S T A T E
                              *
                              *        PRINT STATE- EXECUTES WHILE MACHINE IS PRODUCING COPIES.
                              *        ENTERED FROM 'READY' AND EXITS TO 'RUN NOT PRINT'.

                              *        PROLOG
```

```
647   05 00316   2160FE   N   PRNT:PRL CLR:MEM    16,SHIFTREG                   CLEAR SHIFT REGISTER
      05 00319   0610     A
      05 0031B   CD0000   N
648   05 0031E   3E60     A            MVI        A,LADR(DATA,SHIFTREG)          FORCE SHIFT REG TO START AT
649   05 00320   3263FD   A            STA        ADR(DATA,SR@PTR!)              BEGINNING OF SHIFTREG TABLE
650                                    CLR:MEM    SD1@DLY-TIME@DN!+1,)           CLEAR THE FOLLOWING FLAGS
651   05 00323   21A7F4   A                       ADR(FLG,TIME@DN!)
      05 00326   0609     A
      05 00328   CD0000   N
652                                    ID:CLR     TIME@DN!,IMED@DN!,)
653                                               CYCL@DN!,NORM@DN!,QWIK!@UT,)
654                                               IMGMADF!,SD1@TIMO,SD1@DLY
655   05 0032B   3E80     A            SFLG       910@DONE                       ALLOW FIRST PITCH RESET
      05 0032D   326FF4   A
656   05 00330   AF       A            XRA        A
657   05 00331   3266FD   N            STA        CYCUPCT!                       INIT CYCLE-UP CNTR TO 0
658   05 00334   3269FD   N            STA        SR@VALU!                       INIT 'NEW SR VALUE' TO 0
659   05 00337   325DFA   N            STA        PLL@INFO                       INIT PLL SHUTDOWN CONTROL TO 0
660   05 0033A   3265FD   N            STA        SMPL@CT!                       INIT SAMPLE COPY CNTR TO 0
661   05 0033D   3E03     A            MVI        A,3
662   05 0033F   3267FD   N            STA        NO!MGCT!                       INIT 'NO IMAGE CNTR' TO 3
663   05 00342   CD0000   N            CALL       SRSK                           SHIFT REG SCHEDULER (INIT SR#0)
664   05 00345   CD0000   N            CALL       TIM@MOD                        CALC SHIFTED IMAGE VALUES   (1)
665   05 00348   CD0000   N            STIMR      935!TMR,810,RETURN!            SET 'OVER-RUN EVENT' TIMER  (2)
      05 0034B   22       A
      05 0034C   51       A
      05 0034D   0000     N
666   05 0034F   CD0000   N            CALL       TBLD@PPT                       BUILD NEW PITCH TABLE       (3)
667   05 00352   CD0000   N            SOBIT,S    PRNT$RLY,PR$COOL               PRINT RELAY & COOLING FAN ON
      05 00355   02       A
      05 00356   EA08     A
      05 00358   F608     A
668   05 0035A   AF       A            CTIMR      PR@COOL                        CLEAR COOLING FAN TIMER
      05 0035B   3232FA   N
669   05 0035E   CD0000   N            COBIT,S    NPFO$ON                        TURN OFF PFO (INVERTED DRIVER)
      05 00361   E47F     A
670   05 00363   3AB0F4   A            IF:        FLG,ADH@SELC,T
      05 00366   07       A
      05 00367   D27003   N
671   05 0036A   CD0000   N                 CALL       ADH@MOTN
672   05 0036D   C37503   N            ELSE:
673   05 00370   3E80     A                 SFLG       ADH@WTEN
      05 00372   320CF4   A
674                                    ENDIF
675   05 00375   CD0000   N            CALL       TRN@BSD
676   05 00378   CD0000   N            CALL       PAP@SIZE                       CHK PAPER WIDTH FOR FUSER   (1)
677   05 0037B   CD0000   N            CALL       EDGE@FD                        CHK WHICH EDGE FADE OUT     (2)
678   05 0037E   CD0000   N            CALL       PAP@PRL3
679   05 00381   CD0000   N            CALL       PROG@UP                        PROG INITIALIZATION SUBR
680   05 00384   CD0000   N            CALL       PROG@UP1
681   05 00387   CD0000   N            CALL       FDR@PRT                        CHECK FEEDER SELECTION
682   05 0038A   CD0000   N            CALL       BLG@BKPT                       READ BILLING BREAK-POINTS
683   05 0038D   CD0000   N            CALL       DO@ELV                         CAUSE ELV TO EXECUTE
684   05 00390   3A54F4   A            IF:        FLG,SRT$SEL,T                  IS SORTER BEING USED
      05 00393   07       A
      05 00394   D29F03   N
685   05 00397   CD0000   N                 CALL       SRT$INIT                  INITIALIZE SORTER JAM DETECT
686                                         MVI        A,MSK(NVBIT,NV@FJAM,)     SETS ALL 4 JAM CONDITIONS
687   05 0039A   3E0F     A                            NV@IMED,NV@LOWJ,NV@UP@J)
688   05 0039C   C3A403   N            ELSE:
689   05 0039F   3AC9E2   A                 RNVNIB     NV@JAM@N                  READ SAVED PREVIOUS SRT JAMS
690                                         MODBYT     A,OR,MSK(NVBIT,)          & SET IMED ON & FOR JAM
691   05 003A2   F603     A                            NV@FJAM,NV@IMED)
692                                    ENDIF
693   05 003A4   32C9E2   A            WNVNIB     NV@JAM@N                       STORE IN CASE OF PWR DN
694                                    ID:ALTR    NV@FJAM,NV@IMED,NV@LOW@J,)     SEE ABOVE IF:/ELSE:
695                                               NV@UP@J
696   05 003A7   CDA901   N            CALL       SB:PNTPS                       SYNC BKG PNTRS TO NEW STATE
697   05 003AA   C9       A            RET

699                               *    CALLS FOR PRINT 10 MS SYN BACKGROUND

701   05 003AB   CD0000   N   PRNT10   CALL       ADH@CTRL
702   05 003AE   CDC004   N            CALL       PRT!IMD
703   05 003B1   C9       A            RET

705                               *    CALLS FOR PRINT 20 MS SYN BACKGROUND

707   05 003B2   0000     N   PRNT20   DW         PRT@SWS
708   05 003B4   0000     N            DW         TON@DIS
709   05 003B6   0000     N            DW         PAP@TGL3
710   05 003B8   0000     N            DW         LMP@CTRL
711   05 003BA   0000     N            DW         FDR@BKFD
712   05 003BC   0000     N            DW         SORTER@
713   05 003BE   0000     N            DW         ELV@PRNT
714   05 003C0   0000     N            DW         SOS@JMDT
715   05 003C2   0000     N            DW         DSPL@CTL
716   05 003C4   0000     N            DW         INSTRU
717   05 003C6   FFFF     A            DW         X'FFFF'                        END OF TABLE

719                               *    CALLS FOR PRINT 100 MS SYN BACKGROUND

721   05 003C8   0000     N   PRNT100  DW         BILK@CK
722   05 003CA   0000     N            DW         2SD@RUN
723   05 003CC   0000     N            DW         LITE@OFF
724   05 003CE   0000     N            DW         XMM@PRNT
725   05 003D0   0000     N            DW         FUS@RDUT
726   05 003D2   0000     N            DW         READY@CK
727   05 003D4   0000     N            DW         JAM@RST
728   05 003D6   0000     N            DW         MINIPHS8
729   05 003D8   4F06     N            DW         SMPL@CPY
730   05 003DA   0000     N            DW         RXCYCLDN                       STUB IN US IMG
731   05 003DC   0000     N            DW         KEY@CNTR
```

```
05 003DE   0000     N            DW        TSTOLP4
05 003E0   2C04     N            DW        PRT:CHG                    TEST IF OK TO
05 003F2   FF01     N            DW        STAT:CHG                                   LEAVE PRINT
05 003F4   FFFF     A            DW        X'FFFF'                    END OF TABLE
                          *      EPILOG

05 003E6   CD0000   N   PRNT:EPL CALL      AX@EPTY                    (1)
05 003E9   CD0000   N            CALL      FDM@EPL3                   (2)
05 003EC   CD0000   N            CALL      FDA@EPL3                   (3)
05 003EF   CD0000   N            CALL      TRN@EPL3
05 003F2   CD0000   N            CALL      DVL@NRDY
                                 COBIT,S   FUS$CAPL,FUS$LOAD,ILLM$SPL,;
05 003F5   CD0000   N                      EFO$11,EFO$12$5,SMPL$CPY,READY$
05 003F8   07       A
05 003F9   E6F7     A
05 003FB   EDFD     A
05 003FD   F2F7     A
05 003FF   ECF7     A
05 00401   EBF7     A
05 00403   E2FE     A
05 00405   E7FE     A
05 00407   CD0000   N            SOBIT,S   NPFO$ON                    TURN OFF PFO (INVERTED DRIVER)
05 0040A   E480     A
05 0040C   AF       A            CFLG      ELV@AUTO                   DISABLE AUTO-TRAY SWITCHING
05 0040D   3222F4   A
05 00410   CD0000   N            CALL      PAP@EPL3
05 00413   CD1704   N            CALL      ABORT
05 00416   C9       A            RET

                          *
                          *      SUBROUTINE
                          *

05 00417   F3       A   ABORT    DI                                   TURN OFF INTERRUPT SYSTEM
05 00418   AF       A            CFLG      TBLD@FIN                   SIGNAL NEW PITCH TABLE REQ'D
05 00419   325DF4   A
05 0041C   211907   N            LXI       H,EV@STBY:                 ADDR OF STBY EVENT TABLE
05 0041F   2264FD   N            SHLD      EV@PTR:                    SAVE FOR MACH CLK ROUTINE
05 00422   CD0000   N            COBIT,S   BTR$LOAD,PRNT$RLY          UN-LOAD BTR & DROP PRINT RELAY
05 00425   02       A
05 00426   E17F     A
05 00428   EAF7     A
05 0042A   FB       A            EI
05 0042B   C9       A            RET
05 0042C   3A66FD   N   PRT:CHG  IF:       XBYT,CYCUPCT:,EQ,2         CHECK FOR PROLOG 2 OR CYCLE OUT
05 0042F   FEC2     A
05 00431   C23C04   N
05 00434   3E80     A               SFLG      PRT$PRO2                YES, SET 'PRINT PROLOG 2' FLAG
05 00436   3271F4   A
05 00439   C37004   N            ORIF:     XBYT,A,EQ,3                NO, IS CYCLE UP CNTR=3
05 0043C   FEC3     A
05 0043E   C27004   N
05 00441   3A71F4   A            ANDIF:    FLG,PRT$PRO2,T             YES, AND IS PROLOG 2 FLAG SET
05 00444   07       A
05 00445   D27004   N
05 00448   AF       A               CFLG      PRT$PRO2                YES, DO PROLOG 2 AND CLR FLAG
05 00449   3271F4   A
                          *
                          *      PRINT STATE BACKGROUND- PROLOG 2
                          *
05 0044C   CD0000   N               CALL      PAP@PRL2                RETN XPORT OFF IF NOT SIDE 1
05 0044F   CD0000   N               CALL      PROG@UP2
05 00452   3AADF4   A               IF:       FLG,IMGMADE:,T          HAS 1ST IMAGE BEEN MADE
05 00455   07       A
05 00456   D25C04   N
05 00459   CD0000   N                  CALL      PROG@UP              YES, CALL PROG INITIALIZATION
                                    ENDIF
05 0045C   3A57FA   N               IF:       VBYT,MINIBYTE,NZ        IS MINI-PHYSICAL ACTIVE
05 0045F   A7       A
05 00460   CA7004   N
05 00463   AF       A                  CFLG      DSPL@1ST             YES, ENABLE DISPLAY UPDATE
05 00464   329AF4   A
05 00467   3C       A                  INR       A                    DISPLAY QUANTITY
05 00468   3250FA   N                  STA       DSPL@ST1              COMPLETE
05 0046B   3E06     A                  MVI       A,6                  SET DOCUMENT TOTAL TO
05 0046D   326FFA   N                  STA       DOC@TOTL              6 FOR ADH DOCUMENT CHECK
                                    ENDIF
                                 ENDIF

                          *      END PROLOG2

                          *
                          *      BUILD FLAG BYTE
                          *
05 00470   0608     A            MVI       B,8                        NUMBER OF FLAGS REQ'D
05 00472   AF       A            XRA       A                          CLEAR A-REG
05 00473   57       A            MOV       D,A                        CLEAR D-REG
05 00474   21A9F4   A            LXI       H,ADR(FLG,IMED@DN1)        STARTING ADDR OF PRT:CHG FLAGS
                                 REPEAT
05 00477   7E       A               MOV       A,M                     LOAD A W/CONTENTS OF FLAG ADDR
05 00478   07       A               RLC                               ROTATE FLAG(D7) INTO CARRY
05 00479   7A       A               MOV       A,D                     LOAD A W/FLAGS BILT INTO BYTE
05 0047A   17       A               RAL                               PUT FLAG IN DO & SHIFT LEFT
05 0047B   57       A               MOV       D,A                     SAVE RESULT IN D-REG
05 0047C   23       A               INX       H                       STEP TO NEXT FLAG
05 0047D   05       A               DCR       B                       DECR NUMBER OF FLAGS REQ'D
05 0047E   C27704   N            UNTIL:    CC,Z,S                     LOOP UNTIL ALL FLAGS IN BYTE
                                 ID:READ   IMED@DN1,CYCL@DN1,NORM@DN1,;  FLAGS READ
                                           QWIK:OUT,IMGMADE:,SD1@TIMO,;
                                           SD1@DLY,ADH@SELC
                          *
                          *      TEST FOR STATE CHANGE TO :RUNN
```

```
                                    *
05 00481   3A67FD   N              LDA     NOIMGCT!                    MOV CURRENT NO IMAGE COUNTER
05 00484   5F       A              MOV     E,A                         TO THE E-REG
05 00485   060E     A              MVI     B,14                        LOOP CNTR FOR STATE CHG TESTS
05 00487   21E104   N              LXI     H,CYC!OUT                   TABLE ADDR OF PRT!CHG TESTS
                                   REPEAT
05 0048A   7A       A                 MOV      A,D                     MOV FLAG BYTE TO THE A-REG
05 0048B   A6       A                 MODBYT   A,AND,M                 MASK FOR DESIRED FLAGS
05 0048C   23       A                 INX      H                       STEP TO STATUS TEST
05 0048D   AE       A                 MODBYT   A,XOR,M                 TEST FLAG STATUS
05 0048E   C29F04   N                 IF!      CC,Z,S                  DID TEST PASS
05 00491   23       A                    INX      H                    YES, STEP TO NOIMGCT! TEST
05 00492   7B       A                    IF!      XBYT,E,GE,M          IS NOIMGCT! AT CORRECT VALUE
05 00493   BE       A
05 00494   DA9E04   N
05 00497   3E05     A                       MVI      A,!RUNN           YES, CHANGE STATE
05 00499   3253FD   N                       STA      STATE!             TO RUN NOT PRINT
05 0049C   0601     A                       MVI      B,1               FORCE END OF TESTS (EARLY OUT)
                                         ENDIF
05 0049E   2B       A                    DCX      H                    ADJ PNTR BACK TO NO IMG TEST
                                      ENDIF
05 0049F   23       A                 INX      H                       STEP OVER NO IMG TEST
05 004A0   23       A                 INX      H                       STEP TO MASK FOR NEXT TEST
05 004A1   05       A                 DCR      B                       DECR LOOP COUNTER
05 004A2   C28A04   N              UNTIL!   CC,Z,S                     ALL TESTS COMPLETE OR STATE CHG
                                    *
05 004A5   7A       A              MOV      A,D                        MOV FLAG BYTE TO A-REG
05 004A6   E662     A              MODBYT   A,AND,D6!D5!D1             MASK AND TEST FOR FLAGS TRUE
                                   ID!READ  NORMODN!,CYCLODN!,SD1ODLY  FROM ABOVE BYTE BUILD
05 004A8   CABF04   N              IF!      CC,Z,C                     ARE ANY FLAGS TRUE
05 004AB   2166FD   A                 LXI      H,ADR(DATA,CYCUPCT!)    PREPARE TO TEST OR MODIFY
05 004AE   7E       A                 IF!      XBYT,M,GE,3             HAS PROG PUSHED IT TO 0
05 004AF   FE03     A
05 004B1   DAB604   N
                                         ID!READ   CYCUPCT!
05 004B4   3602     A                    MVI       M,2                 NO, FORCE CYCLE-UP MODE AGAIN
                                         ID!ALTR   CYCUPCT!
                                      ENDIF
05 004B6   CD0000   N                 COBIT,S   ILLM*SPL               ILLM SPL OFF DURING DEAD CYCLE
05 004B9   F2F7     A
05 004BB   AF       A                 CFLG      SMPLOFLG               CANCEL SAMPLE COPY SEQUENCE
05 004BC   324CF4   A
                                   ENDIF
05 004BF   C9       A              RET

                         PRT!IMD   IF!      FLGS,IMEDODN!,AND,!        IS IMEDIATE DOWN REQUESTED
05 004C0   3AA9F4   A                       TBLDOFIN,T                  AND HAS PROB BEEN DETECTED
05 004C3   2150F4   A
05 004C6   A6       A
05 004C7   F2D004   N
05 004CA   CD1704   N                 CALL      ABORT
05 004CD   C3E004   N              ORIF!    FLG,TIMEDDN!,T              IF TIMED DWN REQ'D DROP OUT
05 004D0   3AA7F4   A
05 004D3   07       A
05 004D4   D2E004   N
05 004D7   21E1FF   A                 COBIT     BTP*LOAD               BIAS TRANS ROLL (ASAP)
05 004DA   3E7F     A
05 004DC   F3       A
05 004DD   A6       A
05 004DE   77       A
05 004DF   FB       A
                                   ENDIF
05 004E0   C9       A              RET
                         *
                         *                                              D7 6 5 4 3 2 1 0 (X=DON'T CARE)
                         *
                         *                 TABLE OF FLAG STATUS TESTS   I C N O I S S A   N C
                         *                  AND NO IMAGE COUNTER VALUES M Y O W M D D D   O O
                         *                  USED TO DETERMINE IF STATE  E C R I G 1 1 H     U     T N
                         *                  SHOULD CHANGE FROM PRINT TO D L M K M O O O   I N   E U
                         *                  RUN NOT PRINT               O O O ! A T D S   M T   S M
                         *                                              D D D O D I L E   A E   T B
                         *                                              N N N U E M Y L   G R     E
                         *                                              ! ! ! T ! O   C   E       R
                         *
05 004E1   48       A    CYC!OUT   DB       D6!D3                       X 1 X X 0 X X X   00    1
05 004E2   40       A              DB       D6
05 004E3   00       A              DB       0
05 004E4   5C       A              DB       D6!D4!D3!D2                 X 1 X 0 1 1 X X   16    2
05 004E5   4C       A              DB       D6!D3!D2
05 004E6   10       A              DB       16
05 004E7   5C       A              DB       D6!D4!D3!D2                 X 1 X 0 1 0 X X   11    3
05 004E8   48       A              DB       D6!D3
05 004E9   0B       A              DB       11
05 004EA   68       A              DB       D6!D5!D3                    X 0 1 X 0 X X X   00    4
05 004EB   20       A              DB       D5
05 004EC   00       A              DB       0
05 004ED   75       A              DB       D6!D5!D4!D2!D0              X 0 0 0 X 1 X 0   36    5
05 004EE   04       A              DB       D2
05 004EF   24       A              DB       36
05 004F0   75       A              DB       D6!D5!D4!D2!D0              X 0 0 0 X 1 X 1   20    6
05 004F1   05       A              DB       D2!D0
05 004F2   14       A              DB       20
05 004F3   7D       A              DB       D6!D5!D4!D3!D2!D0           X 0 1 0 1 1 X 0   36    7
05 004F4   2C       A              DB       D5!D3!D2
05 004F5   24       A              DB       36
05 004F6   7D       A              DB       D6!D5!D4!D3!D2!D0           X 0 1 0 1 1 X 1   20    8
05 004F7   2D       A              DB       D5!D3!D2!D0
05 004F8   14       A              DB       20
05 004F9   75       A              DB       D6!D5!D4!D2!D0              X 0 0 0 X 0 X 0   21    9
05 004FA   00       A              DB       0
```

```
05 004FB    15       A            DB       21
05 004FC    7D       A            DB       D6ID5ID4ID3ID2ID0                 X 0 1 0 1 0 X 0   21    10
05 004FD    28       A            DB       D5ID3
05 004FE    15       A            DB       21
05 004FF    75       A            DB       D6ID5ID4ID2ID0                    X 0 0 0 X 0 X 1   13    11
05 00500    01       A            DB       D0
05 00501    0D       A            DB       13
05 00502    7D       A            DB       D6ID5ID4ID3ID2ID0                 X 0 1 0 1 0 X 1   13    12
05 00503    29       A            DB       D5ID3ID0
05 00504    0D       A            DB       13
05 00505    10       A            DB       D4                                X X X 1 X X X X   11    13
05 00506    10       A            DB       D4
05 00507    0B       A            DB       11
05 00508    80       A            DB       D7                                1 X X X X X X X   00    14
05 00509    80       A            DB       D7
05 0050A    00       A            DB       0
                            *NAR
                            *
                            *     R U N   N O T   P R I N T   S T A T E
                            *
                            *     RUN NOT PRINT- EXECUTES WHILE MACHINE IS COMPLETING A COPY RUN.
                            *     ENTERED FROM 'PRINT' AND EXITS TO 'NOT READY'.

                            *     PROLOG

05 0050B    CD0000   N   RUNN:PRL CALL     DO@ELV                        CAUSE ELV TO EXECUTE
05 0050E    CD0000   N            STIMR    RUNN:TMR,2500,RUNN@CHG        STAY IN RUNN 2.5 SEC
05 00511    2F       A
05 00512    FA       A
05 00513    7505     N
05 00515    CDA901   N            CALL     SB:PNTRS                      SYNC BKG PNTRS TO NEW STATE
05 00518    C9       A            RET

                            *     CALLS FOR RUN NOT PRINT 10 MS SYN BACKGROUND

05 00519    CD0000   N   RUNN10   CALL     ADH@CTRL
05 0051C    C9       A            RET

                            *     CALLS FOR RUN NOT PRINT 20 MS SYN BACKGROUND

05 0051D    0000     N   RUNN20   DW       RUNN@SWS
05 0051F    0000     N            DW       SORTER@
05 00521    0000     N            DW       SOS@JMDT
05 00523    0000     N            DW       FLV@PRNT
05 00525    0000     N            DW       LMP@CTRL
05 00527    0000     N            DW       PAP@TGL4
05 00529    0000     N            DW       DSPL@CTL
05 0052B    0000     N            DW       INSTRU
05 0052D    FFFF     A            DW       X'FFFF'                       END OF TABLE

                            *     CALLS FOR RUN NOT PRINT 100 MS SYN BACKGROUND

05 0052F    0000     N   RUNN100  DW       JAM@RST
05 00531    0000     N            DW       RILK@CK
05 00533    0000     N            DW       FUS@RDUT
05 00535    0000     N            DW       2SD@RUN
05 00537    0000     N            DW       XMH@PRNT
05 00539    0000     N            DW       LITE@OFF
05 0053B    0000     N            DW       TST@LP4
05 0053D    FF01     N            DW       STAT:CHG                      TEST IF OK TO LEAVE RUN NOT PRT
05 0053F    FFFF     A            DW       X'FFFF'                       END OF TABLE

05 00541    CD0000   N   RUNN:EPL CALL     DEL@CK                        CALC COPIES DELIVERED
05 00544    CD0000   N            CALL     PAP@EPL4                      'RUNNPRT' PAPER PATH MOP UP SUB
05 00547    CD0000   N            CALL     MOT@OFF                       TURN OFF SORTER MOTORS
05 0054A    CD0000   N            CALL     DO@ELV                        CAUSE ELV TO EXECUTE
05 0054D    AF       A            CFLG     AXFD@FLT                      RESET FOR USE DURING NEXT RUN
05 0054E    323FF4   A
05 00551    2123FC   A            CFBIT,P  TF@XMHO                       STOP BLINKING OF XMH 'OTHER'
05 00554    3EFE     A
05 00556    A6       A
05 00557    77       A
05 00558    CD0000   N            COBIT,S  SOS$SMPL
05 0055B    ECFD     A
05 0055D    CD7B05   N            CALL     NV@JAM
05 00560    CD0000   N            CALL     RCP@STRE                      STORE RECAP DATA IN RAM
05 00563    CD0000   N            CALL     ADH@MOTF
05 00566    3E08     A            MVI      A,8
05 00568    3285FA   N            STA      COOLCNT                       SET COUNTER FOR 7 TIMEOUTS
05 0056B    CD0000   N            CALL     PR@FAN
05 0056E    CD0000   N            CALL     FLT@EPL5                      (1)
05 00571    CD0000   N            CALL     HIST@FLE                      (2) LOG HISTORY DATA FOR RUN
05 00574    C9       A            RET                                    (3)

05 00575    2153FD   N   RUNN@CHG LXI      H,STATE!                      SET H&L TO ADDR OF STATE!
05 00578    3602     A            MVI      M,:NRDY                       CHANGE STATE! TO NOT READY
                                  IDIALTR  STATE!
05 0057A    C9       A            RET
05 0057B    3A66F4   A   NV@JAM   RFLG     UP@JAM                        LOAD A WITH SRT UPPER JAM FLAG
05 0057E    07       A
                            *                                            & SAVE IT IN THE CARRY BIT
05 0057F    3A36F4   A            LDAFLG   LOW@JAM                       LOAD A WITH SRT LOWER JAM FLAG
05 00582    17       A            RAL                                    & MOVE CARRY &
05 00583    17       A            RAL                                    LOW@JAM INTO THEIR POSITIONS
05 00584    07       A            RLC
05 00585    07       A            RLC
                                  MODBYT   A,AND,MSK(NVBIT,(             MASK FOR DESIRED BITS
05 00586    E60C     A                     NV@LOWEJ,NV@UP@J)
05 00588    47       A            MOV      B,A                           & SAVE IT IN THE B-REG
05 00589    3AA9F4   A            IFI      FLG,IMED@DN1,T                WAS THERE AN IMED DN CONDITION
05 0058C    07       A
05 0058D    D29605   N
05 00590    78       A               MOV      A,B                        YES,RESTORE A-REG
```

```
989                                          MODBYT    A,OR,MSK(NVBIT,NV@FJAM,   & SET NV JAM BITS
990   05 00591   F603     A                            NV@IMED)
991   05 00593   C3A105   N               ELSE:
992   05 00596   3A3CFD   A                   IF:      FBITS,FDR@AJAM,OR,FDR@MJAM,T IS EITHER JAM CONDITION TRUE
      05 00599   E60C     A
      05 0059B   CA9F05   N
993   05 0059E   37       A                      STC                            YES,SET CARRY
994                                          ENDIF
995   05 0059F   17       A                  RAL                                ROTATE INTO DO
996   05 005A0   B0       A                  MODBYT    A,OR,B                   'OR' IN SRT JAM BITS
997                                      ENDIF
998   05 005A1   32C9E2   A                  WNVNIB    NV@JAM@N
999                                          ID:ALTR   NV@FJAM,NV@IMED,NV@LOW@J,NV@UP@J
1000  05 005A4   C9       A                  RET                                RETURN TO STATE CHECKER
1002                                *NAR
1003                                *
1004                                *        T E C H   R E P   S T A T E
1005                                *
1006                                *        THE TECH REP STATE IS ENTERED WHEN THE SERVICE KEY IS ON IN
1007                                *        'NOT READY' & 'READY' STATES. THIS ALLOWS THE TECH REP TO PERFORM SUCH
1008                                *        TASKS AS ACCESS NON-VOLATILE MEMORY & COMPONENT CONTROL.

1010                                *
1011                                *        PROLOG
1012                                *
1013  05 005A5   CD0000   N   TREP:PRL  COBIT,S   WAITS                     INSURE WAIT OFF AT TREP ENTRANC
      05 005A8   E9FE     A
1014  05 005AA   CD0000   N             CALL      DGN@PRL                   DIAGNOSTIC PROLOG
1015  05 005AD   CDA901   N             CALL      SB:PNTRS                  SYNC BKG PNTRS TO NEW STATE
1016  05 005B0   C9       A             RET


1019                                *        CALLS FOR TECH REP 10MS SYN BACKGROUND

1021  05 005B1   CD0000   N   TREP10    CALL      ADH@CTRL
1022  05 005B4   C9       A             RET

1024                                *        CALLS FOR TECH REP 20MS SYN BACKGROUND

1026  05 005B5   0000     N   TREP20    DW        TREP@SWS
1027  05 005B7   0000     N             DW        MN@ELVRS
1028  05 005B9   0000     N             DW        LMP@CTRL
1029  05 005BB   0000     N             DW        DSPL@CTL
1030  05 005BD   0000     N             DW        DGN@BKG
1031  05 005BF   0000     N             DW        INSTRU
1032  05 005C1   FFFF     A             DW        X'FFFF'                   END OF TABLE

1034                                *        CALLS FOR TECH REP 100MS SYN BACKGROUND

1036  05 005C3   0000     N   TREP100   DW        NRILK@CK
1037  05 005C5   0000     N             DW        PSD@STPY
1038  05 005C7   0000     N             DW        XMM@STPY
1039  05 005C9   0000     N             DW        RED@BGND
1040  05 005CB   0000     N             DW        BIN@CHK
1041  05 005CD   0000     N             DW        JAM@RST
1042  05 005CF   0000     N             DW        DVL@DUMP
1043  05 005D1   0000     N             DW        FUS@RDUT
1044  05 005D3   0000     N             DW        TST@LP4
1045  05 005D5   DF05     N             DW        TREP:CHG                  TEST IF OK TO
1046  05 005D7   FF01     N             DW        STAT:CHG                          LEAVE TREP REP
1047  05 005D9   FFFF     A             DW        X'FFFF'                   END OF TABLE
1049                                *
1050                                *        EPILOG  (TECH REP STATE)
1051                                *
1052  05 005DB   CD0000   N   TREP:EPL  CALL      DGN@EPL                   DIAGNOSTIC EPILOG
1053  05 005DE   C9       A             RET

1055                                *        CHANGE OF STATE CHECK

1057  05 005DF   2153FD   A   TREP:CHG  LXI       H,ADR(DATA,STATE:)        PREPARE FOR POSSIBLE STATE CHG
1058  05 005E2   7E       A             IF:       XBYT,M,NE,:COMP           DO NOT CHG STATE IF IN COMP
      05 005E3   FE00     A
      05 005E5   CAFE05   N
1059  05 005E8   3A49F4   A                 IF:       FLG,SER@ACT,T         IF SERVICE KEY IS ON AND IF
      05 005EB   07       A
      05 005EC   D2FC05   N
1060  05 005EF   3A20FC   A                 ANDIF:    FBIT,DGN@PRT@,F        IN DIAG PRINT PROGRAM
      05 005F2   E6C2     A
      05 005F4   C2FC05   N
1061  05 005F7   3601     A                     MVI       M,:TREP           CHG TO TREP STATE
1062  05 005F9   C3FE05   N                 ELSE:                           IF KEY IS TURNED OFF
1063  05 005FC   3602     A                     MVI       M,:NRDY           CHG TO NOT READY STATE
1064                                            ENDIF
1065                                            ID:ALTR   STATE:
1066                                        ENDIF
1067  05 005FE   C9       A             RET
```

TABLE II

```
96                                  *        FIXED PITCH EVENT TABLE
97                                  *
98                                  *        EVENTS MUST BE IN SEQUENTIAL ORDER STARTING
99                                  *        WITH THE EVENT CLOSES TO PITCH RESET FIRST
100                                 *
101                                 *        THERE CAN BE NO MORE THAN 256 COUNTS BETWEEN EVENTS
102                                 *
103                                 *        FORMAT OF EVENTS FOR EVENT TABLE
104                                 *
```

```
                        *       EVENT     X,Y,Z
                        *       WHERE:
                        *       X = ABSOLUTE COUNTS FROM RESET
                        *       Y = SHIFT REGISTER NEEDED IN EVENT
                        *       Z = EVENT NAME
                        *
                        *
                        *       PITCH EVENTS
                        *
                                TABLE
05 0001E   0200    A            EVENT     2,3,TRN2CURR
05 00020   03      A
05 00021   0000    N
05 00023   0300    A            EVENT     3,2,ADC@ACT
05 00025   02      A
05 00026   0000    N
05 00028   0400    A            EVENT     4,3,FDR5AFLT
05 0002A   03      A
05 0002B   0000    N
05 0002D   0700    A            EVENT     7,0,SPLYS@ON
05 0002F   00      A
05 00030   0000    N
05 00032   0800    A            EVENT     8,2,FDR1AXFD
05 00034   02      A
05 00035   0000    N
05 00037   0A00    A            EVENT     10,3,FUS@LOAD
05 00039   03      A
05 0003A   0000    N
05 0003C   3000    A            EVENT     48,8,DECG@INV           DECISION GATE FOR INVTD COPIES
05 0003E   08      A
05 0003F   0000    N
05 00041   3600    A            EVENT     54,5,FUS@NTLD           FUSER LOADED TEST
05 00043   05      A
05 00044   0000    N
05 00046   5500    A            EVENT     85,3,FDR6MFLT
05 00048   03      A
05 00049   0000    N
05 0004B   5900    A            EVENT     89,2,FDR2MNFD
05 0004D   02      A
05 0004E   0000    N
05 00050   5D00    A            EVENT     93,8,JAM6@NON           PAPER PATH JAM SW PITCH EVENT
05 00052   08      A
05 00053   0000    N
05 00055   7600    A            EVENT     118,9,JAM5@INV          PAPER PATH JAM SW PITCH EVENT
05 00057   09      A
05 00058   0000    N
05 0005A   7800    A            EVENT     120,0,FSH@OFF
05 0005C   00      A
05 0005D   0000    N
05 0005F   8700    A            EVENT     135,0,PROG@HST          PROG HISTORY FILE UPDATE
05 00061   00      A
05 00062   0000    N
05 00064   8F00    A            EVENT     143,6,JAM4@CHK          PAPER PATH JAM SW PITCH EVENT
05 00066   06      A
05 00067   0000    N
05 00069   AA00    A            EVENT     170,10,RET2@CHK         PAPER PATH JAM SW PITCH EVENT
05 0006B   0A      A
05 0006C   0000    N
05 0006E   CF00    A            EVENT     207,3,SOS@CLN
05 00070   03      A
05 00071   0000    N
05 00073   D100    A            EVENT     209,2,TRN5CURR
05 00075   02      A
05 00076   0000    N
05 00078   E300    A            EVENT     227,5,JAM3@CHK          PAPER PATH JAM SW PITCH EVENT
05 0007A   05      A
05 0007B   0000    N
05 0007D   0901    A            EVENT     265,2,FDR3AEDG          ENABLE AUX FDR WT SENSOR
05 0007F   02      A
05 00080   0000    N
05 00082   0B01    A            EVENT     267,4,JAM2@CHK          PAPER PATH JAM SW PITCH EVENT
05 00084   04      A
05 00085   0000    N
05 00087   0E01    A            EVENT     270,8,RET1@CHK          PAPER PATH JAM SW PITCH EVENT
05 00089   08      A
05 0008A   0000    N
05 0008C   6901    A            EVENT     361,3,TRN3DTCK
05 0008E   03      A
05 0008F   0000    N
05 00091   6C01    A            EVENT     364,2,FDR4MEDG          ENABLE MAIN WT SENSOR
05 00093   02      A
05 00094   0000    N
05 00096   B901    A            EVENT     441,9,JAM6@INV          PAPER PATH JAM SW PITCH EVENT
05 00098   09      A
05 00099   0000    N
05 0009B   C201    A            EVENT     450,4,FUS@UNLD
05 0009D   04      A
05 0009E   0000    N
05 000A0   C301    A            EVENT     451,2,TRN1ROLL
05 000A2   02      A
05 000A3   0000    N
05 000A5   F401    A            EVENT     500,0,DPM@SMPL
05 000A7   00      A
05 000A8   0000    N
05 000AA   0E02    A            EVENT     526,3,TRN4DTCK
05 000AC   03      A
05 000AD   0000    N
05 000AF   1B02    A            EVENT     539,0,DVLV@OFF          TURN OFF VAR DENS DEVELOPERS
05 000B1   00      A
05 000B2   0000    N
05 000B4   5802    A            EVENT     600,0,PIL@PLOP          TEST FOR PLATEN OPEN      (BLG)
05 000B6   00      A
05 000B7   0000    N
```

```
05 00089   7602    A          EVENT    630,5,INVTRCTL           INVTR GATE & RETURN CONTROL
05 0008B   05      A
05 0008C   0000    N
05 0008E   8A02    A          EVENT    650,6,DECG@NON           DECISION GATE FOR NON-INVTD
05 000C0   06      A
05 000C1   0000    N
05 000C3   9A02    A          EVENT    666,0,JAM@DLY
05 000C5   00      A
05 000C6   0000    N
05 000C8   BC02    A          EVENT    700,7,JAM5@NON           PAPER PATH JAM SW PITCH EVENT
05 000CA   07      A
05 000CB   0000    N
05 000CD   2003    A          EVENT    800,0,PROGMODE
05 000CF   00      A
05 000D0   0000    N
05 000D2   2203    A          EVENT    802,0,FSH@ENB
05 000D4   00      A
05 000D5   0000    N
05 000D7   5003    A          EVENT    848,0,DVB@VAR            TURN ON VARIABLE-BIAS DEVELOPER
05 000D9   00      A
05 000DA   0000    N
05 000DC   5203    A          EVENT    850,4,SRSK@EV            INIT SRSK & SRT MOTOR
05 000DE   04      A
05 000DF   0000    N
05 000E1   5403    A          EVENT    852,0,PECOFFEV           TURN OFF POST EXP. COROTRON
05 000E3   00      A
05 000E4   0000    N
05 000E6   8C03    A          EVENT    908,0,PECONEV            TURN ON POST EXP COROTRON
05 000E8   00      A
05 000E9   0000    N
05 000EB   8E03    A          EVENT    910,0,910@EV
05 000ED   00      A
05 000EE   0000    N
05 000F0   9003    A          EVENT    912,0,DGN&HCNT
05 000F2   00      A
05 000F3   0000    N
05 000F5   A703    A          EVENT    935,0,OVER@RUN
05 000F7   00      A
05 000F8   0000    N
                              ENDTABLE
```

TABLE III

```
                              *
                              *        VARIABLE PITCH EVENT TABLE
                              *
         00000001             FLSH@BSE  EQU      1
         00000019             FO@ONBSE  EQU      25
         00000064             FO@OFFBS  EQU      100
05 00000   0100    A          ROM@FSH   DW       FLSH@BSE
05 00002   00      A                    DB       0
05 00003   0000    N                    DW       FSH@ON
05 00005   6400    A          ROM@OFF   DW       FO@OFFBS
05 00007   00      A                    DB       0
05 00008   0000    N                    DW       FO@OFF
05 0000A   1900    A          ROM@ON    DW       FO@ONBSE
05 0000C   00      A                    DB       0
05 0000D   0000    N                    DW       FO@ON
05 0000F   0100    A          ROM@FSHS  DW       FLSH@BSE
05 00011   00      A                    DB       0
05 00012   0000    N                    DW       FSH@ON@S
05 00014   6400    A          ROM@OFFS  DW       FO@OFFBS
05 00016   00      A                    DB       0
05 00017   0000    N                    DW       FO@OFF@S
05 00019   1900    A          ROM@ONS   DW       FO@ONBSE
05 0001B   00      A                    DB       0
05 0001C   0000    N                    DW       FO@ON@S
                              *
```

TABLE IV

```
         00000396             BASE@CNT SET      918               #CLK CNTS/PITCH
         0000038E             SAFE@CNT SET      910               MIN # CLK CNTS/PITCH
                              *
                              *        PITCH TABLE BUILDER
                              *
                              *        BUILD VARIABLE PITCH EVENT TABLE INTO RAM
                              *        FROM ROM DATA + REDUCTION ADJUST & FO TRIM
                              *
05 000FA   2A0000  N          TBLD@PRT LHLD     ROM@FSH           H&L= BASE CNT OF FLASH
05 000FD   EB      A                   XCHG                       D&E= BASE CNT OF FLASH
05 000FE   2A9AFC  N                   LHLD     1FLSH@ON          H&L= RED ADJ
05 00101   19      A                   DAD      D                 H&L= BASE + ADJ
05 00102   2244FC  N                   SHLD     RAM@FSH           RAM@FSH = BASE + ADJ
                              *
05 00105   2A0500  N                   LHLD     ROM@OFF           H&L= BASE CNT OF FO OFF
05 00108   EB      A                   XCHG                       D&E= BASE CNT OF FO OFF
05 00109   2A9CFC  N                   LHLD     1FO@OFF           H&L= RED ADJ + TRIM ADJ
05 0010C   19      A                   DAD      D                 H&L= BASE + ADJ
05 0010D   2249FC  N                   SHLD     RAM@OFF           RAM@OFF = BASE + ADJ
                              *
05 00110   2A0A00  N                   LHLD     ROM@ON            H&L= BASE CNT OF FO ON
05 00113   EB      A                   XCHG                       D&E= BASE CNT OF FO ON
05 00114   2A9EFC  N                   LHLD     1FO@ON            H&L= RED ADJ + TRIM ADJ
05 00117   19      A                   DAD      D                 H&L= BASE + ADJ
05 00118   CDEA02  N                   CALL     ON@MOD            CALL MOD ROUTINE TO MOD IF<0
05 0011B   224EFC  N                   SHLD     RAM@ON            RAM@ON = RESULTS OF ABOVE
                              *
```

```
188   05 0011E   3A31F4   A          IF!     FLG,IMG@SFT,T          IS THERE IMAGE SHIFT
      05 00121   07       A
      05 00122   D25601   N
189   05 00125   3E06     A              MVI     A,6                YES,# OF VAR EVENTS TO USE = 6
190   05 00127   47       A              MOV     B,A                SET UP B=REG FOR LOOP CONTROL
191   05 00128   3262FA   N              STA     TBLD@NUM           STORE # OF VAR EVENTS
192   05 0012B   3D       A              DCR     A                  SET UP # OF TIMES TO GO
193   05 0012C   3263FA   N              STA     TBLD@TMP           THRU SORT
194                             *
195   05 0012F   2A0F00   N              LHLD    ROM@FSHS           UPDATE ROM@FSHS TO
196   05 00132   EB       A              XCHG                       INCLUDE RED MODE ADJ + SHIFT
197   05 00133   2AA0FC   N              LHLD    2FLSH@ON           ADJ AND SAVE FOR THE
198   05 00136   19       A              DAD     D                  IMAGE SHIFT
199   05 00137   2253FC   N              SHLD    RAM@FSHS           FLASH EVENT
200                             *
201   05 0013A   2A1400   N              LHLD    ROM@OFFS           UPDATE ROM@OFFS TO INCLUDE
202   05 0013D   EB       A              XCHG                       RED MODE ADJ + TRIM ADJ +
203   05 0013E   2AA2FC   N              LHLD    2FE@OFF            SHIFT ADJ AND SAVE
204   05 00141   19       A              DAD     D                  FOR THE IMAGE SHIFT
205   05 00142   2258FC   N              SHLD    RAM@OFFS           FADE OUT EVENT
206                             *
207   05 00145   2A1900   N              LHLD    ROM@ONS            UPDATE ROM@ONS TO INCLUDE
208   05 00148   EB       A              XCHG                       RED MODE ADJ + TRIM ADJ +
209   05 00149   2AA4FC   N              LHLD    2FE@ON             SHIFT ADJ
210   05 0014C   19       A              DAD     D
211   05 0014D   CDEA02   N              CALL    ON@MOD             CALL MOD ROUTINE TO MOD IF <0
212   05 00150   225DFC   N              SHLD    RAM@ONS            SAVE THE RESULTS
213                             *
214   05 00153   C36001   N          ELSE:
215   05 00156   3E03     A              MVI     A,3                IF IMAGE SHIFT NOT SET
216   05 00158   47       A              MOV     B,A                #OF VAR EVENTS TO USE = 3
217   05 00159   3262FA   N              STA     TBLD@NUM           SET UP B=REG FOR LOOP CONTROL
218   05 0015C   3D       A              DCR     A                  STORE # OF VAR EVENTS & SETUP
219   05 0015D   3263FA   N              STA     TBLD@TMP           #OF TIMES TO GO THRU SORT
220                                  ENDIF
221                             *
440                             *
441                             *    SUBROUTINE TO DETERMINE IF MODIFIED FO ON EVENT
442                             *    CLK COUNT IF CLK COUNT RESULTS ARE NEGATIVE OR 0
443                             *
444   05 002EA   7C       A  ON@MOD  MOV     A,H                        A= MS PART OF ABS CLK COUNT
445   05 002EB   07       A          RLC                                CARRY= SIGN OF ABS CLK COUNT
446   05 002EC   D20203   N          IF!     CC,C,S                     IS THE ABS CLK CNT NEG
447   05 002EF   119603   A              LXI     D,BASE@CNT             YES,ADD # CLK COUNTS PER PITCH
448   05 002F2   19       A              DAD     D                      TO NEG #
449   05 002F3   118E03   A              IF!     XWRD,H,GE,SAFE@CNT     IS RESULTS GE SAFE # CLK/PITCH
      05 002F6   CD0000   N
      05 002F9   DAFF02   N
450   05 002FC   210100   A                  LXI     H,1                YES,MOVE TO TURN ON LATER
451                                      ENDIF
452   05 002FF   C30E03   N          ORIF!   XWRD,H,EQ,0                IF RESULTS = 0, MOVE LATER IN
      05 00302   110000   A
      05 00305   CD0000   N
      05 00308   C20E03   N
453   05 0030B   210100   A              LXI     H,1                    PITCH BECUASE EVENT MUST BE > 0
454                                  ENDIF
455   05 0030E   C9       A          RET
456                                  END

CONTROL SECTION SUMMARY: 01 00000   PT 0     02 00000   PT 0     03 00000   PT 0     04 OFFD8   PT 2
                         05 0030F   PT 1
* NO UNDEFINED SYMBOLS
*    ERROR SEVERITY LEVEL: 0
* NO ERROR LINES
```

TABLE V

```
252                             *
253                             *    SORTS VARIABLE RAM EVENT TABLE BY
254                             *    ABS CLK COUNT & LOWEST ENDS IN EV@RAM
255                             *
256                             *    SORTS ONLY 1ST 3 IF NO IMAGE SHIFT, OTHERWISE SORTS ALL 6
257                             *
258   05 0017E   2144FC   N          LXI     H,EV@RAM                   H&L= ADDR OF TOP OF VAR RAM TBL
259   05 00181   3A63FA   N          WHILE!  XBYT,TBLD@TMP,NE,0         TIMES TO GO THRU OUTER LOOP
      05 00184   FE00     A
      05 00186   CAFD01   N
260   05 00189   3253FA   N              STA     IN@LP@CT               INTER LOOP CNT=OUTER LOOP CNT
261   05 0018C   3E80     A              SFLG    TBLD@1ST               SET 1ST FLAG FOR THIS POSITION
      05 0018E   325EF4   A
262   05 00191   2252FB   N              SHLD    FIX@ADDR               ADDR OF POSITION TO FULL
263   05 00194   B7       A              ORA     A                      CLEAR Z CONDITION BIT
264   05 00195   CAEF01   N              WHILE!  CC,Z,C
265   05 00198   5E       A                  MOV     E,M                E= LS PART OF ABS CLK COUNT
266   05 00199   23       A                  INX     H
267   05 0019A   56       A                  MOV     D,M                D= MS PART OF ABS CLK COUNT
268   05 0019B   D5       A                  PUSH    D                  STORE ABS CLK CNT OF FILL POS
269   05 0019C   3A5EF4   A                  IF!     FLG,TBLD@1ST,T     IS IT 1ST TIME FOR THIS POS
      05 0019F   07       A
      05 001A0   D2AE01   N
270   05 001A3   AF       A                      CFLG    TBLD@1ST       YES, CLEAR ITS FLAG
      05 001A4   325EF4   A
271   05 001A7   23       A                      INX     H              AND INCREMENT
272   05 001A8   23       A                      INX     H              POINTER TO LS PART OF
273   05 001A9   23       A                      INX     H              ABS CLK COUNT OF NEXT
274   05 001AA   23       A                      INX     H              EVENT
275   05 001AB   C3B601   N                  ELSE:
276   05 001AE   2A5CFB   N                      LHLD    VAR@ADDR       H&L= ADDR
277   05 001B1   23       A                      INX     H              OF LS PART OF
278   05 001B2   23       A                      INX     H              ABS CLK COUNT TO
279   05 001B3   23       A                      INX     H              COMPARE TO FILL
280   05 001B4   23       A                      INX     H              POSITION
```

```
05 001B5   23      A           INX      H
                             ENDIF
05 001B6   225CFB  N         SHLD     VAR@ADDR            STORE POINTER TO COMPARE EVENT
05 001B9   5E      A         MOV      E,M                 E= LS PART OF COMPARE ABS CLK
05 001BA   23      A         INX      H
05 001BB   56      A         MOV      D,M                 D= MS PART OF COMPARE ABS CLK
05 001BC   E1      A         POP      H                   H&L= ABS CLK COUNT OF FILL POS
05 001BD   EB      A         IF:      XWRD,D,LT,H         IS CLK OF COMPARE < FILL
05 001BE   CD0000  N
05 001C1   D2E501  N
05 001C4   2A5CFB  N              LHLD     VAR@ADDR       YES, SWITCH THE 2 EVENTS
05 001C7   EB      A              XCHG                    D&E= ADDR LOWER CLK VALUE
05 001C8   2A52FB  N              LHLD     FIX@ADDR       H&L= ADDR LARGER CLK VALUE
05 001CB   3EFB    A              MVI      A,-5           INITIALIZE LOOP COUNTER TO 5
05 001CD   3265FA  N              STA      TSW@NUM        WHICH = # OF ITEMS TO MOVE
05 001D0   B7      A              ORA      A              CLEAR Z CONDITION BIT
05 001D1   CAE501  N              WHILE:   CC,Z,C
05 001D4   1A      A                   LDAX     D         A= CONTAINS OF COMPARE EVENT
05 001D5   46      A                   MOV      B,M       B= CONTAINS OF FILL EVENT
05 001D6   77      A                   MOV      M,A       UPDATE FILL POS
05 001D7   78      A                   MOV      A,B       UPDATE COMPARE POS
05 001D8   12      A                   STAX     D         WITH NEW VALUE
05 001D9   13      A                   INX      D         MOVE POINTERS TO
05 001DA   23      A                   INX      H         NEXT ITEM
05 001DB   3A65FA  N                   LDA      TSW@NUM   INC MOVE
05 001DE   3C      A                   INR      A         LOOP CONTROL
05 001DF   3265FA  N                   STA      TSW@NUM   COUNTER
05 001E2   C3D101  N              ENDWHILE
                             ENDIF
05 001E5   2153FA  N         DECBYT   IN@LP@CT            DECRM INNER LOOP CNTR
05 001E8   35      A
05 001E9   2A52FB  N              LHLD     FIX@ADDR       H&L= ADDR OF FILL POSITION
05 001EC   C39501  N         ENDWHILE
05 001EF   110500  A         LXI      D,5                 MOVE H&L TO LOOK AT NEXT EVENT
05 001F2   19      A         DAD      D                   POSITION TO FILL
05 001F3   3A63FA  N         LDA      TBLD@TMP            DECREMENT # OF EVENTS
05 001F6   3D      A         DCR      A                   TO SORT
05 001F7   3263FA  N         STA      TBLD@TMP
05 001FA   C38101  N      ENDWHILE
```

TABLE VI

```
                   *
                   *   MOVE THE SR# & EVENT ADDR FROM ROM TABLE
                   *   TO RAM TABLE.  MOVES ONLY THE FIRST 3 IF
                   *   NO IMAGE SHIFT, OTHERWISE MOVES ALL 6
                   *
05 00160   1144FC  N   LXI      D,RAM@FSH        D&E = ADDR OF RAM TABLE
05 00163   210000  N   LXI      H,ROM@FSH        H&L = ADDR OF ROM TABLE
05 00166   B0      A   ORA      B                CLEAR Z CONDITION BIT
05 00167   CA7E01  N   WHILE:   CC,Z,C
05 0016A   23      A        INX      H           INCREMENT H&L AND D&E
05 0016B   23      A        INX      H           POINTERS OVER THE
05 0016C   13      A        INX      D           ABS CLK COUNT
05 0016D   13      A        INX      D
05 0016E   7E      A        MOV      A,M         LOAD A WITH SR#
05 0016F   12      A        STAX     D           STORE SR# IN RAM TABLE
05 00170   23      A        INX      H           MOVE POINTERS TO LS
05 00171   13      A        INX      D           ADDR OF EVENT
05 00172   7E      A        MOV      A,M         LOAD A WITH LS ADDR OF EVENT
05 00173   12      A        STAX     D           & STORE IT IN RAM TABLE
05 00174   23      A        INX      H           MOVE POINTERS TO MS
05 00175   13      A        INX      D           ADDR OF EVENT
05 00176   7E      A        MOV      A,M         MOVE MS ADDR OF EVENT
05 00177   12      A        STAX     D           TO RAM
05 00178   23      A        INX      H           MOVES POINTERS TO
05 00179   13      A        INX      D           LS PART OF ABS CLK COUNT
05 0017A   05      A        DCR      B           DECREMENT LOOP COUNTER
05 0017B   C36701  N   ENDWHILE
                   *
```

TABLE VII

```
                   *
                   *   MERGE VARIABLE PITCH EVENT TABLE & FIXED EVENT
                   *   TABLE CALCULATING THE REL DIFFERENCE WITH THE
                   *   RESULTS GOING INTO THE RUN EVENT TABLE
                   *
05 001FD   2A44FC  N   LHLD     EV@RAM                INITIALIZE VAR@CLK TO ABS CLK
05 00200   225EFB  N   SHLD     VAR@CLK               COUNT OF 1ST VAR PITCH EVENT
05 00203   2144FC  N   LXI      H,EV@RAM              INITIALIZE VAR@ADDR TO ADDR OF
05 00206   225CFB  N   SHLD     VAR@ADDR              1ST VAR PITCH EVENT
05 00209   211E00  N   LXI      H,EV@ROM              INITIALIZE FIX@ADDR TO ADDR OF
05 0020C   2252FB  N   SHLD     FIX@ADDR              1ST FIXED PITCH EVENT
05 0020F   3E80    A   SFLG     TBLD@1ST              NOTES 1ST EVENT TO RUN TABLE
05 00211   325EF4  A
05 00214   3E2C    A   MVI      A,TABLENUM            INITIALIZE TSW@NUM TO # OF
05 00216   3265FA  N   STA      TSW@NUM               EVENTS IN FIXED PITCH TABLE
05 00219   2A1E00  N   LHLD     FV@ROM                INITIALIZE D&E WITH ABS CLOCK
05 0021C   EB      A   XCHG                           COUNT OF 1ST FIXED EVENT
05 0021D   AF      A   CFLG     VAR@DONE              FLAG DENOTES VAR EVENTS
05 0021E   3259F4  A
05 00221   3A59F4  A   WHILE:   FLG,VAR@DONE,F        WHILE THERE ARE MORE VAR EVENTS
05 00224   07      A
05 00225   DA6F02  N
05 00228   2A5EFB  N        IF:      XWRD,VAR@CLK,LE,D    IS VAR CLK CNT <= FIXED CLK CNT
05 0022B   CD0000  N
05 0022E   DA3402  N
05 00231   C25902  N
```

```
05 00234  2A5CFB  N                  LHLD     VAR@ADDR          YES, H&L= VAR EVENT ADDR
05 00237  CD9302  N                  CALL     TBLD@UPD          PLACE VAR EVENT AT END RUN TBL
05 0023A  3A62FA  N                  LDA      TBLD@NUM          DECREMENT # OF
05 0023D  3D      A                  DCR      A                 VARIABLE EVENTS LEFT
05 0023E  3262FA  N                  STA      TBLD@NUM          TO MERGE
05 00241  C24C02  N                  IF:      CC,Z,S            DID TBLD@NUM GO TO 0
05 00244  3E80    A                       SFLG     VAR@DONE     YES,DENOTE NO MORE VAR EVENTS
05 00246  3259F4  A
05 00249  C35602  N                  ELSE:
05 0024C  225CFB  N                       SHLD     VAR@ADDR     STORE ADDR OF NEXT VAR EVENT
05 0024F  5E      A                       MOV      E,M          UPDATE VAR@CLK TO
05 00250  23      A                       INX      H            VALUE OF ABS CLK COUNT
05 00251  56      A                       MOV      D,M          OF PRESENT VARIABLE
05 00252  EB      A                       XCHG                  EVENT
05 00253  225EFB  N                       SHLD     VAR@CLK
                                     ENDIF
05 00256  C36602  N             ELSE:                           IF FIXED TABLE CLK COUNT IS
05 00259  2A52FB  N                  LHLD  .  FIX@ADDR          LESS THEN VAR TABLE UPDATE THE
05 0025C  CD9302  N                  CALL     TBLD@UPD          RUN TABLE WITH THAT EVENT
05 0025F  2252FB  N                  SHLD     FIX@ADDR          UPDATE TO NEXT FIXED EVENT
05 00262  2165FA  N                  LXI      H,TSW@NUM         DECREMENT # OF FIXED EVENTS
05 00265  35      A                  DCR      M                 LEFT
                                ENDIF
05 00266  2A52FB  N             LHLD     FIX@ADDR
05 00269  5E      A             MOV      E,M                    UPDATE D&L TO =
05 0026A  23      A             INX      H                      ABS CLK CNT VALUE
05 0026B  56      A             MOV      D,M                    OF PRESENT FIXED TABLE
05 0026C  C32102  N        ENDWHILE
05 0026F  3EFF    A        MVI      A,X'FF'                     CLEAR Z CONDITION
05 00271  B7      A        ORA      A                           BIT FOR LOOP
05 00272  2A52FB  N        LHLD     FIX@ADDR                    NO MORE VAR EVENTS, USE FIXED
05 00275  CA8402  N        WHILE:   CC,Z,C                      DONE WITH FIXED TABLE
05 00278  CD9302  N             CALL     TBLD@UPD               NO,UPDATE RUN TABLE
05 0027B  EB      A             XCHG                            SAVE H&L IN D&E
05 0027C  2165FA  N             LXI      H,TSW@NUM              DECREMENT # OF FIXED
05 0027F  35      A             DCR      M                      EVENTS LEFT
05 00280  EB      A             XCHG                            RESTORE H&L
05 00281  C37502  N        ENDWHILE
05 00284  2A58FB  N        LHLD     P@TBL@A                     H&L=ADDR OF LAST MS ADDR IN RUN
05 00287  2B      A        DCX      H                           MOVE H&L POINTER BACK TO POINT
05 00288  2B      A        DCX      H                           AT THE BEGINNING OF THE LAST
05 00289  2B      A        DCX      H                           EVENT (OVER@RUN) & STORE IT
05 0028A  2264FD  N        SHLD     EV@PTR:                     FOR MACH CLK INTERRUPT HANDLER
05 0028D  3E80    A        SFLG     TBLD@FIN                    DENOTES PITCH TABLE IS COMPLETE
05 0028F  325DF4  A
05 00292  C9      A        RET
                    *
                    *      SUBROUTINE TO CALCULATE REL DIFFERENCE BETWEEN
                    *      2 EVENTS & MOVE REST OF TABLE TO RUN TABLE
                    *
05 00293  3A5EF4  A TBLD@UPD IF:      FLG,TBLD@1ST,T           THIS IS THE FIRST EVENT
05 00296  07      A
05 00297  D2AF02  N
05 0029A  AF      A             CFLG     TBLD@1ST              YES, CLR FLAG TO KEEP OUT
05 0029B  325EF4  A
05 0029E  7E      A             MOV      A,M                   A= LS OF 1ST EVENT ABS CLK CNT
05 0029F  3251FA  N             STA      EV@1STIM              .USED AT PITCH RESET
05 002A2  5F      A             MOV      E,A                   E=LS OF 1ST EVENT ABS CLK CNT
05 002A3  23      A             INX      H                     H&L=ADDR OF MS ABS CLK CNT
05 002A4  56      A             MOV      D,M                   D=MS OF 1ST EVENT ABS CLK CNT
05 002A5  EB      A             XCHG                           D&E= ADDR OF MS ABS CLK CNT
05 002A6  2256FB  N             SHLD     LCLK@CNT              STORE ABS CLK OF 1ST EVENT
05 002A9  21E8FE  N             LXI      H,EV@BASE:            H&L = ADDR OF RUN TABLE
05 002AC  C30802  N        ELSE:
05 002AF  5E      A             MOV      E,M                   E=LS CLK CNT OF NEW EVENT
05 002B0  23      A             INX      H                     H&L= ADDR OF MS ABS CLK CNT
05 002B1  56      A             MOV      D,M                   D=MS CLK CNT OF NEW EVENT
05 002B2  E5      A             PUSH     H                     SAVE ADDR OF MS ABS CLK CNT
05 002B3  2A56FB  N             IF:      XWRD,LCLK@CNT,GE,D    IS LAST CLK CNT GE NEW CLK CNT
05 002B6  CD0000  N
05 002B9  DAC502  N
05 002BC  23      A                  INX      H                H&L= LAST CLK CNT + 1
05 002BD  2256FB  N                  SHLD     LCLK@CNT         STORE IT FOR NEXT TIME
05 002C0  3E01    A                  MVI      A,1              PUT THIS EVENT AT THE NEXT CLK
05 002C2  C3CC02  N             ELSE:
05 002C5  45      A                  MOV      B,L              B=LS CLK CNT OF LAST EVENT
05 002C6  EB      A                  XCHG                      H&L=ABS CLK CNT OF NEW EVENT
05 002C7  2256FB  N                  SHLD     LCLK@CNT         STORE IT FOR THE NEXT TIME
05 002CA  7D      A                  MOV      A,L              A=LS CLK CNT OF NEW EVENT
05 002CB  90      A                  SUB      B                FIND DIFF (ONLY NEED LS IF CLK
                                ENDIF                          CNTS BETWEEN EVENTS <256)
05 002CC  D1      A             POP      D                     D&E=ADDR OF MS OF CLK OF NEW EV
05 002CD  2A58FB  N             LHLD     P@TBL@A               H&L= ADDR OF END OF LAST RUN EV
05 002D0  2B      A             DCX      H                     MOVE H&L POINTER
05 002D1  2B      A             DCX      H                     TO REL DIFF OF LAST
05 002D2  2B      A             DCX      H                     EVENT IN RUN TABLE
05 002D3  77      A             MOV      M,A                   MOVE REL DIFF TO RUN TABLE
05 002D4  23      A             INX      H                     INCREMENT RUN TABLE
05 002D5  23      A             INX      H                     POINTER OVER LAST
05 002D6  23      A             INX      H                     EVENT
05 002D7  23      A             INX      H
                           ENDIF
05 002D8  23      A        INX      H                          H&L= ADDR OF SR# IN RUN TABLE
05 002D9  13      A        INX      D                          D&E= ADDR OF SR#
05 002DA  1A      A        LDAX     D                          MOVE SR# FROM TABLE TO
05 002DB  77      A        MOV      M,A                        RUN TABLE
05 002DC  23      A        INX      H                          MOVE POINTERS TO LS 8 BITS
05 002DD  13      A        INX      D                          OF EVENT ADDR
05 002DE  1A      A        LDAX     D                          MOVE LS 8 BITS OF ADDR
05 002DF  77      A        MOV      M,A
05 002E0  23      A        INX      H                          MOVES POINTER TO MS 8 BITS
05 002E1  13      A        INX      D                          OF EVENT ADDR
05 002E2  1A      A        LDAX     D                          MOVES MS 8 BITS OF ADDR
05 002E3  77      A        MOV      M,A
```

```
435  05 002E4  2258FB  N          SHLD    P0TBL0A                    STORE ADDR OF RUN TABLE
436  05 002E7  13      A          INX     D                          POINTER TO LS 8 BITS OF CLK CNT
437  05 002E8  EB      A          XCHG                               H&L= ADDR OF LS 8 BITS OF CLK
438  05 002E9  C9      A          RET
440                       *
441                       *       SUBROUTINE TO DETERMINE IF MODIFIED FO ON EVENT
442                       *       CLK COUNT IF CLK COUNT RESULTS ARE NEGATIVE OR 0
443                       *
444  05 002EA  7C      A  ON0MOD  MOV     A,H                        A= MS PART OF ABS CLK COUNT
445  05 002EB  07      A          RLC                                CARRY= SIGN OF ABS CLK COUNT
446  05 002EC  D20203  N          IF:     CC,C,S                     IS THE ABS CLK CNT NEG
447  05 002EF  119603  A              LXI     D,BASE0CNT             YES,ADD # CLK COUNTS PER PITCH
448  05 002F2  19      A              DAD     D                      TO NEG #
449  05 002F3  118E03  A              IF:     XWRD,H,GE,SAFE0CNT     IS RESULTS GE SAFE # CLK/PITCH
     05 002F6  CD0000  N
     05 002F9  DAFF02  N
450  05 002FC  210100  A                  LXI     H,1                YES,MOVE TO TURN ON LATER
451                                   ENDIF
452  05 002FF  C30E03  N          ORIF:   XWRD,H,EQ,0                IF RESULTS = 0, MOVE LATER IN
     05 00302  110000  A
     05 00305  CD0000  N
     05 00308  C20E03  N
453  05 0030B  210100  A              LXI     H,1                    PITCH BECUASE EVENT MUST BE > 0
454                               ENDIF
455  05 0030E  C9      A          RET
456                               END

CONTROL SECTION SUMMARY: 01 00000   PT 0     02 00000   PT 0     03 00000   PT 0     04 0FFD8   PT 2
                         05 0030F   PT 1
* NO UNDEFINED SYMBOLS
*    ERROR SEVERITY LEVEL: 0
* NO ERROR LINES
```

TABLE VIII

```
219                       *
220                       * PITCH RESET INTERRUPT HANDLER
221                       *

223  06 000F9  FB      A  RSET:   EI                                 RE-ENABLE INTERRUPTS
224  06 000FA  F5      A          PUSH    PSW                        SAVE A-REG & CONDITION BITS
225  06 000FB  3A5DF4  A          IF:     FLG,TBLD0FIN,T             IS PITCH TABLE BUILD FINISHED
     06 000FE  07      A
     06 000FF  D26201  N
226  06 00102  E5      A              PUSH    H                      SAVE H&L
227                                   IF:     FLGS,SR0DONE,;         YES, IS THERE A NEW SR VALUE
228  06 00103  3A4DF4  A                      AND,9100DONE,T         YES, DID 910 EVENT GET DONE
     06 00106  216FF4  A
     06 00109  A6      A
     06 0010A  F25501  N
229  06 0010D  AF      A                  CFLG      9100DONE         YES, RESET & MACH CLK TIMING OK
     06 0010E  326FF4  A
230  06 00111  324DF4  A                  MODFLG    SR0DONE          CLR FLAG UNTIL NEXT SR EVENT
231  06 00114  2163FD  A                  LXI       H,ADR(DATA,SR0PTR:)  LOAD RELATIVE
232  06 00117  7E      A                  MOV       A,M                         PNTR TO SR #0
233  06 00118  C60F    A                  MODBYT    A,ADD,15         MOVE PNTR BACK
234  06 0011A  E66F    A                  MODBYT    A,AND,SR0ADJ:                 BY 1 (CIRCULAR)
235  06 0011C  77      A                  MOV       M,A              SAVE NEW REL SR PNTR IN SR0PTR:
236  06 0011D  26FE    A                  MVI       H,HADR(DATA,SHIFTREG) H&L= ABS ADDR
237  06 0011F  6F      A                  MOV       L,A                             OF SR #0
238  06 00120  3A69FD  A                  LDA       ADR(DATA,SR0VALU:)  A= NEW SR VALUE FROM SRSK
239  06 00123  77      A                  MOV       M,A              UPDATE CONTENTS OF SR#0
240  06 00124  3A51FA  A                  LDA       ADR(DATA,EV010TIM)  INIT MCLK:CNT
241  06 00127  326EFD  A                  STA       ADR(DATA,MCLK:CNT)             TO 1ST EVENT TIME
242  06 0012A  21E8FE  A                  LXI       H,ADR(DATA,EV0BASE:)  INIT EV0PTR:
243  06 0012D  2264FD  A                  SHLD      ADR(DATA,EV0PTR:)              TO 1ST EVENT ADDR
244                                       IF:       FLGS,NORM0DN:,;  IS NORMAL SHUTDOWN REQUESTED
245                                                 AND,CYCL0DN:,;   NO, IS CYCLE-DOWN REQUESTED
246  06 00130  3AABF4  A                            AND,SD100LY,F    NO, IS PROC DEAD CYCLING
     06 00133  21AAF4  A
     06 00136  B6      A
     06 00137  21AFF4  A
     06 0013A  B6      A
     06 0013B  FA5201  N
247  06 0013E  2166FD  A                      LXI     H,ADR(DATA,CYCUPCT:) NO, LOAD CYCLE-UP CNTR
248  06 00141  7E      A                      IF:     XBYT,M,NE,5      IS PROC IN CYCLE-UP MODE
     06 00142  FE05    A
     06 00144  CA5201  N
249  06 00147  FE04    A                          IF:     XBYT,A,EQ,4   YES, IS IT RDY TO MAKE 1ST IMG
     06 00149  C25101  N
250  06 0014C  3E80    A                              SFLG     IMGMADE:  YES, SIGNAL 1ST IMAGE MADE
     06 0014E  32ADF4  A
251                                               ENDIF
252  06 00151  34      A                          INR     M             INCRM CYCLE-UP CNTR (UNTIL= 5)
253                                           ENDIF
254                                       ENDIF
255  06 00152  C36101  N              ELSE:                            NEW SR VALUE NOT AVAILABLE
256  06 00155  3E80    A                  SFLG      IMED0DN:           REQUEST AN IMED SHUTDOWN
     06 00157  32A9F4  A
257  06 0015A  2132FD  A                  SFBIT,P   E0PR0FLT           SIGNAL EARLY PITCH RESET FAULT
     06 0015D  3E40    A
     06 0015F  B6      A
     06 00160  77      A
258                                   ENDIF
259  06 00161  E1      A              POP     H                        RESTORE H&L
260                               ENDIF
261  06 00162  3EFE    A          MVI     A,RSETFF:                    RESET PITCH RESET
262  06 00164  3200E6  A          STA     ADR(EQU,RSINTFF:)                         INT FLIP-FLOP
263  06 00167  F1      A          POP     PSW                          RESTORE A-REG & CONDITION BITS
264  06 00168  C9      A          RET                                  RETURN TO INTERRUPTED ROUTINE
```

TABLE IX

```
                                 *
                                 * MACHINE CLOCK INTERRUPT HANDLER
                                 *

      06 0002B                         ORIGIN    X'38'                  INTERRUPT TRAP CELL LOCATION

06 00038   F5       A   MCLK:   PUSH      PSW                           SAVE A-REG & CONDITION CODES
06 00039   3A6EFD   A           LDA       ADR(DATA,MCLK:CNT)            IS THERE
06 0003C   3D       A           DCR       A                                  A PITCH
06 0003D   C26600   N           IF:       CC,Z,S                                  EVENT TO DO
06 00040   E5       A               PUSH      H                         YES, SAVE
06 00041   D5       A               PUSH      D                              ALL REMAINING
06 00042   C5       A               PUSH      B                                        REGS
06 00043   2A64FD   A               LHLD      ADR(DATA,EV0PTR!)         H&L= 1ST LOC OF NEXT PE TO DO
06 00046   7E       A               MOV       A,M                       SAVE RELATIVE DIFFERENTIAL TO
06 00047   326EFD   A               STA       ADR(DATA,MCLK:CNT)        NEXT EVENT (# CLOCK COUNTS)
06 0004A   23       A               INX       H                         MOVE PNTR TO RFL SR IN TABLE
06 0004B   3A63FD   A               LDA       ADR(DATA,SR0PTR!)         LOAD REL POSITION OF SR #0
06 0004E   86       A               MODBYT    A,ADD,M                   C= LS PORTION OF ADDR OF THE
06 0004F   E66F     A               MODBYT    A,AND,SR0ADJ:             REQUESTED SHIFT REGISTER
06 00051   4F       A               MOV       C,A                       POSITION (FOR USE WITHIN PE)
06 00052   06FE     A               MVI       B,HADR(SHIFTREG)          B&C= ADDR REQUESTED SR POSITION
06 00054   0A       A               LDAX      B                         A= <REQUESTED SR POSITION>
06 00055   23       A               INX       H                         E= LS PORTION OF ADDR OF THE
06 00056   5E       A               MOV       E,M                       REQUESTED PITCH EVENT
06 00057   23       A               INX       H                         D= MS PORTION OF ADDR OF THE
06 00058   56       A               MOV       D,M                       REQUESTED PITCH EVENT
06 00059   23       A               INX       H                         SAVE PNTR TO
06 0005A   2264FD   A               SHLD      ADR(DATA,EV0PTR!)                  NEXT PITCH EVENT
06 0005D   CD0000   N               CALL      DE:IND                    VECTOR TO REQUESTED PITCH EVENT
06 00060   C1       A               POP       B                         RESTORE
06 00061   D1       A               POP       D                              SAVED
06 00062   E1       A               POP       H                                   REGISTERS
06 00063   C37000   N           ELSE:
06 00066   326EFD   A               STA       ADR(DATA,MCLK:CNT)        NO PE; SAVE DECRM'D 'MCLK:CNT'
06 00069   0F       A               RRC                                 IS IT TIME FOR
06 0006A   D27000   N               IF:       CC,C,S                                 A REFRESH
06 0006D   3202E6   A                   REFRESH                         YES, REFRESH REMOTES (1 MSEC)
                                    ENDIF
                                ENDIF
06 00070   FB       A           EI                                      RE-ENABLE INTERRUPT SYSTEM
06 00071   3EFD     A           MVI       A,MCLKFF:                     RESET MCLK
06 00073   3200E6   A           STA       ADR(EQU,RSINTFF!)                  INTERRUPT FLIP-FLOP
06 00076   F1       A           POP       PSW                           RESTORE A-REG & CONDITION CODES
06 00077   C9       A           RET                                     RETURN TO INTERRUPTED ROUTINE
```

TABLE X

```
                                 *
                                 * REAL TIME CLOCK INTERRUPT HANDLER
                                 *

06 00081   FB       A   RTC:    EI                                      RE-ENABLE INTERRUPTS
06 00082   F5       A           PUSH      PSW                           SAVE A-REG & CONDITION BITS
06 00083   3EF7     A           MVI       A,RTCFF:                      RESET RTC
06 00085   3200E6   A           STA       ADR(EQU,RSINTFF!)                  INTERRUPT FLIP-FLOP
06 00088   D5       A           PUSH      D                             SAVE D&E REGS
06 00089   E5       A           PUSH      H                             SAVE H&L REGS
06 0008A   C5       A           PUSH      B                             SAVE 'B' REGISTER
                         *
06 0008B   2150FD   N           DECBYT    GLB:TIMR                      DECREMENT THE CLOCK CELL
06 0008E   35       A
06 0008F   7E       A           MOV       A,M                           A = <GLB:TIMR>   ( 0 TO 255 )
06 00090   23       A           INX       H                             MEM. PTR. TO SB:RQST BYTE
06 00091   E601     A           IF:       XBYT,A,AND,X'01',NZ           IS IT 20 MSEC TIME YET
06 00093   CA9D00   N
06 00096   7E       A               MODBYT    M,OR,10:RQST!20:RQST      YES - BOTH 10 AND 20 BKGD
06 00097   F6C0     A
06 00099   77       A
06 0009A   C3A100   N           ELSE:
06 0009D   7E       A               MODBYT    M,OR,10:RQST              NO - 10 BKGD ONLY
06 0009E   F680     A
06 000A0   77       A
                                ENDIF
06 000A1   23       A           INX       H                             MEM. PTR. TO DIVD:10 CNTR
06 000A2   35       A           DCR       M                             DECREMENT 10 TO 0 COUNTER
06 000A3   C2AD00   N           IF:       CC,Z,S                        HAS 100 MSEC PASSED
06 000A6   360A     A               MVI       M,10                      YES - RESET THE 10 TO 0 COUNTER
06 000A8   2B       A               DCX       H                         MEM. PTR. BACK TO SB:RQST
06 000A9   7E       A               MODBYT    M,OR,100:RQST             ADD 100 BKGD TO REQUEST BYTE
06 000AA   F620     A
06 000AC   77       A
                                ENDIF
                                REPEAT                                  NOW CHECK FOR TIME OUTS
06 000AD   2150FD   N               LXI       H,GLB:TIMR                LOAD 'B' WITH QUANTITY TO LOOK
06 000B0   46       A               MOV       B,M                       FOR (CLOCK CELL VALUE)
06 000B1   16FB     A               MVI       D,COUNT:                  SET 'D' FOR TABLE TO SEARCH
06 000B3   CD0000   N               CALL      FIND:LOC                  GO LOOK IN ACTIVE LIST
06 000B6   CAF000   N               IF:       CC,Z,C                    HAS A MATCH BEEN FOUND
06 000B9   E5       A                   PUSH      H                     YES - SAVE LOCATION ON STACK
06 000BA   26FC     A                   MVI       H,ID:                 SEGWAY MEM PTR TO ID: TABLE
06 000BC   5E       A                   MOV       E,M                   NOW ASSEMBLE
06 000BD   1600     A                   MVI       D,0                   ADDRESS OF TIMER
06 000BF   21C8F4   A                   LXI       H,TMR:FLGS            FLAG INTO THE
06 000C2   19       A                   DAD       D                     MEMORY POINTER
06 000C3   0600     A                   MVI       B,0                   GET SET TO CLEAR THE FLAG
06 000C5   F3       A                   DI                              NO INTERRUPTIONS NOW, PLEASE
06 000C6   7E       A                   MOV       A,M                   GET FLAG
```

```
06 000C7  07       A          RLC                          INTO THE CARRY BIT
06 000C8  D2EC00   N          IF:      CC,C,S              IS FLAG SET
06 000CB  70       A            MOV      M,B               YES - RESET AND NOW
06 000CC  FB       A            EI                         EVERYBODY CAN INTERRUPT AGAIN
06 000CD  E1       A            POP      H                 LOCATION FROM STACK TO MEM PTR
06 000CE  26FD     A            MVI      H,LS:ADDR         SEGWAY MEM PTR TO LS: TABLE
06 000D0  5E       A            MOV      E,M               GET LS TIME-OUT ADDRESS
06 000D1  24       A            INR      H                 SEGWAY MEM PTR TO MS: TABLE
06 000D2  56       A            MOV      D,M               GET MS TIME-OUT ADDRESS
06 000D3  45       A            MOV      B,L               LOCATION TO 'B' TEMPORARILY
06 000D4  2A5FFD   N            LHLD     INPTR:            STUFF TIME-OUT ADDRESS INTO
06 000D7  73       A            MOV      M,E               INTO TABLE OF TIME-OUT
06 000D8  23       A            INX      H                 ADDRESSES THAT IS CHECKED
06 000D9  72       A            MOV      M,D               FOR ENTRIES EVERY 10 MSECONDS
06 000DA  23       A            INX      H                 BY THE STATE CHECKER
06 000DB  7D       A            MODBYT   L,AND,TIME:MSK    FORCE A CIRCULAR TABLE
06 000DC  E62F     A
06 000DE  6F       A
06 000DF  225FFD   N            SHLD     INPTR:            SAVE NEW ADDRESS LOCATION
06 000E2  58       A            MOV      E,B               LOCATION BACK TO 'E'
06 000E3  CD0000   N            CALL     DEACTIV:          TAKE OUT OF ACTIVE TIMER LIST
06 000E6  CD0000   N            CALL     PUT:              AND MAKE LOCATION AVAILABLE
06 000E9  C3EE00   N          ELSE:                        * * * FLAG IS NOT SET SO
06 000EC  FB       A            EI                            LET INTERRUPTIONS OCCUR
06 000ED  E1       A            POP      H                    MAKE THE STACK RIGHT AND
                              ENDIF                           FORCE NON-ZERO CONDITION TO
06 000EE  F601     A          MODBYT   A,OR,1                 STAY IN UNTIL LOOP
                            ENDIF                          * * * NO MATCH - RTC COMPLETE
06 000F0  C2AD00   N      UNTIL:   CC,Z,S                  WILL FALL THROUGH THIS CRACK
                    *
06 000F3  E1       A      POP      H                       RESTORE THE
06 000F4  44       A      MOV      B,H                     'B' REGISTER
06 000F5  E1       A      POP      H                       RESTORE H&L REGS
06 000F6  D1       A      POP      D                       RESTORE D&E REGS
06 000F7  F1       A      POP      PSW                     RESTORE A-REG & CONDITION CODES
06 000F8  C9       A      RET                              RETURN TO 'FLOAT' BACKGROUND
                    *
```

TABLE XI

```
                    *************************************************************************
                    * MODE SUBROUTINE (MODE0) ESTABLISHES THE COUNTING BREAKDOWNS AND MODES FOR *
                    * THE PROGRAMMER AND SIGNALS THE SORTER AS TO HOW MANY COPIES ARE GOING TO BE *
                    * FLASHED OF THE SET IN PROGRESS. THE SUBROUTINE IS CALLED AND NEW MODES *
                    * ESTABLISHED AT THE START OF A JOB AND JUST BEFORE THE FIRST FLASH OF THE *
                    * NEXT SET IN A MULTI SET JOB. *
                    *************************************************************************
05 005B6  3A55F4   A  MODE0   IF:       FLG,SRTOSETF,F          IS SORTER SETS SELECTED
05 005B9  07       A
05 005BA  DAF705   N
05 005BD  AF       A            CFLG      GRP050                CLEAR SET INDICATIONS
05 005BE  322DF4   A
05 005C1  110001   A            IF:       XWRD,QTY0SET,GT,X'100'  IS QTY REMAINING GT 100
05 005C4  2A71FC   N
05 005C7  CD0000   N
05 005CA  DADE05   N
05 005CD  CADE05   N
05 005D0  3A41F4   A            ANDIF:    FLG,2SD0FLAG,T        IS IT A DUPLEX JOB
05 005D3  07       A
05 005D4  D2DE05   N
05 005D7  EB       A              XCHG                          MOVE DATA 100(BCD) TO H&L
05 005D8  2271FC   N              SHLD      QTY0SET             SET QTY0SET EQUAL TO 100(BCD)
05 005DB  C3F405   N            ORIF:     XWRD,QTY0SEL,NE,H     IS QTY0SEL EQ QTY0SET
05 005DE  EB       A
05 005DF  2A6EFC   N
05 005E2  CD0000   N
05 005E5  CAF405   N
05 005E8  EB       A              XCHG                          NO,MEAN PART OF JOB ALREADY RUN
05 005E9  7C       A              IF:       VBYT,H,NZ           IF QTY0SET > 99
05 005EA  A7       A
05 005EB  CAF405   N
05 005EE  210001   A                LXI       H,X'100'
05 005F1  2271FC   N                SHLD      QTY0SET           DO BLOCK OF 100
                                  ENDIF
                                ENDIF
05 005F4  C36106   N          ELSE:
05 005F7  AF       A            CFLG      GRP050                ASSUME 25 CHANGE LATER IF 50
05 005F8  322DF4   A
05 005FB  112600   A            IF:       XWRD,QTY0SEL,LT,X'26'   IS THE JOB LT 26 IF YES DO THE
05 005FE  2A6EFC   N
05 00601  CD0000   N
05 00604  D20A06   N
                    *                                           WHOLE JOB AT ONCE;ALL VARIABLES
                    *                                           ARE SET OK SO DO NOTHING
05 00607  C36106   N            ORIF:     XWRD,HL,LT,X'51'      H&L CONTAIN QTY0SEL;IS THE JOB
05 0060A  115100   A
05 0060D  CD0000   N
05 00610  D22506   N
                    *                                           LT 51 IF YES DO THE WHOLE JOB
                    *                                           AT ONCE IF 2 SRT MODULES EMPTY
05 00613  3A62F4   A            ANDIF:    FLG,TWO0AVAL,T        ARE TWO SRT MODULES EMPTY
05 00616  07       A
05 00617  D22506   N
05 0061A  3E80     A              SFLG      GRP050              IF YES DO THE WHOLE JOB AT ONCE
05 0061C  322DF4   A
05 0061F  2A71FC   N              LHLD      QTY0SET             RLT- QTY TO BE MADE THIS JOB
05 00622  C36106   N            ORIF:     FLG,ADH0MSEL,F        IS ADH SINGLE OR MANUAL
05 00625  3A08F4   A
05 00628  07       A
05 00629  DA4E06   N
05 0062C  3A62F4   A            ANDIF:    FLG,TWO0AVAL,T        ARE TWO SORTER MODULES EMPTY
05 0062F  07       A
05 00630  D24E06   N
```

```
05 00633   115000   A                  IF:      XWRD,QTY8SET,GT,X'50' YES IS QTY REMAINING IN THE
05 00636   2A71FC   N
05 00639   CD0000   N
05 0063C   DA4606   N
05 0063F   CA4606   N
                       *                                      J8B GT 50(BCD)
05 00642   EB       A                      XCHG               M8VE DATA 50(BCD) T8 H&L
05 00643   2271FC   N                      SHLD      QTY8SET  SET QTY8SET EQUAL T8 50(BCD)
                                       ENDIF
05 00646   3E80     A                  SFLG     GRP850        SET INDICAT8RS T8 THE S8RTER
05 00648   322DF4   A
05 0064B   C36106   N              ELSE:
05 0064E   112500   A                  IF:      XWRD,QTY8SET,GT,X'25' IS QTY REMAINING IN THE J8B
05 00651   2A71FC   N
05 00654   CD0000   N
05 00657   DA6106   N
05 0065A   CA6106   N
                       *                                      GT 25(BCD)
05 0065D   EB       A                      XCHG               M8VE DATA 25(BCD) T8 H&L
05 0065E   2271FC   N                      SHLD      QTY8SET  SET QTY8SET EQUAL T8 25(BCD)
                                       ENDIF
                                   ENDIF
                               ENDIF

                       * AT THIS P8INT IN THE ALG8RITHM THE H&L REGISTER PAIR C8NTAINS A BCD NUMBER
                       * EQUAL T8 THE NUMBER 8F C8PIES T8 BE MADE IN THE SET AB8UT T8 BE STARTED

05 00661   EB       A          XCHG                           PUT QTY8SET INT8 D&E
05 00662   3A58F4   A          IF:      FLG,STK8CLR,F         WAS PR8GRAMMER CLEARED
05 00665   07       A
05 00666   DA7006   N
05 00669   AF       A              XRA      A
05 0066A   3274FC   N              STA      8RIG8FLH          CLEAR 8RIGINALS FLASHED
05 0066D   C37806   N          8RIF:    FLG,UP8M0DE,T
05 00670   3A98F4   A
05 00673   07       A
05 00674   D27806   N
05 00677   AF       A              XRA      A
05 00678   3274FC   N              STA      8RIG8FLH          ZER8 8RIGINALS FLASHED
                               ENDIF
05 0067B   2A7BFC   N          LHLD     QTY8TBF               PUT QTY8TBF INT8 H&L
05 0067E   CD0000   N          CALL     &BCD8ADD              ADD H&L+D&E RESULT IN H&L
05 00681   227BFC   N          SHLD     QTY8TBF               UPDATE QTY8TBF
05 00684   C9       A          RET
```

TABLE XII

```
                       *
                       * FLASH INCREMENT R8UTINE IS AN EXTENSI8N 8F THE FLASH PITCH EVENT THAT IS
                       * ACTIVE THIS PITCH. THIS EVENT IS SP88LED INT8 BACKGR8UND FR8M F8REGR8UND
                       *
05 0072D   0600     A  FLASHINC RSRBYT    0                   GET IMAGE AND SAMPLE BITS
05 0072F   CD0000   N
05 00732   1F       A          RAR                            IS THERE AN IMAGE BIT
05 00733   D2BD07   N          IF:      CC,C,S                IS THERE AN IMAGE BIT
05 00736   1F       A              RAR
05 00737   DABA07   N              IF:      CC,C,C            IS THERE SAMPLE BIT
05 0073A   2A78FC   N                  LHLD     QTY8FLH       PUT QTY8FLH IN H&L T8 INCREMENT
05 0073D   CD0000   N                  CALL     BCD8INC       INCREMENT QTY8FLH
05 00740   CD0807   N                  CALL     DIG8FIX       ESTABLISH NEW DIGIT 8N BITS
05 00743   2278FC   N                  SHLD     QTY8FLH       UPDATE QTY8FLH IN MEM8RY
05 00746   327AFC   N                  STA      QF8DIGIT      UPDATE QTY8FLH DIGIT INF8
05 00749   AF       A                  CFLG     DSPL81ST      CLEAR FLAG T8 UPDATE DISPLAY
05 0074A   329AF4   A
05 0074D   EB       A                  IF:      XWRD,QTY8TBF,LE,H    IS QTY8FLH EQUAL QTY8TBF
05 0074E   2A7BFC   N
05 00751   CD0000   N
05 00754   DA5A07   N
05 00757   C29907   N
05 0075A   3AB0F4   A                      IF:      FLG,ADH8SELC,F    UNLATCH PLATEN IF ADH
05 0075D   07       A
05 0075E   DA6A07   N
05 00761   21E7FF   A                          C8BIT    PLAT8LK       IS N8T SELECTED
05 00764   3EF7     A
05 00766   F3       A
05 00767   A6       A
05 00768   77       A
05 00769   FB       A
                                           ENDIF
05 0076A   3A4AF4   A                      IF:      FLG,SIDE81,T      IS IT DUPLEX SIDE 1
05 0076D   07       A
05 0076E   D28007   N
05 00771   3A23F4   A                      ANDIF:   FLG,8DD8LAST,F
05 00774   07       A
05 00775   DA8007   N
05 00778   3E80     A                          SFLG     SD18DLY       ST8P FLASHING UNTIL SIDE 1
05 0077A   32AFF4   A
05 0077D   C39607   N                      ELSE:                      C8PIES ARE DELIVERED
05 00780   CD8506   N                          CALL     FLH8C8IN      FLASH C8INCIDENCE
05 00783   3A3AF4   A                          IF:      FLG,MN8NRDY,T IS MAIN TRAY READY
05 00786   07       A
05 00787   D29607   N
05 0078A   3A41F4   A                          ANDIF:   FLG,2SD8FLAG,T IS MAIN NEEDED
05 0078D   07       A
05 0078E   D29607   N
05 00791   3E80     A                              SFLG     CYCL8DN;  N8 ST8P MACHINE
05 00793   32AAF4   A
                                               ENDIF
                                           ENDIF
05 00796   C3BA07   N                  8RIF:    FLG,SRT8STKF,T        QTY8FLH NE QTY8TBF
05 00799   3A56F4   A
05 0079C   07       A
05 0079D   D2BA07   N
05 007A0   3A4AF4   A                  ANDIF:   FLG,SIDE81,F          IS IT SIDE 2 8R SIMPLEX
05 007A3   07       A
```

```
 05 007A4   DABA07   N
 05 007A7   2166FA   N                  INCBYT     REG@50           INCREMENT STACKS MODE PREDICT
 05 007AA   34       A
                          *                                         COUNTER
 05 007AB   7E       A                  IF:        XBYT,M,GE,50     HAVE 50 COPIES BEEN FLASHED
 05 007AC   FE32     A
 05 007AE   DABA07   N
 05 007B1   3600     A                      MVI        M,0          ISIN SORTER STACKS
 05 007B3   2148FA   N                      LXI        H,BIN@AVAL   LOAD POINTER TO BIN@AVAL
 05 007B6   35       A                      DCR        M            DECREMENT BIN@AVAL
 05 007B7   CD0000   N                      CALL       SRT@BINS     CALL FOR UPDATE OF BIN@AVAL
                                        ENDIF
                          *                                         IN BACKGROUND
                                    ENDIF
                                ENDIF
 05 007BA   C32C08   N          ORIF:    XBYT,CYCUPCT1,GE,4         IS CYCLE UP STARTED
 05 007BD   3A66FD   N
 05 007C0   FE04     A
 05 007C2   DA2C08   N
 05 007C5   3A97F4   A          ANDIF:   FLG,UP@FLH,T               DOES FLASH INFORMATION NEED
 05 007C8   07       A
 05 007C9   D22C08   N
                          *                                         UPDATING
 05 007CC   3A9CF4   A              IF:        FLG,DLV@FLT,T        WAS THERE A DELIVERY FAULT SD2
 05 007CF   07       A
 05 007D0   D20208   N
 05 007D3   2A5AFB   N                  LHLD       QTY@FLT          PUT QTY@FLT IN H&L
 05 007D6   EB       A                  XCHG                        PUT QTY@FLT IN D&E
 05 007D7   2A78FC   N                  LHLD       QTY@FLH          PUT QTY@FLH IN H&L
 05 007DA   CD0000   N                  CALL       4BCD@SUB         SUBTRACT QTY@FLT FROM QTY@FLH
 05 007DD   CD0B07   N                  CALL       DIG@FIX          ESTABLISH NEW DIGIT ENABLE BITS
                          *                                         FOR QTY@FLH; LEFT IN A REG
 05 007E0   2278FC   N                  SHLD       QTY@FLH          UPDATE QTY@FLH
 05 007E3   327AFC   N                  STA        QF@DIGIT         UPDATE QTY@FLH DIGIT ENABLE BIT
 05 007E6   2A75FC   N                  LHLD       QTY@DLV          PUT QTY@DLV IN H&L
 05 007E9   CD0000   N                  CALL       4BCD@SUB         SUBTRACT QTY@FLT FROM QTY@DLV
 05 007EC   CD0B07   N                  CALL       DIG@FIX          ESTABLISH NEW DIGIT ENABLE BITS
                          *                                         FOR QTY@FLH; LEFT IN A REG
 05 007EF   2275FC   N                  SHLD       QTY@DLV          UPDATE QTY@DLV
 05 007F2   3277FC   N                  STA        QD@DIGIT         UPDATE QTY@DLV DIGIT ENABLE BIT
 05 007F5   AF       A                  CFLG       UP@OUTPT         ACKNOWLEDGE OUTPUT UPDATE
 05 007F6   3299F4   A
 05 007F9   329CF4   A                  MODFLG     DLV@FLT          DELIVERY FAULT UPDATE COMPLETE
 05 007FC   329FF4   A                  MODFLG     DLV@FLT1
 05 007FF   C32508   N              ELSE:
 05 00802   2A71FC   N                  LHLD       QTY@SET          PUT QTY@SET IN H&L
 05 00805   EB       A                  XCHG                        PUT QTY@SET IN D&E
 05 00806   2A78FC   N                  LHLD       QTY@FLH          PUT QTY@FLH IN H&L
 05 00809   CD0000   N                  CALL       4BCD@SUB         SUBTRACT QTY@SET FROM QTY@FLH
 05 0080C   CD0B07   N                  CALL       DIG@FIX          ESTABLISH NEW DIGIT ENABLE BITS
                          *                                         FOR QTY@FLH; LEFT IN A REG
 05 0080F   2278FC   N                  SHLD       QTY@FLH          UPDATE QTY@FLH
 05 00812   327AFC   N                  STA        QF@DIGIT         UPDATE QTY@FLH DIGIT ENABLE BIT
 05 00815   215CFA   N                  INCBYT     OUT@CT           FLASH UPDATE FINISHED
 05 00818   34       A
 05 00819   7E       A                  IF:        XBYT,M,LE,1      SHOULD OUTPUT BE UPDATED
 05 0081A   FE01     A
 05 0081C   DA2208   N
 05 0081F   C22508   N
 05 00822   CD6408   N                      CALL       OUT@ADJ      UPDATE OUTPUT COUNTERS
                                        ENDIF
                                    ENDIF
 05 00825   AF       A              CFLG       DSPL@1ST             UPDATE DISPLAY
 05 00826   329AF4   A
 05 00829   3297F4   A              MODFLG     UP@FLH               FLASH UPDATE IS COMPLETE
                                ENDIF
 05 0082C   C9       A          RET
```

TABLE XIII

```
                          **************************************************************************
                          * DELIVERY CHECK SUBROUTINE (DLV@CK) IS CALL IN SYSTEM RUN NOT PRINT EPILOGUE. *
                          * AT THIS POINT ALL SHEETS THAT ARE GOING TO BE DELIVERED ARE DELIVERED.  THIS *
                          * SUBROUTINE DETERMINES IF THERE HAS BEEN A DELIVERY FAULT AND IN ANY CASE     *
                          * UPDATES FLASH INFORMATION WITH DELIVERED INFORMATION                         *
                          **************************************************************************

 05 008C1   2A7DFC   N    DEL@CK   IF:       XWRD,QTY@DLV,LT,QTY@TBD    IS DELIVERY LESS THAN NEEDED
 05 008C4   EB       A
 05 008C5   2A75FC   N
 05 008C8   CD0000   N
 05 008CB   D21509   N
 05 008CE   3A41F4   A              IF:        FLG,2SD@FLAG,T       IS MACHINE DELIVERING SIDE 2'S
 05 008D1   07       A
 05 008D2   D2F008   N
 05 008D5   3AA0F4   A                  IF:        FLG,SD1@DEL,F    OF A DUPLEX JOB
 05 008D8   07       A
 05 008D9   DAEB08   N
 05 008DC   3E80     A                      SFLG       DLV@FLT      YES GET DIFFERENCE QTY
 05 008DE   329CF4   A
 05 008E1   EB       A                      XCHG                    PREPARE FOR SUBTRACT
 05 008E2   CD0000   N                      CALL       4BCD@SUB     QTY@TBD-QTY@DLV=QTY@FLT
 05 008E5   225AFB   N                      SHLD       QTY@FLT
 05 008E8   C3F008   N                  ELSE:
 05 008EB   3E80     A                      SFLG       DLV@FLT1     SIDE 1 IS BEING DELIVERED
 05 008ED   329FF4   A
                          *                                         'SO INHIBIT PROG2SJM
                                    ENDIF
                                ENDIF
 05 008F0   AF       A              CFLG       UP@FLH               RESET FLAGS THAT COULD MEAN
 05 008F1   3297F4   A
 05 008F4   3298F4   A              MODFLG     UP@MODE              THAT FLASH IS AN ORIGINAL
 05 008F7   3296F4   A              MODFLG     NEW@SET              AHEAD OF DELIVERY; FLAGS MAY
```

```
05 008FA    32A1F4   A            MODFLG   FLHOCMP                ALREADY BE 0'S
05 008FD    3225F4   A            MODFLG   EXCESOWT               SHEETS NEVER MADE IT TO SORTER
05 00900    3252FA   N            STA      EXCESOCT               SO FORGET SIDE 1 DELIVERY
05 00903    3E80     A            SFLG     JOBOINCMP              JOB IS INCOMPLETE
05 00905    3232F4   A
05 00908    3A9CF4   A            IF:      FLG,DLVOFLT,F          IS IT A SIDE 2 DELIVERY PROBLEM
05 0090B    07       A
05 0090C    DA1209   N
05 0090F    CDAC09   N               CALL     RECOVOCK            IS JOB RECOVERY NEEDED
                                  ENDIF
05 00912    C34C09   N         ORIF:     FLG,2SDOFLAG,T          IS IT A SIMPLEX JOB OR SIDE 1
05 00915    3A41F4   A
05 00918    07       A
05 00919    D23309   N
05 0091C    3E80     A            SFLG     DLVOFLT1               PREVENT EXECUTION OF PROG2SJM
05 0091E    329FF4   A
05 00921    CD5B08   N            CALL     MODEOCK                SHOULD MACHINE GO FROM SIDE 1
                          *                                       TO SIDE 2
05 00924    3A4AF4   A            IF:      FLG,SIDEO1,T
05 00927    07       A
05 00928    D23009   N
05 0092B    3E80     A               SFLG     2SDOENAB            ENABLE CHANGE OF DUPLEX MODE
05 0092D    326BF4   A
                                  ENDIF
05 00930    C34C09   N         ORIF:     XWRD,D,GE,X'101'        IF IT IS A SIMPLEX NON-SETS
05 00933    E8       A
05 00934    110101   A
05 00937    CD0000   N
05 0093A    DA4709   N
05 0093D    3A55F4   A         ANDIF:    FLG,SRTOSETF,F          JOB WITH GT 100 DO NOT ALLOW
05 00940    07       A
05 00941    DA4709   N
                          *                                       CHANGE TO DUPLEX WITH OUT
                          *                                       PROGRAMMER CLEAR
05 00944    C34C09   N         ELSE:
05 00947    3E80     A            SFLG     2SDOENAB               ENABLE CHANGE OF DUPLEX MODE
05 00949    326BF4   A
                               ENDIF
05 0094C    2A75FC   N         LHLD      QTYODLV
05 0094F    227AFC   N         SHLD      QTYOFLH                 SET QTYOFLH=QTYODLV
05 00952    3A77FC   N         LDA       QDODIGIT                GET DIGIT ENABLE BITS UPDATED
05 00955    327AFC   N         STA       QFODIGIT
05 00958    2A70FC   N         LHLD      QTYOTBD
05 0095B    227BFC   N         SHLD      QTYOTBF                 SET QTYOTBF=QTYOTBD
05 0095E    3A6CFA   N         LDA       DLVO50                  SET REGO50 EQUAL TO DLVO50
05 00961    3266FA   N         STA       REGO50
05 00964    AF       A         CFLG      STRTOMEM                CANCEL RESTART
05 00965    325AF4   A
05 00968    329AF4   A         MODFLG    DSPLO1ST                UPDATE DISPLAY
05 0096B    325CFA   N         STA       AUTOCT
05 0096E    3A36FD   A         IF:       FBIT,FDROMDBL,T         IS THERE FEEDER FAULT
05 00971    E620     A
05 00973    CA7809   N
05 00976    3E80     A            SFLG     PROGMTCK               FEEDER PROBLEM UNLOAD AUX
05 00978    32A2F4   A
                               ENDIF                             COMPLETED
05 0097B    3A9DF4   A         IF:       FLGS,AXUPOMEM,OR,AXUPOREQ,T  SHOULD AUX TRAY BE ACTIVE
05 0097E    219EF4   A
05 00981    B6       A
05 00982    F28D09   N
05 00985    3200F4   A            MODFLG   AXOFLAG                YES, SELECT AUX TRAY
05 00988    AF       A            CFLG     AXUPOMEM               CLEAR AXUPOMEM
05 00989    329DF4   A
05 0098C    77       A            MOV      M,A                    CLEAR AXUPOREQ
                               ENDIF
05 0098D    3A32F4   A         IF:       FLG,JOBOINCMP,T         IS JOB INCOMPLETE
05 00990    07       A
05 00991    D2A709   N
05 00994    21F4FF   A            SOBIT    JOB*ICMP               YES TURN ON JOB INCOMPLETE
05 00997    3E01     A
05 00999    F3       A
05 0099A    B6       A
05 0099B    77       A
05 0099C    FB       A
05 0099D    3A49FA   N            LDA      BINONUMB
05 009A0    47       A            MOV      B,A                    PUT BIN NUMBER IN B REG
05 009A1    3E1A     A            MVI      A,26
05 009A3    90       A            SUB      B                      26 - BIN THATS OPEN = BINOAVAL
05 009A4    C3A809   N         ELSE:
05 009A7    AF       A            XRA      A                      CLEAR A,JOB FINISHED
                               ENDIF
05 009A8    3248FA   N         STA       BINOAVAL
05 009AB    C9       A         RET
```

TABLE XIV

```
                          *      ***************************************
                          *      *                                     *
                          *      *  REVERSE:ROUTINE TO ENGAGE THE REVERS*
                          *      *    CLUTCH AND START A SLOW-OFF SEQ.  *
                          *      *                                     *
                          *      ***************************************

05 00667    CD0000   N   REVERSE  STIMR    ADHO4,300,PLTOEXIT       ALLOW 300MS FOR DOC TO GET TO E
05 0066A    04       A
05 0066B    1E       A
05 0066C    A50A     N
05 0066E    3A50FD   N            DIAGOCT  ADHOCPDC                 STORE START OF CLEAR PLATEN SEQ
05 00671    32BFFC   N
05 00674    3E08     A            MVI      A,ADHOLP
05 00676    32BEFC   N            STA      LEDGEXPT                 LOOK FOR LEAD EDGE AT EXIT
```

```
1023   05 006679   21BAFC   N     LXI    H,TEDGMASK
1024   05 0067C    3E20     A     MVI    A,RETURNO4
1025   05 0067E    B6       A     ORA    M                     START CHECKING RETURN SENSOR
1026   05 0067F    77       A     MOV    M,A
1027   05 00680    CD340C   N     CALL   REVRSON               TURN ON REVERSE CLUTCH
1028   05 00683    3A1AF4   A     IF:    FLG,ADHOSPRC,F        NOT DOING RECOVERY ON LAST ORIG
       05 00686    07       A
       05 00687    DA8D06   N
1029   05 0068A    CD0000   N       CALL     INCOORFH          INCREMENT DOCUMENT COUNTER
1030                              ENDIF
1031   05 0068D    C9       A     RET
```

TABLE XV

```
601                             *
602                             * INCREMENT ORIGINALS FLASHED AND DOCUMENT NUMBER ROUTINE
603                             *

605   05 0054A   2174FC   N    INCOORFH INCBYT    ORIGOFLH        INCREMENT THE ORIGINAL FLASHED
      05 0054D   34       A                                       COUNTER
606                            *
607   05 0054E   3A38F4   A           IF:     FLG,LSTOORG,F       DON'T INCREMENT IF LAST ROIG
      05 00551   07       A
      05 00552   DA6805   N
608   05 00555   2A50FB   N              LHLD     DOCONUMB
609   05 00558   CDC000   N              CALL     BCDOINC         INCREMENT DOCUMENT COUNTER
610   05 0055B   2250FB   N              SHLD     DOCONUMB
611   05 0055E   CDCB07   N              CALL     DIGOFIX         GET DISPLAY DIGIT DRIVE BITS
612   05 00561   3267FA   N              STA      DCODIGIT
613   05 00564   AF       A              CFLG     DSPLOIST        UPDATE DISPLAY
      05 00565   329AF4   A
614                                   ENDIF
615   05 00568   C9       A           RET
```

TABLE XVI

```
1220                              *       ****************************************
1221                              *       *                                      *
1222                              *       *  LEDGIEMPIRRUTINE CALLED BY ADHOCTRL *
1223                              *       *    WHENEVER THE INPUT GETS EMPTY  THE*
1224                              *       *    ROUTINE SETS THE ODD LAST FLAGS IF*
1225                              *       *    NECESSARY,CHECKS OR UPDATES THE   *
1226                              *       *    TOTAL NUMBER OF DOCUMENTS AND SETS*
1227                              *       *    THE DOCUMENT FAULT FLAG IF VALID  *
1228                              *       *                                      *
1229                              *       ****************************************

1231   05 007CB   3A04F4   A   LEDGIEMP LOAFLG   ADHOFDRW         FETCH ADH DIRECTION FLAG
1232   05 007CE   B7       A            ORA      A                CHECK DOC MOVING (SWTCH DEBOUNC
1233   05 007CF   F2FF07   N            IF:        CC,S,S         VALID INDICATION OF INPUT EMPTY
1234   05 007D2   3238F4   A               MODFLG    LSTOORG      SET LAST ORIGINAL FLAG
1235   05 007D5   3A4AF4   A               LOAFLG    SIDEO1       SIDE 1'S ABOUT TO BE MADE
1236   05 007D8   47       A               MOV       B,A
1237   05 007D9   3AAFF4   A               LOAFLG    SD1ODLY
1238   05 007DC   2F       A               CMA
1239   05 007DD   A0       A               ANA       B            AND NOT JUST STILL BEING DELIVE
1240   05 007DE   F2E707   N               IF:       CC,S,S       IF SO THEN
1241   05 007E1   3223F4   A                  MODFLG     ODDOLAST  INDICATE ODD LAST
1242   05 007E4   3253F4   A                  MODFLG     SRTOODD   AND MAKE SURE SORTER REMEMBERS
1243                                       ENDIF
1244   05 007E7   216FFA   N               LXI       H,DOCOTOTL
1245   05 007EA   3A74FC   N               LDA       ORIGOFLH     FETCH CURRENT DOCUEMENT TOTAL
1246   05 007ED   3C       A               INR       A            ADD 1 FOR ONE GOING TO PLATEN
1247   05 007EE   47       A               MOV       B,A          SAVE UPDATED DOCUEMENT TOTAL
1248   05 007EF   7E       A               IF:       VBYT,M,Z     FIRST PASS
       05 007F0   A7       A
       05 007F1   C2F807   N
1249   05 007F4   70       A                  MOV        M,B      STORE DOCUEMENT TOTAL
1250   05 007F5   C3FF07   N               ORIF:     XBYT,A,NE,B  COUNT ERROR
       05 007F8   B8       A
       05 007F9   CAFF07   N
1251   05 007FC   CD9609   N                  CALL       DBFDOFLT  DOUBLE FEED FAULT
1252                                       ENDIF
1253                                    ENDIF
1254   05 007FF   C9       A            RET
```

TABLE XVII

```
1197                              ***********************************************************************
1198                              * THE PROGRAMMER SIDE 2 JAM SUBROUTINE EXCUTES IN SYSTEM NOT READY STATE  *
1199                              * BACKGROUND AND DETERMINES IF THE CONDITIONS ARE RIGHT TO GO BACK TO SIDE *
1200                              * 1 FOR MAKE UP                                                            *
1201                              ***********************************************************************

1203   05 008A1   3A9CF4   A   PROG2SJM IF:      FLG,DLVOFLT,T    WAS THERE SHORT DELIVERY SIDE 2
       05 008A4   07       A
       05 008A5   D2CE08   N
1204   05 008A8   3A9FF4   A            ANDIF:   FLG,DLVOFLT1,F   IS ONCE THRU FLAG SET
       05 008AB   07       A
       05 008AC   DACE08   N
1205   05 008AF   CD0000   N               CALL      AXOEMPTY     SHOULD AUX UNLOAD LAMP BE OFF
1206   05 008B2   C2B808   N               IF:       CC,Z,S       IS AUX EMPTY
1207   05 008B5   CDCF08   N                  CALL      GBOSIDE1  GO BACK TO SIDE 1
```

```
1208  05 00BB8  C3CE0B  N            ELSE:
1209  05 00BBB  CDAC09  N                 CALL      RECOVACK           IS JOB RECOVERY NEEDED
1210  05 00BBE  C2C80B  N                 IF:       CC,Z,S             SET IF ORIGODLV EQ ORIGOFLH
1211  05 00BC1  AF      A                      CFLG      DLVOFLT       STILL SOME SIDE 1'S IN THE
      05 00BC2  329CF4  A
1212                         *                                         AUX TRAY
1213  05 00BC5  C3CE0B  N                 ELSE:                        THE ORIGINAL IS GONE TELL
1214  05 00BC8  CDCF0B  N                      CALL      GOOSIDE1      GO TO SIDE 1 FOR MAKE UP
1215  05 00BCB  CD0000  N                      CALL      BOJAMOUP      ADJ BLG FOR DISGARDED CPYS
1216                                      ENDIF
1217                                 ENDIF
1218                            ENDIF
1219  05 00BCE  C9      A       RET

1221                         ****************************************************************************

1223  05 00BCF  3E80    A    GOOSIDE1 SFLG     SIDEO1                  YES GO TO SIDE 1 MAKE UP
      05 00BD1  324AF4  A
1224  05 00BD4  32A2F4  A             MODFLG   PROGMTCK                TELL PAP TO LOOK FOR SHEETS
1225                         *                                         IN AUX TRAY
1226  05 00BD7  329FF4  A             MODFLG   DLVOFLT1                SET ONCE THRU FLAG
1227  05 00BDA  329BF4  A             MODFLG   STPOBILL                INHIBIT BILLING FOR MAKE UP
1228                         *                                         COPIES-SIDE 2 JAM RECOVERY
1229  05 00BDD  CD0000  N             CALL     MINIORCR                MAKE UP SD 1 IN NORM RED-MIN-PH
1230  05 00BE0  AF      A             CFLG     AXOFLAG
      05 00BE1  320DF4  A
1231  05 00BE4  329DF4  A             MODFLG   AXUPOMEM                CANCEL AUX TRAY
1232  05 00BE7  CD0000  N             CALL     DROELV                  GET MAIN TRAY READY
1233  05 00BEA  21F0FF  A             SOBIT    SIDE$1                  CHANGE OPERATOR CONTROL LAMPS
      05 00BED  3E01    A
      05 00BEF  F3      A
      05 00BF0  B6      A
      05 00BF1  77      A
      05 00BF2  FB      A
1234  05 00BF3  21EEFF  A             COBIT    SIDE$2
      05 00BF6  3EFE    A
      05 00BF8  F3      A
      05 00BF9  A6      A
      05 00BFA  77      A
      05 00BFB  FB      A
1235  05 00BFC  CDBA09  N             CALL     RECOVER                 INDICATE JOB RECOVERY NEEDED
1236  05 00BFF  2173FC  N             LXI      H,ORIGODLV
1237  05 00C02  35      A             DCR      M                       GO BACK TO PREVIOUS ORIGINAL
1238  05 00C03  C9      A             RET
```

TABLE XVIII

```
988                          ****************************************************************************
989                          *RECOVOCK SUBROUTINE CHECKS IF THE ORIGINAL HAS BEEN TAKEN FROM THE PLATEN.  IF*
990                          * JOB RECOVERY IS REQUIRED THIS ROUTINE TURNS ON JOB RECOVERY LAMP            *
991                          ****************************************************************************

993   05 009AC  3A74FC  N    RECOVACK IF:      XBYT,ORIGOFLH,NE,ORIGODLV   IS ORIGINAL GONE FROM PLATEN
      05 009AF  2173FC  N
      05 009B2  BE      A
      05 009B3  CAB909  N
994   05 009B6  CDBA09  N                  CALL      RECOVER               JOB RECOVERY IS NEEDED
995                                   ENDIF
996   05 009B9  C9      A             RET
997                          *
998                          * THIS ROUTINE PASSES THE ZERO CONDITION CODE TO THE CALLING ROUTINES
999                          *        ZERO BIT CLEAR IF JOB RECOVERY NEEDED
1000                         *        ZERO BIT SET IF JOB RECOVERY NOT NEEDED
1001                         *

1003  05 009BA  AF      A    RECOVER  CFLG     PROGORDY                PROG NEEDS ORIGINAL RECYCLING
      05 009BB  3287F7  A
1004  05 009BE  2120FB  A             SFBIT,P  TSOADHJR                INDICATE JOB RECOVERY
      05 009C1  3E40    A
      05 009C3  B6      A
      05 009C4  77      A
1005  05 009C5  A7      A             ANA      A                       CLEAR ZERO BIT
1006  05 009C6  C9      A             RET
```

TABLE XIX

```
1111                         ****************************************************************************

1113  05 00AB1  2A75FC  N    OUTOINC  LHLD     QTYODLV
1114  05 00AB4  CD0000  N             CALL     BCDOINC                 INCREMENT QTYODLV
1115  05 00AB7  2275FC  N             SHLD     QTYODLV
1116  05 00ABA  CD0B07  N             CALL     DIGOFIX                 GET DIGIT ENABLES FOR QTYODLV
1117  05 00ABD  3277FC  N             STA      QDODIGIT
1118  05 00AC0  EB      A             IF:      XWRD,QTYOTBD,LT,H       IS QTYODLV GT QTYOTBD
      05 00AC1  2A7DFC  N
      05 00AC4  CD0000  N
      05 00AC7  D2DC0A  N
1119  05 00ACA  3E80    A                  SFLG      CYCLODN:          COUNT ERROR STOP MACHINE
      05 00ACC  32AAF4  A
1120  05 00ACF  2136FD  A                  SFBIT     CTOERROR
      05 00AD2  3E04    A
      05 00AD4  F3      A
      05 00AD5  B6      A
      05 00AD6  77      A
      05 00AD7  FB      A
1121  05 00AD8  AF      A                  XRA       A                 CLEAR A TO SIGNAL CALLER
1122  05 00AD9  C3200B  N             ORIF:    CC,Z,S                  IS QTYODLV EQ QTYOTBD
      05 00ADC  C21C0B  N
```

```
05 00ADF   CD0000  N    CALL    BILL@INC               INCREMENT BILLING
05 00AE2   3A57FA  N    IF:     XBYT,MINIBYTE,NE,0     IF IN MINI-PHYSICAL
05 00AE5   FE00    A
05 00AE7   CAEF0A  N
05 00AEA   F680    A        ORI     X'80'              SET SIGN BIT
05 00AEC   3257FA  N        STA     MINIBYTE           STORE RESULT IN MINIBYTE
                        ENDIF
05 00AEF   2173FC  N    INCBYT  ORIG@DLV               GROUP DELIVERED
05 00AF2   34      A
05 00AF3   3E80    A    SFLG    UP@OUTPT               INDICATE OUTPUT UPDATE REQUEST
05 00AF5   3299F4  A
05 00AF8   215CFA  N    LXI     H,OUT@CT               LOAD POINTER TO OUTOCT
05 00AFB   7E      A    MOV     A,M                    PUT OUT@CT IN A REG
05 00AFC   FE01    A    IF:     XBYT,A,GE,1            TIME TO UPDATE OUTPUT
05 00AFE   DA090B  N
05 00B01   CD640B  N        CALL    OUT@ADJ            YES;UPDATE OUTPUT COUNTERS
05 00B04   0601    A        MVI     B,01               PUT 1 IN B REG TO INDICATE
                   *                                   OUTPUT UPDATE TOOK PLACE
05 00B06   C3080B  N    ELSE:
05 00B09   0600    A        MVI     B,0                OUTPUT UPDATE DID NOT OCCUR
                        ENDIF
05 00B0B   3A41F4  A    IF:     FLG,2SD@FLAG,T         IS IT 2 SIDED COPYING
05 00B0E   07      A
05 00B0F   D2170B  N
05 00B12   3E80    A        SFLG    SD1@DEL            SIDE 2 DELIVERY IS COMPLETED
05 00B14   32A0F4  A
                        ENDIF
05 00B17   3E01    A    MVI     A,1                    LOAD 1 IN A REG TO SIGNAL
                   *                                   CALLING ROUTINE
05 00B19   C3200B  N  ELSE:                            QTY@DLV LT QTY@TBD
05 00B1C   CD0000  N      CALL    BILL@INC             INCREMENT BILLING
05 00B1F   AF      A      XRA     A                    CLEAR A TO SIGNAL CALLER
                      ENDIF
05 00B20   C9      A  RET
```

Figure 40A:
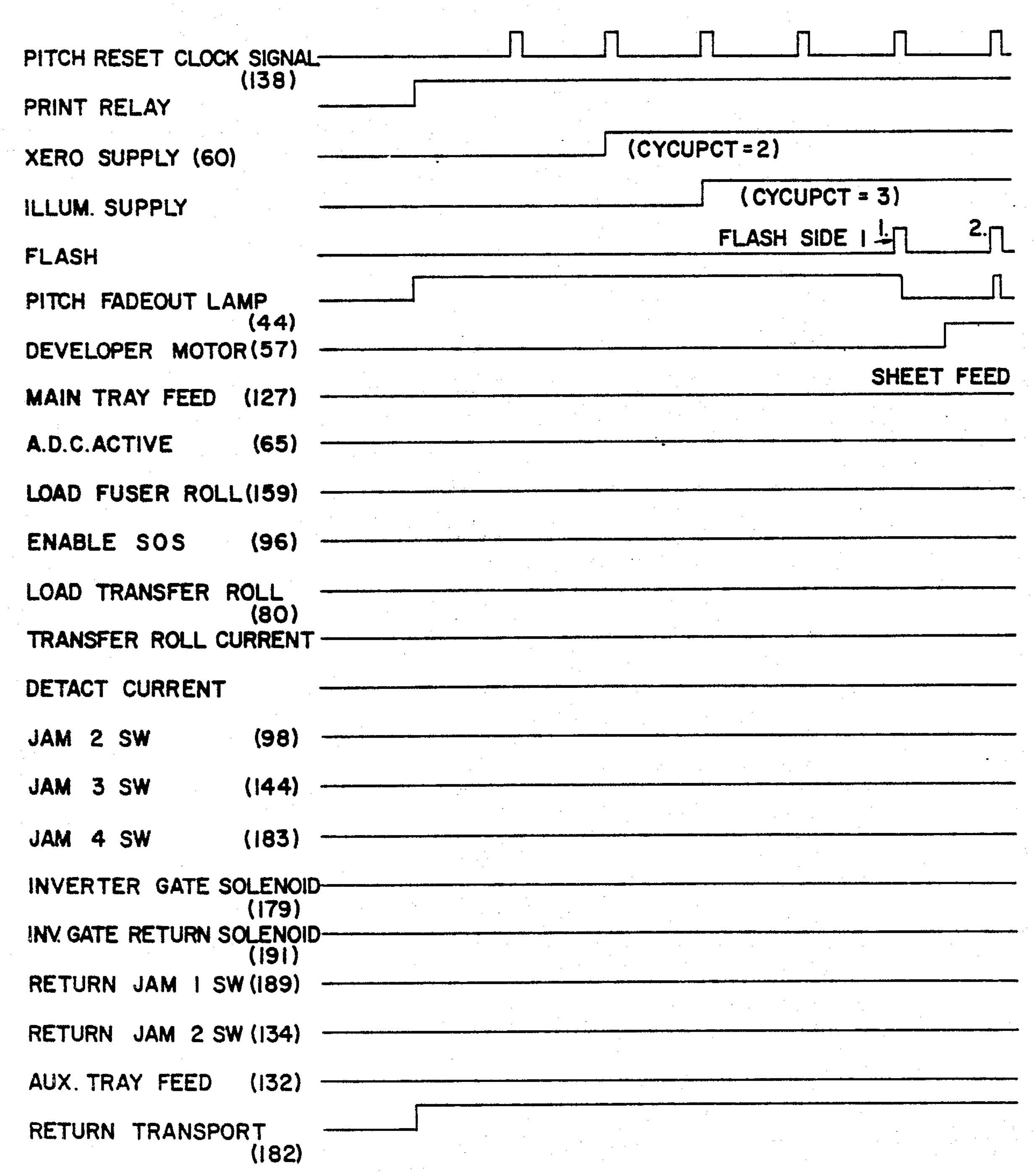
FIGS. 40*a*, 40*b*, 40*c* are a timing chart of the principal operating components of the host machine in an exemplary copy run.
Figure 40B:
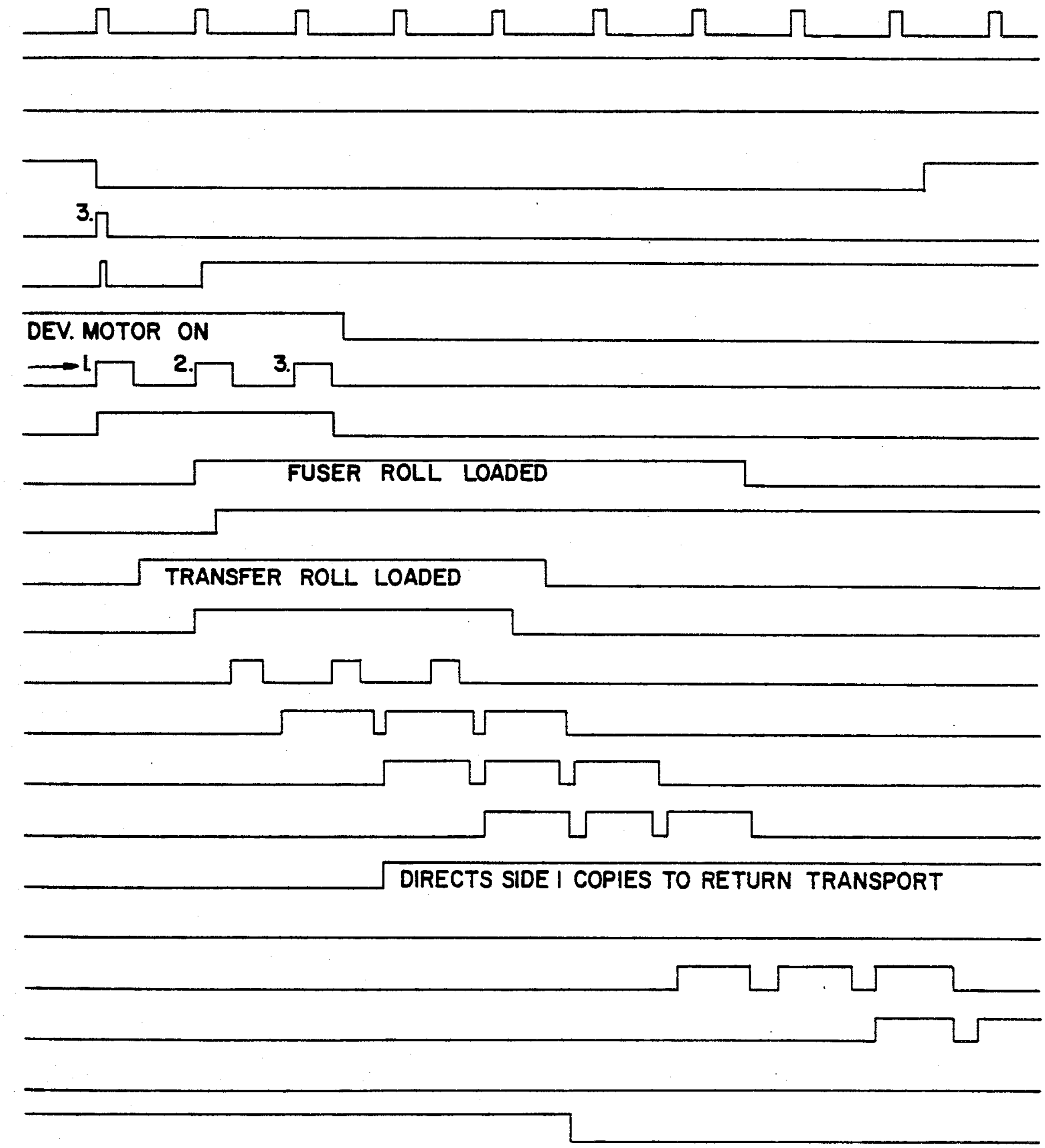
Figure 40C:
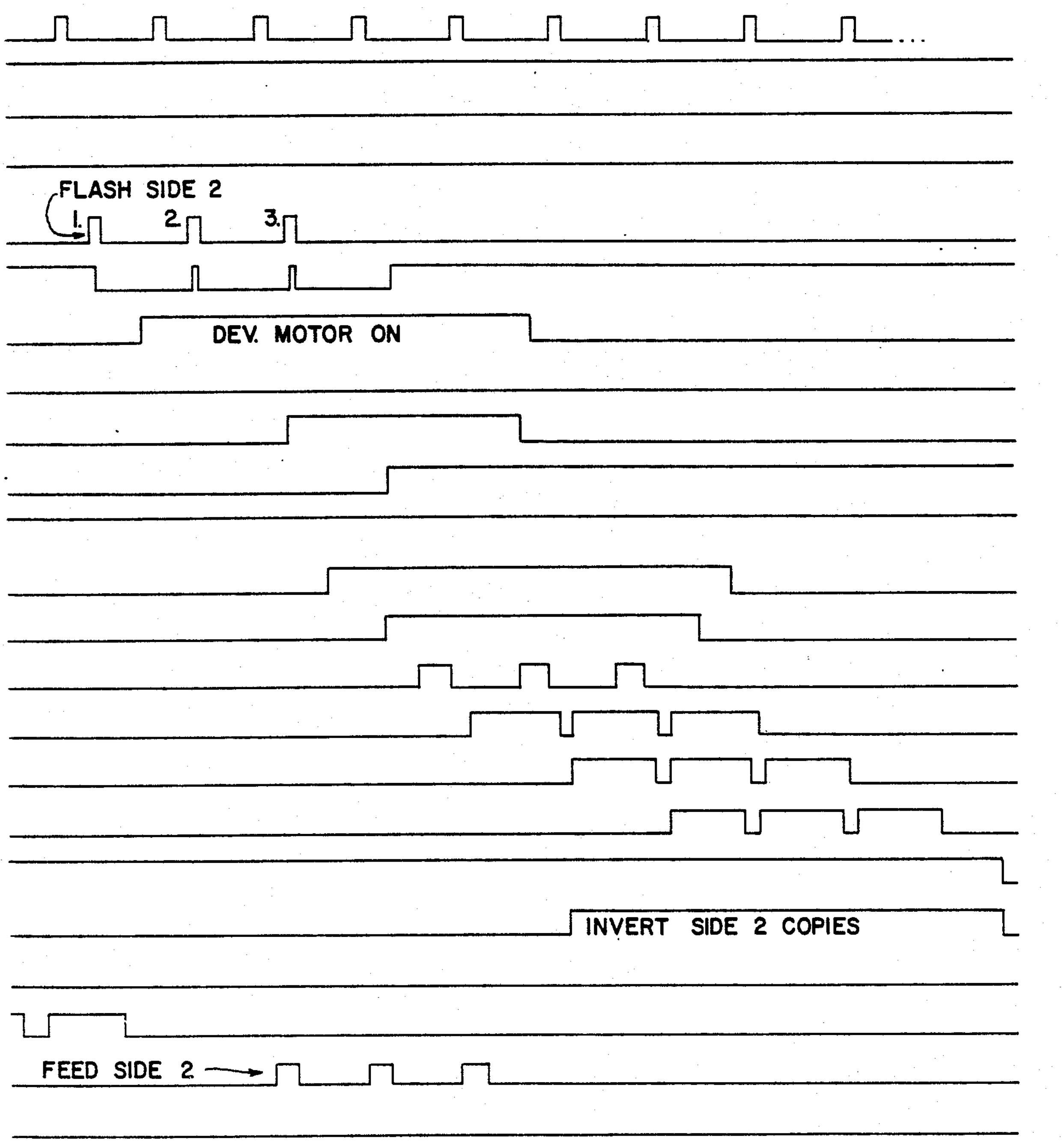

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41:
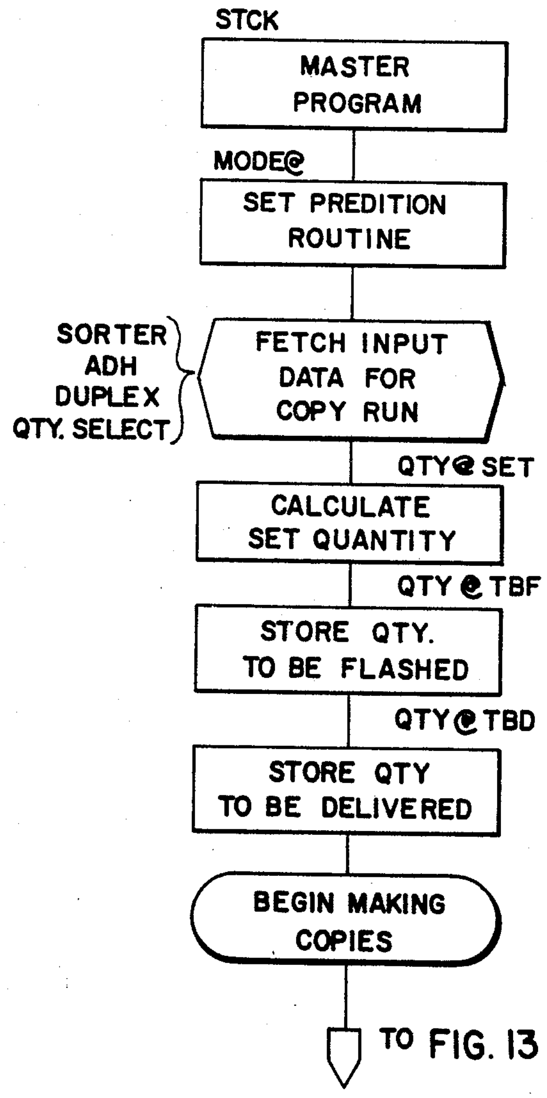
FIGS. 41–45 are flow charts illustrating the method of operating the machine to provide duplex copies and for automatically remaking lost copies in the event of a fault condition.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 201, 211 respectively depending on the disposition of deflector 220.

JOB RECOVERY

Referring now to FIGS. 41–45, there will be described in more detail the method of controlling machine 10 to produce duplex copies from a set of original documents and for automatically adjusting the reproduction process in the event of a fault condition so that the selected number of copies are ultimately produced even though some copies may have been lost due to the fault.

Referring especially to FIG. 41, it will be remembered that the controller 18 is normally being instructed by the state checker or master program which is shown in Table I. Before the beginning of a copy run, the controller 18 fetches the input data for the particular copy run, such as the quantity of copies selected (QTY@SEL), whether the document handler 16 has been selected (ADH@MSEL), the condition of the sorter 14, e.g. whether both bin arrays 210 and 211 are empty (TWO@AVAL), whether duplex copies are desired (2SD@FLAG), etc. As is well known in the art, controller 18 has previously set the appropriate flags (as set out in the parentheses above) when the user has selected the various machine features by pressing the corresponding console buttons on console 800, or, as in the case of the sorter 14, by the condition of sensors (e.g. 225, 226) detecting the condition of the machine.

Before the copy run is initiated, controller 18 is instructed to utilize this copy run data to calculate the set quantity (QTY@SET). The set quantity is the number of copies that can be made without exceeding the capacity of the machine. For example, if one of the bin arrays 210, 211 is empty, the capacity of the sorter 14 is 25 collated books. If the quantity selected is greater than 25, the job must be broken down into sets of 25 copies or less. This is accomplished by the set prediction routine (MODE @ reproduced in Table XI) which is called by the State Checker routine. This routine also calculates and stores the quantity to be flashed (QTY@TBF) and quantity to be delivered (QTY@TBD) for each original. In this embodiment, these stored quantities are placed in RAM memory 546 by means well known in the art. For purposes of illustration, assume that 100 collated duplex copies have been selected and that one of the sorter bin arrays is empty. This routine fetches the stored capacity of sorter 14 for making collated books with one bin array empty. This capacity is compared with the quantity selected. Since the quantity selected exceeds the capacity of the machine for this copy run, controller 18 will divide it into a plurality of sets of 25 each. Consequently, the quantity to be flashed (QTY@TBF) and delivered (QTY@TBD) would likewise be 25 and would be stored in a memory location. In comparison, if 100 non-collated copies (STACKS) are selected, the sorter's capacity would not be exceeded and the copy run can proceed with the set quantity, quantity to be flashed, and quantity to be delivered all being 100. It should be noted that while the subject invention is described in connection with a machine utilizing flash exposure, other types of exposure techniques can also be utilized, such as known scanning techniques including laser beam exposure. It should also be realized that while the quantity to be delivered for each original will be the same, the copies of the originals may be delivered to different places within the machine. For example, side 1 copies will be delivered to auxiliary tray 102, while the finished side 2 or duplex copies will be delivered to sorter 14.

The set prediction routine also clears the necessary counters etc. prior to the copy run. When the machine parameters indicates that the machine is ready to make copies, it enters the PRINT state as described earlier herein.

Figure 42A:
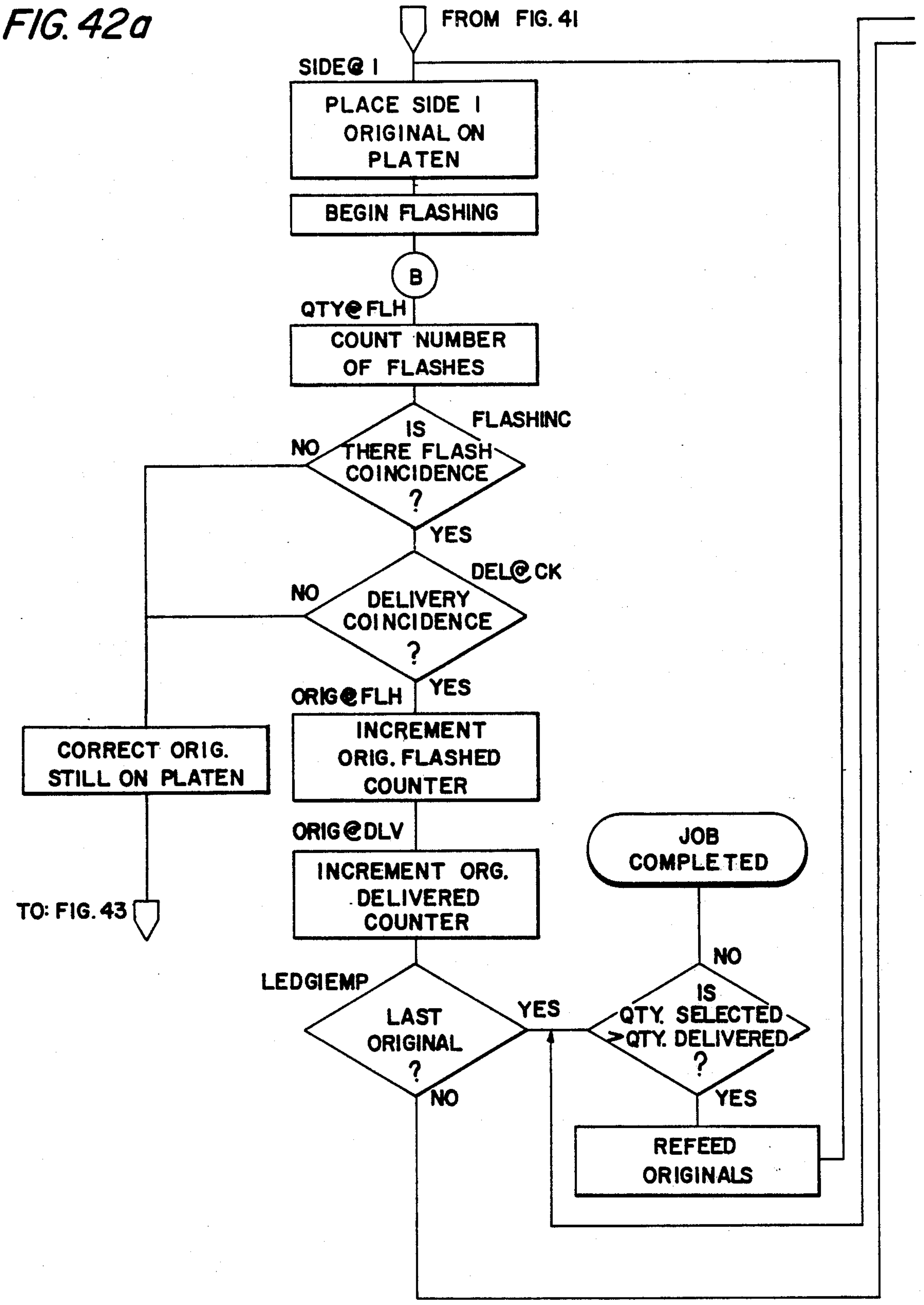
Figure 42B:
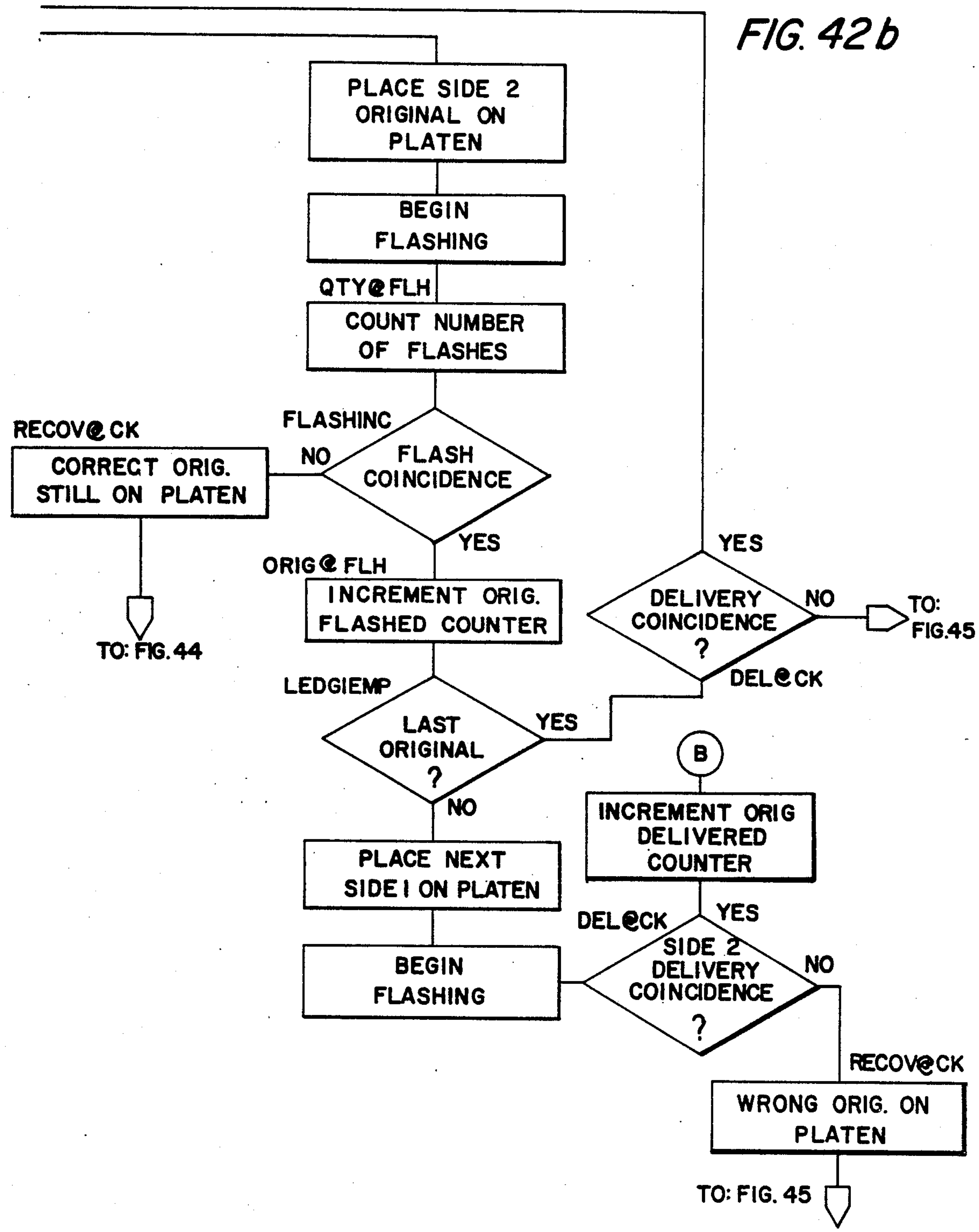

Referring now especially to FIG. 42, the document handler 16 is cycled to place the side 1 original on platen 35. For purposes of this invention, a side 1 original means an original document 2 or representations thereof from which images are formed to produce copies on the front side or side 1 of copy sheets 3. Similarly, a side 2 original means an original document 2 or representations thereof from which images are made to form copies on the back side or side 2 of copy sheets 3 bearing side 1 copies on their opposite sides. The machine includes a provision for indicating whether it is making side 1 or side 2 copies. For example, controller 18 sets a flag SD1 DEL when it is making copies from side 1 originals. This flag is then cleared as soon as all of the side 1 copies are delivered. The flag is reset when all of the side 2 or duplex copies have been successfully delivered. In the event of a fault condition, controller 18 checks the status of this flag to determine what copies must be remade. For example, if the flag is set at the time of the fault, only side 1 copies must be recovered or remade. On the other hand, both side 1 and side 2 copies must be remade if the flag is not set at the time of the fault. The procedure for automatically remaking the necessary lost copies due to the fault will now be explained.

The side 1 original is exposed by activating flash lamps 37 (see, e.g. FIG. 2) of the illumination assembly thereby forming images thereof on photoreceptor belt 20. A quantity flashed counter (QTY@FLH) maintains a running count of the number of flashes made for each original. The quantity flashed counter is a software counter, as are the remaining counters referred to in this description. A software counter is well known in the art and as such forms no part of this invention. Typically, such counters are memory locations which are incremented by appropriate signals, for example, in the case of the quantity flashed counter, by a signal generated everytime flash lamps 37 are activated. In the absence of a fault condition, flashing of the side 1 original continues until there is flash coincidence. Flash coincidence is met when the stored quantity to be flashed (QTY@TBF) is the same as the contents of the quantity flashed counter (QTY@FLH). In this embodiment, this is accomplished by the instructions provided by the flash increment routine (FLASHINC) reproduced in Table XII. As soon as there flash coincidence, the flash lamps 37 are deactivated. However, the side 1 original remains on the platen until there is delivery coincidence as well. As previously described, side 1 copies are inverted and routed back into a temporary receptacle or auxiliary tray 102. Appropriate sensors, such as sensor 189 detects the entry of successfully completed side 1 copies into auxiliary tray 102 as can be seen most clearly in FIG. 12. The output of sensor 189 is coupled to a copies delivered counter (QTY@DLV) which maintains a running count of the number of successfully delivered copies, be it side 1 copies to auxiliary 102 or side 2 copies to sorter 14 as similarly detected by sensors 225 or 226 for sorter bin arrays 210, 211, respectfully. A delivery increment routine (OUT@INC reproduced in Table XIX) increments and compares the contents of the copies delivered counter (QTY@DLV) with the predicted quantity to be delivered (QTY@TBD) necessary for proper completion of the copy run.

After side 1 flash and delivery coincidences are both met, the side 1 original is removed from platen 35 and returned to paper tray 233 on top of bail bar 235 (see FIG. 14). Every time an original document is removed from platen 35, an originals flashed counter (ORIG@FLH) is incremented by routines REVERSE and INC@ORFH reproduced in Tables XIV and XV, respectively. Similarly, whenever there is delivery coincidence, an originals delivered counter (ORIG@DLV) is incremented thereby keeping a running count of the number of originals from which all the necessary copies have been made.

Controller 18 then checks to determine if there are any more originals to be placed on the platen 35. This may be accomplished by the input empty routine (LEDGIEMP reproduced in Table XVI). Briefly, when the last original leaves tray 235, bail bar or separate 235 contacts switch 259 thereby signalling that the last original has left the tray 233. After the last original has been placed on platen 35 and exposed, the controller compares the stored quantity of selected copies (QTY-@SEL) with the quantity of flashes made (QTY@FLH). If, for example, the number of copies selected is greater than the number of flashes made document handler 16 is recycled to refeed the originals to platen 35 beginning with the first original, with the machine completing the job by making the necessary copies. As noted before, this will occur when the job has been split up into multi-set copy runs since the quantity flashed (QTY@FLH) will be less than the quantity selected when the set quantity is less than the quantity selected (QTY@SEL).

Assuming that the side 1 original was not the last original, the next original, here, the side 2 original is placed on platen 35. Flash lamps 37 are then activated until there is exposure coincidence, i.e. the number of flashes actually made as indicated by the quantity flashed counter (QTY@FLH) is the same as the quantity to be flashed (QTY@TBF). Unlike the side 1 original, the side 2 original is removed from platen 35 and the succeeding document, here the next side 1 original (e.g. page 3), is placed on platen 35 as soon as there is side 2 exposure coincidence. It should be realized that there is a significant delay between the time of exposure and the time of delivery of the copies made from the exposed original. For example, the necessary number of side 2 exposures may be completed before the side 2 or duplex copies have been delivered to sorter 14. As described earlier, the side 2 copies are formed on the opposite sides of the side 1 copies fed from auxiliary tray 102. Hence, by activating the document handler 16 to place the next side 1 original on platen 35 in preparation for making copies therefrom, the throughput of the machine is thereby optimized. In fact, exposure of the next side 1 original can be begun before the last duplex copy has been delivered to sorter 14. After there is side 2 delivery coincidence, the originals delivered counter (ORIG@DLV) is incremented and the above described sequence is repeated until the necessary copies are made.

It is a feature of the invention that none of the side 2 originals are presented to the machine processor 12 until there is both side 1 flash and delivery coincidences. This permits controller 18 to readily keep track of the number of copies made and their location with only a minimal number of counting devices, sensors, etc. On the other hand, the machine is conditioned to receive images from the next side 1 original as soon as there is flash coincidence for the side 2 original thereby optimizing the speed of the machine. Moreover, this sequence of events permits controller 18 to initiate the necessary recovery steps to remake lost copies in the event of a fault condition. These recovery steps will differ depending upon the event currently in process at the time of the fault condition. These fault conditions represent a wide variety of machine malfunctions and include such things as paper jams which are detected by sensors disposed along the machine paper path as is well known in the art. When a fault condition is detected, the sensors send appropriate signals to controller 18 which enters the Run Not Print STATE and ceases further machine operation. In this STATE, controller 18 is instructed by the Delivery Check (DEL@CK) routine reproduced in Table XIII. This routine determines whether there has been side 1 or side 2 delivery coincidence at the time of the fault. If not, it initiates the recovery steps for remaking any copies lost due to the fault as described below.

Figure 43:
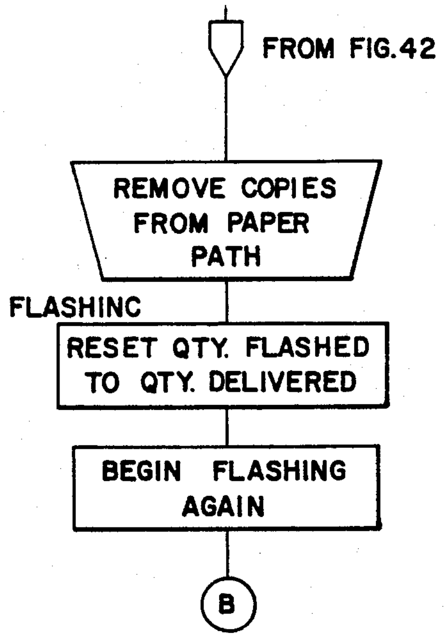

Since the side 1 original is not removed from platen 35 until there is both flash and delivery coincidence, controller 18 realizes that the correct original for remaking any lost copies is still on the platen when there is a fault before side 1 flash or delivery coincidence. Turning to FIG. 43, in the event of a side 1 fault the operator is instructed to remove the side 1 copies from the paper path. In other words, all of the copies sheets 3 in transit to the auxiliary tray 102 are considered lost. However, some of the side 1 copies may have been successfully delivered to the auxiliary tray 102. This would be indicated by the contents of the copies delivered counter (QTY@DLV). Under instruction of the flash increment routine (FLASHINC), the quantity flashed counter (QTY@FLH) is reset with the contents of the copies delivered counter (QTY@DLV). For purposes of illustration assume that 10 copies were selected, but that only three copies were actually delivered to auxiliary tray 102 before the fault occurred. Then, even though there may have been side 1 flash coincidence, the quantity flash counter (QTY@FLH) would be reset with the number 3. The side 1 original, which is already on the platen, would be exposed seven additional times to remake the lost copies. As soon as there is delivery coincidence, the side 2 original would be placed on the platen and the normal sequence of events shown in FIG. 42 would take place in order to finish the copy run.

Figure 44:
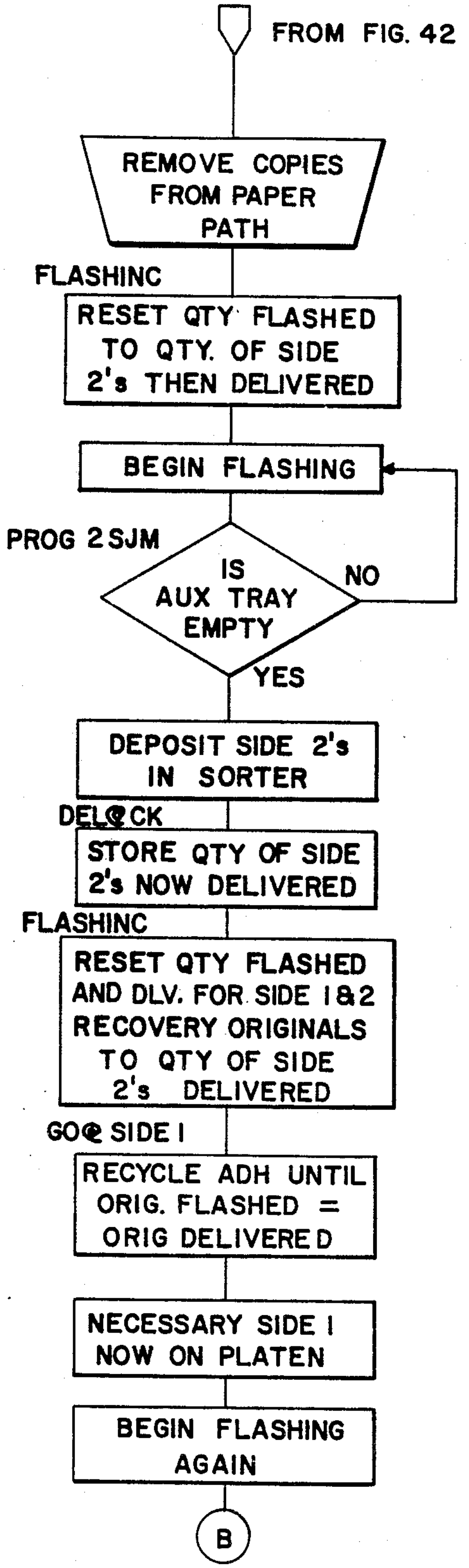

Assume now that the fault, instead, occurs after side 1 delivery coincidence but before there is side 2 delivery coincidence. Again, due to the preset sequence of operation, the correct original for recovering lost copies will still be on platen 35 if side 2 flash coincidence has not been met. As described earlier herein, the side 2 original is not removed from platen 35 until there is flash coincidence. Consequently, the contents of the originals flashed (ORIG@FLH) counter is the same as the originals delivered (ORIG@DLV) counter. The Delivery Check routine calls a routine (RECOV@CK) which senses this coincidence thereby signalling that the correct original is still on the platen. However, since it is a side 2 fault some of the side 1 copies must be remade even though they were successfully delivered to auxiliary tray 102. Referring to FIG. 44, the operator is instructed to remove the copy sheets in transit from auxiliary tray 102 to sorter 14. It can be envisioned that some of the duplex copies have already been made and delivered to sorter 14, while others are in transit from auxiliary tray 102, with some of the side 1 copies still remaining in tray 102. Instead of discarding the remaining side 1 copies in tray 102, it is another feature of this invention that they are further utilized to made duplex copies even though more side 1 copies may be necessary to ultimately recover for those lost in clearing the jam.

The contents of the quantity flashed counter (QTY@FLH) then is reset with the contents of copies delivered counter (QTY@DLV), such counter now indicating the number of duplex copies successfully delivered to sorter 41. For purposes of illustration, assume that after clearing the jam, there are three side 1 copies remaining auxiliary tray 102, and that two completed duplex copies have reached sorter 14 successfully. Hence, the quantity flashed counter is set to the number 2 and flash lamps 37 are then activated. However, lamps 37 are deactivated as soon as the auxiliary tray 102 becomes empty as indicated by an appropriate signal from switch 110. Accordingly, only five duplex copies are successfully delivered to sorter 14. Consequently, the contents of the copies delivered (QTY@DLV) counter would now be 5. This number is stored and is utilized to twice reset the quantity flashed and delivered counters for the next two originals, i.e. the side 1 and side 2 recovery originals from which copies are needed to properly complete the copy run. It should be noted that this can be accomplished by a variety of methods depending upon the number of counters, etc. utilized. For example, in this embodiment, the same counter QTY@DLV is utilized to first count the side 1 copies delivered, and then, after delivery coincidence is used to count the side 2 or duplex copies delivered. Consequently, when there is a fault before side 2 delivery coincidence, the necessary information for resetting the quantity flashed and copies delivered counters for the recovery originals must be temporarily stored until the proper original is presented to the machine as discussed below. In this embodiment, this is accomplished by the instructions of the flash increment routine (FLASHINC) of Table XII.

Under the instructions of the side two jam recovery routine (PROG2SJM of Table XVII), document handler 16 is recycled to bring the old side 1 original back onto platen 35 (see, e.g. GO@SIDE 1 also reproduced in Table XVII). This is accomplished by comparing the contents of the originals flashed counter (ORIG@FLH) with that of the originals delivered counter (ORIG@DLV). It should be noted that an appropriate provision can be made to deactivate flash lamps 37 until the correct original is in the platen 35. When contents of these two counters coincide, the correct original for remaking the side 1 copies is in place on platen 35. Thus, the old side 1 original is on the platen and the contents of the quantity flashed counter (QTY@FLH) is at 5, this counter having been reset to the number of side 2's delivered. Flash lamps 37 are then activated until coincidence (5 times) to provide five side 1 copies, which are placed in auxiliary tray 102. The side 2 original is then placed on platen 35, with the contents of the quantity flashed (QTY@FLH) and delivered (QTY@DLV) counters being set to 5. Lamps 37 are then flashed till coincidence to thus form five duplex on the backside of side 1 copies fed from auxiliary tray 102, with these copies being placed in sorter 14. Accordingly, the 8 duplex copies required to recover from the fault have been produced.

Referring back to FIG. 42, the remaining possibility is for the fault condition to occur after side 2 flash coincidence but before side 2 delivery coincidence. In such case, the contents of the originals flashed counter (ORIG@FLH) would not be equal to the contents of the originals delivered counter (ORIG@DLV), such comparison being made by the instructions included in the routine RECOV@CK reproduced in Table XVIII. Such noncoincidence is due to the fact that the side 2 original is removed from platen 35 as soon as there is flash coincidence, but before all the copies therefrom are delivered. Accordingly, the routine RECOVER (Table XVIII) sets a flag indicating that the document handler 16 needs to be recycled.

Figure 45:
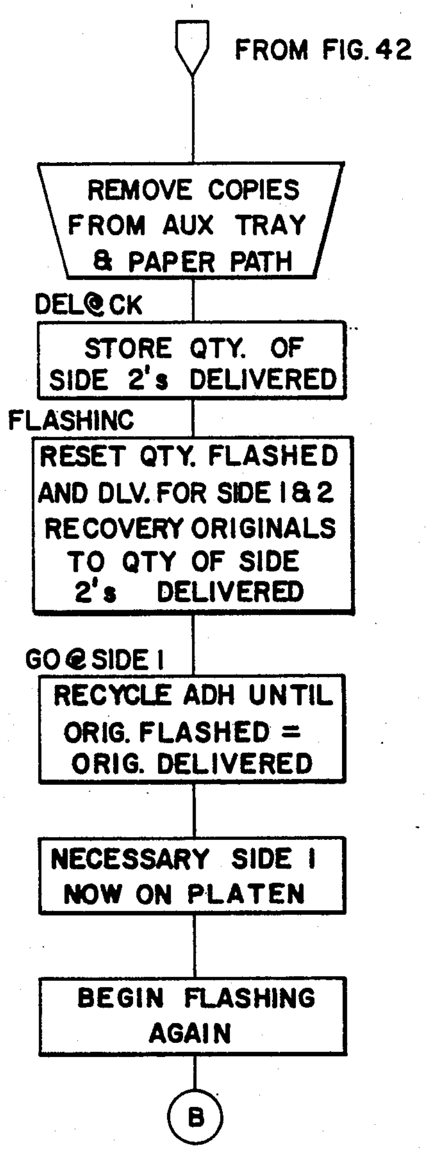

Turning now to FIG. 45, the operator is instructed to remove copies not only from the paper path, but also from auxiliary tray 102. For purposes of illustration, assume that after clearing the jam, there have been two successfully delivered duplex copies to sorter 14. Hence, the contents of the copies delivered counter (QTY@DLV) would be 2. Again, assume that 10 copies are desired. Hence, eight duplex copies must be remade for proper completion of the copy run. With the auxiliary tray empty, the side 2 jam recovery routine (PROG2SJM) instructs the document handler 16 to recycle the originals 2 until the originals flashed counter (ORIG@FLH) equals the original delivered counter (ORIG@DLV). (It will be remembered that the contents of the originals flashed counter is incremented whenever an original is removed from platen 35, even though they may not be exposed as is the case here.) In such manner, the old side 1 original is automatically placed on platen 35. In the same manner as described above, the contents of the quantity flashed counter (QTY@FLH) and quantity delivered counter are reset, for the next two originals, to the stored contents of the copies delivered counter (QTY@DLV), such counter indicating the number of duplex copies that were successfully delivered, here two in number. Flash lamps 37 are then activated to form eight copies of side 1, with such copies being placed in auxiliary tray 102. After side 1 delivery coincidence, the quantity flashed (QTY@FLH) and delivered (QTY@DLV) counters are reset to 2, and the side 2 original is placed on platen 35 whereat eight copies therefrom are produced on the backsides of the side 1 copies fed from auxiliary tray 102. After side 2 flash coincidence, the contents of the counters are cleared to zero and the normal operating sequence shown in FIG. 42 is repeated until the end of the copy run.

In view of the foregoing, it can now be realized that the present invention provides a method of controlling a reproduction machine to produce duplex copies automatically. Moreover, provision is made for automatically remaking lost copies due to a fault condition during the middle of a copy run. More importantly, this is accomplished by the use of a minimal number of sensors and counters, while at the same time optimizing the throughput of the machine. Therefore, while this invention has been described in connection with particular examples thereof, no limitation is intended thereby except as defined in the appended claims.

What is claimed is:

1. A method of controlling a reproduction machine to produce duplex copies from a set of original documents, said method comprising:

a. storing the quantity to be exposed and the quantity to be delivered to a receptacle for each original in the set for proper completion of the copy run;
b. exposing a side 1 original to form at least one image thereof on a photoreceptor;
c. forming finished copies from each image thus formed;
d. delivering said side 1 copies to a temporary receptacle;
e. counting in an exposures made counter the actual number of exposures made for each original;
f. counting in a copies delivered counter the number of finished copies successfully delivered to a receptacle;
g. comparing the quantity to be exposed and the quantity to be delivered with the contents of the exposures made counter and the copies delivered counter for the side 1 copies, respectively;
h. presenting a side 2 original to the machine only if there is both side 1 exposure and delivery coincidence;
i. exposing the side 2 original to form at least one image thereof on the photoreceptor;
j. comparing the quantity to be exposed with the contents of the exposures made counter for the side 2 original;
k. feeding said side 1 copies from the temporary receptacle;
l. forming finished copies of the side 2 original on the opposite side of the side 1 copies thereby forming duplex copies;
m. delivering said duplex copies to an output receptacle;
n. comparing the quantity to be delivered with the contents of the copies delivered counter for the side 2 original; and wherein a fault is detected if side 1 and side 2 exposure and delivery coincidences are not met.

2. The method of claim 1 which further includes the steps of:

using a document handler device to automatically feed the originals to an exposure platen from which the originals are presented to the machine for forming images therefrom;

storing in an originals exposed counter a running count of the originals presented to the machine; and storing in an originals delivered counter a running count of the number of originals from which all the necessary copies thereof have been successfully completely delivered.

3. The method of claim 2 which further includes the following steps when side 1 exposure and delivery coincidences are not met thereby automatically adjusting the reproduction process so that the selected number of copies are produced;

removing copies in transit to the temporary receptacle;

resetting the exposures made counter with the contents of the copies delivered counter; and repeating steps b–n until the selected number of copies are produced.

4. The method of claim 2 which further includes the following steps when side 2 exposures coincidence is not met thereby automatically adjusting the reproduction process so that the selected number of copies are reproduced;

removing copies in transit between the temporary receptacle and the output receptacle;

resetting the exposures made counter for the side 2 original to the contents of the copies delivered counter;

feeding the remaining side 1 copies from the temporary receptacle;

forming side 2 copies on the opposite sides of the side 1 copies until the temporary receptacle becomes empty;

delivering the duplex copies to the output receptacle;

storing the contents of the copies delivered counter whose contents indicates the number of duplex copies successfully delivered to the output receptacle;

resetting the exposures made counter and the copies delivered counter for the next two originals with the stored contents of the copies delivered counter for the duplex copies;

recycling the document handler to replace the previous original on the platen; and repeating steps b–n until the selected number of copies are produced.

5. The method of claim 4 wherein the document handler is recycled until there is coincidence between the originals exposed and originals delivered counters thereby automatically replacing the necessary side 1 original on the platen to remake the lost copies.

6. The method of claim 2 which further includes the following steps when side 2 exposure coincidence is met but side 2 delivery coincidence is not met thereby automatically adjusting the reproduction process so that the selected number of copies are produced;

removing copies from the temporary receptacle and those copies in transit to the output receptacle;

storing the contents of the copies delivered counter whose contents indicates the number of duplex copies successfully delivered to the output receptacle;

resetting the exposures made counter and copies delivered counter for the next two originals with the stored contents of the copies delivered counter for the duplex copies delivered to the output receptacle;

recycling the document handler to replace on the platen the last original from which all of the necessary copies have been successfully delivered; and repeating steps b–n until the selected number of copies are produced.

7. The method of claim 6 wherein the document handler is recycled until there is coincidence between the originals exposed and originals delivered counters thereby automatically replacing the necessary side 1 original on the platen to remake the lost copies.

8. In a reproduction machine for making duplex copies from side 1 and side 2 originals, the improvement comprising means for automatically adjusting the reproduction process in the event of a fault condition so that the selected number of copies are produced, said means including:

a first counter means for maintaining a running count of the number of exposures made of each original;

a second counter means for maintaining a running count of the number of successfully delivered copies of each original;

a first flag means for signalling that copies of the side 1 original are being made;

a second flag means for signalling that copies of the side 2 original are being made;

detector means for checking the condition of the first and second flag means in the event of a fault;

means for storing the contents of the second counter when the second flag signal is present at the time of the fault;

means for twice resetting the first and second counters with the stored contents of the second counter as the next two originals are presented to the machine;

means for successively representing the previous side 1 and side 2 originals to the machine; and means for successively making a sufficient number of copies from said side 1 and side 2 originals to bring the count of said first and second counters equal to the number of copies selected thereby remaking the copies lost due to the fault.

* * * * *